(12) United States Patent
Mowris et al.

(10) Patent No.: US 11,022,335 B2
(45) Date of Patent: Jun. 1, 2021

(54) ECONOMIZER COOLING DELAY CORRECTION

(71) Applicants: Robert J. Mowris, Olympic Valley, CA (US); John Walsh, Bozeman, MT (US)

(72) Inventors: Robert J. Mowris, Olympic Valley, CA (US); John Walsh, Bozeman, MT (US)

( * ) Notice: Subject to any disclaimer, the term of this patent is extended or adjusted under 35 U.S.C. 154(b) by 0 days.

(21) Appl. No.: 16/869,396

(22) Filed: May 7, 2020

(65) Prior Publication Data

US 2020/0363087 A1    Nov. 19, 2020

Related U.S. Application Data

(63) Continuation-in-part of application No. 16/565,464, filed on Sep. 9, 2019, which is a continuation-in-part
(Continued)

(51) Int. Cl.
*F24F 11/49* (2018.01)
*F24F 11/63* (2018.01)
(Continued)

(52) U.S. Cl.
CPC .............. *F24F 11/49* (2018.01); *F24F 11/38* (2018.01); *F24F 11/63* (2018.01); *F24F 11/74* (2018.01);
(Continued)

(58) Field of Classification Search
CPC .. F24F 11/38; F24F 11/49; F24F 11/63; F24F 11/74; F24F 2110/12; F24F 2120/10;
(Continued)

(56) References Cited

U.S. PATENT DOCUMENTS

| 4,404,815 A | 9/1983 | Gilson |
| 5,447,037 A | 9/1995 | Bishop |

(Continued)

OTHER PUBLICATIONS

American National Standards Institute (ANSI)/American Society of Heating, Refrigerating and Air-Conditioning Engineers, Inc. (ASHRAE)/ Illuminating Engineering Society (IES), ANSI/ASHRAE/IES. Standard 90.1-2013 Energy Standard for Buildings Except Low-Rise Residential Buildings. pp. 278. Date: 2013. Published by ASHRAE Inc., 1791 Tullie Cir NE, Atlanta, GA 30329 USA.
(Continued)

*Primary Examiner* — Marc E Norman
(74) *Attorney, Agent, or Firm* — Averill & Green; Kenneth L. Green

(57) ABSTRACT

A Fault Detection Diagnostic (FDD) correction method for increasing the cooling capacity delivered by an Air-Conditioning (AC) system with an economizer comprising: correcting/superseding at least one cooling fault/delay, the correcting/superseding selected from the group consisting of: correcting/superseding a High-limit-Shut-off-Temperature (HST) fault/delay based on detecting an Outdoor Air Temperature (OAT) is less than or equal to a High-limit-Control Temperature (HCT) during a thermostat call for cooling to enable economizer cooling otherwise delayed by the at least one HST fault/delay, superseding a thermostat second-stage time/temperature-deadband delay based on detecting an OAT is greater than or equal to an AC Control Temperature (ACT) during a call for cooling and energizing an AC compressor otherwise delayed by a thermostat second-stage time/temperature-deadband delay, superseding at least one economizer second-stage time/temperature delay based on detecting a thermostat second-stage cooling signal and energizing an AC compressor otherwise delayed by the at least one economizer second-stage time/temperature delay.

11 Claims, 12 Drawing Sheets

Related U.S. Application Data of application No. 16/289,313, filed on Feb. 28, 2019, now Pat. No. 10,712,036, application No. 16/869,396, which is a continuation-in-part of application No. 16/011,120, filed on Jun. 18, 2018, now Pat. No. 10,663,186, said application No. 16/289,313 is a continuation-in-part of application No. 15/614,600, filed on Jun. 5, 2017, now Pat. No. 10,281,938, which is a continuation-in-part of application No. 15/358,131, filed on Nov. 22, 2016, now Pat. No. 9,671,125, said application No. 16/011,120 is a continuation-in-part of application No. 15/169,586, filed on May 31, 2016, now Pat. No. 10,001,289.

(60) Provisional application No. 62/728,518, filed on Sep. 7, 2018.

(51) Int. Cl.

| | | |
|---|---|---|
| *F24F 11/38* | (2018.01) | |
| *F24F 11/74* | (2018.01) | |
| *G05B 19/042* | (2006.01) | |
| *G05B 23/02* | (2006.01) | |
| *F24F 140/40* | (2018.01) | |
| *F24F 120/10* | (2018.01) | |
| *F24F 110/12* | (2018.01) | |

(52) U.S. Cl.
CPC ....... *G05B 19/042* (2013.01); *G05B 23/0218* (2013.01); *F24F 2110/12* (2018.01); *F24F 2120/10* (2018.01); *F24F 2140/40* (2018.01); *G05B 2219/2614* (2013.01)

(58) Field of Classification Search
CPC ............... F24F 2140/40; G05B 10/042; G05B 23/0218; G05B 2219/2614
See application file for complete search history.

(56) References Cited

U.S. PATENT DOCUMENTS

| | | | |
|---|---|---|---|
| 5,544,809 | A | 8/1996 | Keating |
| 5,996,898 | A | 12/1999 | Parker |
| 6,223,544 | B1 | 5/2001 | Seem |
| 6,415,617 | B1 | 7/2002 | Seem |
| 6,684,944 | B1 | 2/2004 | Byrnes |
| 6,695,046 | B1 | 2/2004 | Byrnes |
| 7,444,251 | B2 | 10/2008 | Nikovski |
| 7,469,550 | B2 | 12/2008 | Chapman, Jr. |
| 7,500,368 | B2 | 3/2009 | Mowris |
| 8,066,558 | B2 | 11/2011 | Thomle |
| 8,195,335 | B2 | 6/2012 | Kreft |
| 8,965,585 | B2 | 2/2015 | Lombard |
| 8,972,064 | B2 | 3/2015 | Grabinger |
| 9,435,557 | B2 | 9/2016 | Albrecht |
| 9,500,382 | B2 | 11/2016 | Grabinger |
| 9,765,986 | B2 | 9/2017 | Thomle |
| 9,874,364 | B2 | 1/2018 | Bujak, Jr. |
| 10,060,642 | B2 | 8/2018 | Sikora |
| 2011/0160914 | A1 | 6/2011 | Kennett |
| 2011/0190910 | A1 | 8/2011 | Lombard |
| 2012/0310420 | A1* | 12/2012 | Quirk ................... F24F 11/0001 700/278 |
| 2015/0309120 | A1 | 10/2015 | Bujak, Jr. |
| 2016/0116177 | A1 | 4/2016 | Sikora |
| 2016/0169544 | A1* | 6/2016 | Fischer ................ F24F 11/0001 165/251 |
| 2017/0023269 | A1* | 1/2017 | Gevelber ................. F24F 11/62 |

OTHER PUBLICATIONS

Honeywell. Jade Economizer Module (Model W7220). pp. 32. Date: 2018. Published by Honeywell, Golden Valley, MN 55422, USA.

Belimo. Belimo ZIP Economizer™ Installation and Operation Manual. pp. 54. Date: Jan. 30, 2020. BELIMO Americas, 33 Turner Rd., Danbury, CT 06810, USA.

Pelican Wireless Systems, Installation Guide Pearl Economizer Controller (WM500 Manual), Date: Feb. 10, 2016, pp. 36 pages, Pelican Wireless Systems, 2655 Collier Canyon Rd., Livermore, CA 94551. USA. https://www.pelicanwireless.com/wp-content/uploads/2016/04/InstallGuide_PEARL.pdf.

Venstar Inc., Venstar Commercial Thermostat T2900 Manual, Date: Dec. 21, 2010, pp. 113 pages, Venstar Inc., 9250 Owensmouth Ave., Chatsworth, California 91311. USA. https://files.venstar.com/thermostats/slimline/documents/T2900ManualRev5.pdf. The.

Ecobee Inc., Energy Management System Manual, Date: Apr. 11, 2013, pp. 68 pages, Ecobee Inc., 25 Dockside Dr Suite 700, Toronto, ON M5A 0B5, Canada https://support.ecobee.com/hc/en-us/articles/360012061792-EMS-Guides-and-Manuals.

Carrier Corporation Inc., Totaline Gold Commercial Thermostat Installation and Operating Instructions. Date: Nov. 1999. pp. 12, United Technologies Corporation, One Carrier Place, Farmington, CT 06034-4015 USA https://dms.hvacpartners.com/docs/1005/Public/08/P274-2SI.pdf.

Honeywell International Inc., TB8220 Commercial VisionPRO™ Programmable Thermostat, Date: Mar. 15, 2005, pp. 24, Honeywell International Inc., 1985 Douglas Drive North, Golden Valley, MN 55422 USA. https://customer.honeywell.com/resources/techlit/TechLitDocuments/63-0000s/63/2625.pdf.

California Energy Commission (CEC). 2008. 2008 Residential Appendices for the Building Energy Efficiency Standards for Residential and Nonresidential Buildings. CEC-400-2008-004-CMF. Date: Dec. 2008, pp. 363, Published by the California Energy Commission, 1516 9th St, Sacramento, CA 95814 USA. https://ww2.energy.ca.gov/2008publications/CEC-400-2008-004/CEC-400-2008-004-CMF.PDF.

Yuill, David P., Braun, James E., Evaluating Fault Detection and Diagnostics Protocols Applied to Air-Cooled Vapor Compression Air-Conditioners. Date: Jul. 16, 2012, pp. 11, International Refrigeration and Air Conditioning Conference. Paper 1307. Published by Ray W. Herrick Laboratories, Purdue University, 177 S Russell St,, West Lafayette, IN 47907 USA (Yuill 2012). http://docs.lib.purdue.edu/iracc/1307.

California Energy Commission (CEC). 2012. Reference Appendices the Building Energy Efficiency Standards for Residential and Nonresidential Buildings. CEC-400-2012-005-CMF-REV3. Date: May 2012, pp. 10, 146/001 476, Published by the California Energy Commission, 1516 9th St, Sacramento, CA 95814 USA (CEC 2012). https://ww2.energy.ca.gov/2012publications/CEC-400-2012-005/CEC-400-2012-005-CMF-REV3.pdf.

California Energy Commission (CEC). 2018. 2019 Building Energy Efficiency Standards for Residential and Nonresidential Buildings. CEC-400-2018-006-20-CMF, Date: Dec. 2018, pp. 325, Published by the California Energy Commission, 1516 9th St., Sacramento, CA 95814 USA. https:// ww2.energy.ca.gov/2018publications/CEC-400-2018-020/CEC-400-2018-020-CMF.pdf.

Mowris, R., E. Jones, R. Eshom, K. Carlson, J. Hill, P. Jacobs, J. Stoops. 2016. Laboratory Test Results of Commercial Packaged HVAC Maintenance Faults. Prepared for the California Public Utilities Commission. Prepared by Robert Mowris & Associates, Inc. (RMA 2016). http://www.calmac.org/publications/ RMA_Laboratory_Test_Report_2012-15_v3.pdf.

Hart R., D. Morehouse, W. Price. 2006. The Premium Economizer: An Idea Whose Time Has Come. pp. 13. Date: Aug. 2006. Prepared by the Eugene Water & Electric Board and published by the American Council for an Energy Efficient Economy (ACEEE). Washington, DC (Hart 2006). See https://www.semanticscholar.org/paper/The-Premium-Economizer%3A-An-Idea-Whose-Time-Has-Come-Hart/3b8311bdf8cb40210ccabd0cec8906bda00d0fec.

S. Taylor, C. Cheng. Economizer High Limit Controls and Why Enthalpy Economizers Don't Work. 2010 (Taylor 2010). pp. 11. Date: Nov. 2010. ASHRAE Journal. 52. 12-28, Published by the American Society of Heating, Refrigerating and Air-Conditioning

(56) References Cited

OTHER PUBLICATIONS

Engineers, Inc. (ASHRAE). See https://www.scribd.com/document/390134082/ASHRAE-Why-Enthalpy-Economizers-Don-t-Work-Taylor-Cheng.

California Energy Commission (CEC). 2016. Reference Appendices the Building Energy Efficiency Standards for Residential and Nonresidential Buildings. Date: Jun. 2015. pp. 503, CEC-400-2015-038-CMF, Published by the California Energy Commission, 1516 9th St, Sacramento, CA 95814. USA. https:// ww2.energy.ca.gov/2015publications/CEC-400-2015-038/CEC-400-2015-038-CMF.pd.

Lutron. Residential Sensor Specification Guide. Date: Feb. 8, 2013. pp. 26. Lutron Electronics Company Inc., 7200 Suter Rd Coopersburg, PA 18036-1299 USA. USA https://www.lutron.com/TechnicalDocumentLibrary/3672236_Sensor_Spec_Guide.pdf.

Ecobee Inc., How to control your HVAC system's fan with your ecobee thermostat, Date: Jan. 13, 2020, p. 7, Published by Ecobee Inc., 25 Dockside Dr., Suite 700, Toronto, ON M5A 0B5, Canada. https://support.ecobee.com/hc/en-us/articles/360004798951-How-to-control-your-HVAC-system-s-fan-with-your-ecobee-thermostat.

Google Inc. How to Control Your Fan with a Nest Thermostat, Date: Dec. 30, 2019, pp. 4, Published by Google, Inc. 1600 Amphitheatre Parkway, Mountain View, CA 94043 USA. https://support.google.com/googlenest/answer/9296419?hl=en.

Lawrence Berkeley National Laboratory (LBNL) and J. Hirsch. DOE-2.2 Building Energy Use and Cost Analysis Program vol. 2: Dictionary, Date: Feb. 2014, pp. 522, E. O. Lawrence Berkeley National Laboratory Simulation Research Group, Berkeley, California 94720 USA. http://doe2.com/download/doe-22/DOE22Vol2-Dictionary_48r.pdf.

Carrier Corporation. HVAC Servicing Procedures. SK29-01A, 020-040. Date: 1997. pp. 8 (Cover, preface, and pp. 145-150). Published by Carrier Corporation, 13995 Pasteur Blvd., Palm Beach Gardens, Florida 33418 USA.

American National Standards Institute (ANSI)/American Society of Heating, Refrigerating and Air-Conditioning Engineers, Inc. (ASHRAE)/Illuminating Engineering Society (IES), ANSI/ASHRAE/IES. Standard 90.01-2013 Energy Standard for Buildings Except Low-Rise Residential Buildings. pp. 278. Date: 2013. Published by ASHRAE Inc., 1791 Tullie Cir NE, Atlanta, GA 30329 USA.

Ecobee Inc., Energy Management System Manual, Date: Apr. 11, 2013, pp. 36 pages, Ecobee Inc., 25 Dockside Dr Suite 700, Toronto, ON M5A OB5, Canada https://support.ecobee.com/hc/en-us/articles/360012061792-EMS-Guides-and-Manuals.

Hart R., D. Morehouse, W. Price. 2006. The Premium Economizer: An Idea Whose Time Has Come. pp. 13. Date: Aug. 2006. Prepared by the Eugene Water & Electric Board and published by the American Council for an Energy Efficient Economy (ACEEE). Washington, DC (Hart 2006). See https://www.semanticscholar.org/paper/The-Premium-Economizer%3A-An-Idea-Whose-Time-Has-Come-Hart/3b8311bdf8cb40210ccabd0cec8906bda00d0fec.

\* cited by examiner

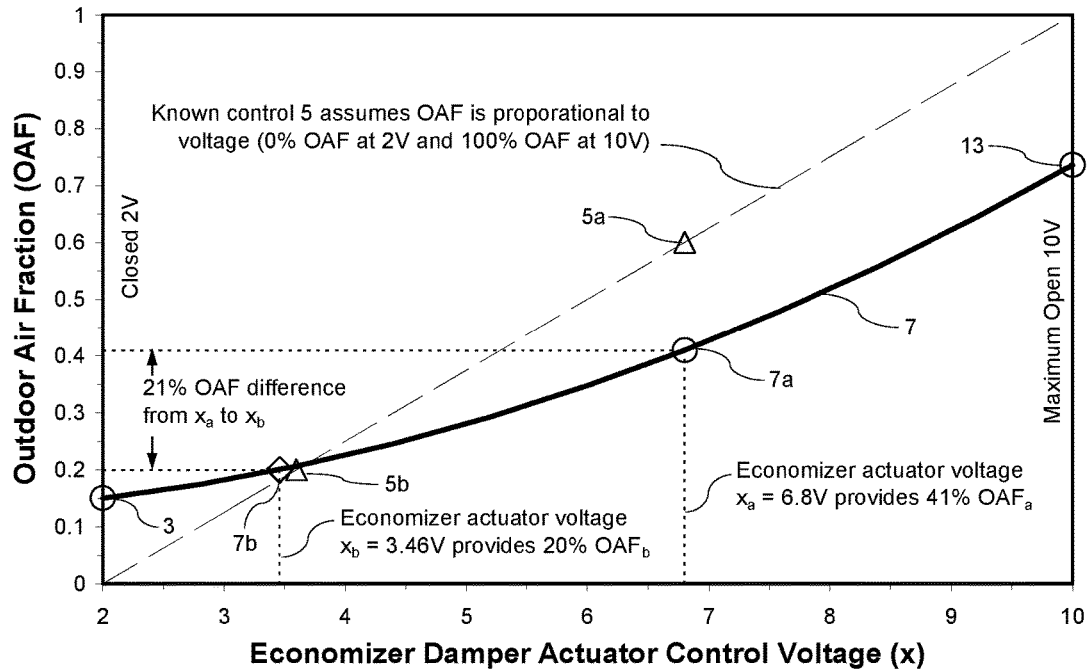

FIG. 5

| Damper Position | $x_i$ (Volts) | $y_i$ (OAF) |
|---|---|---|
| Initial $OAF_{min}$ | 6.8 | 0.41 |
| Maximum $OAF_{max}$ | 10.0 | 0.74 |
| Required $OAF_i$ | 3.46 | 0.20 |
| Closed $OAF_{closed}$ | 2.0 | 0.15 |

Eq. 7  $\quad y_i = ax_i^2 + bx_i + c = 0.006 x_i^2 + 0.0017 x_i + 0.1228$

Eq. 9  $\quad \underbrace{\begin{bmatrix} \sum x_i^4 & \sum x_i^3 & \sum x_i^2 \\ \sum x_i^3 & \sum x_i^2 & \sum x_i \\ \sum x_i^2 & \sum x_i & n \end{bmatrix}}_{X} \underbrace{\begin{bmatrix} a \\ b \\ c \end{bmatrix}}_{C} = \underbrace{\begin{bmatrix} \sum x_i^2 y_i \\ \sum x_i y_i \\ \sum y_i \end{bmatrix}}_{Y} = \underbrace{\begin{bmatrix} 12154.14 & 1322.43 & 150.24 \\ 1322.43 & 150.24 & 18.8 \\ 150.24 & 18.8 & 3 \end{bmatrix}}_{X} \underbrace{\begin{bmatrix} a \\ b \\ c \end{bmatrix}}_{C} = \underbrace{\begin{bmatrix} 93.16 \\ 10.45 \\ 1.295 \end{bmatrix}}_{Y}$ Eq. 11  $\quad C = \begin{bmatrix} a \\ b \\ c \end{bmatrix} = X^{-1} Y = \begin{bmatrix} 0.0064 & -0.0757 & 0.1516 \\ -0.0757 & 0.9199 & -1.9746 \\ 0.1516 & -01.9746 & 5.1135 \end{bmatrix} \begin{bmatrix} 93.1584 \\ 10.448 \\ 1.296 \end{bmatrix} = \begin{bmatrix} 0.0060 \\ 0.0017 \\ 0.1228 \end{bmatrix}$ Eq. 19  $\quad x_i = \dfrac{-b + \sqrt{b^2 - [4a \times (c - y_i)]}}{2a} = \dfrac{-0.0017 + \sqrt{0.0017^2 - [4 \times 0.006 \times (0.1228 - 0.2)]}}{2 \times 0.006} = 3.46V$

FIG. 6

| Known Prior Art HST or Deadband Fault | Known Prior Art CZ06 kWh/yr | FDD CDC CZ06 kWh/yr | FDD CDC CZ06 Savings | Known Prior Art CZ13 kWh/yr | FDD CDC CZ13 kWh/yr | FDD CDC CZ13 Savings | Known Prior Art CZ15 kWh/yr | FDD CDC CZ15 kWh/yr | FDD CDC CZ15 Savings |
|---|---|---|---|---|---|---|---|---|---|
| Default 62F HST | 10,479 | 7,981 | 23.8% | 27,307 | 25,604 | 6.2% | 59,697 | 58,049 | 2.8% |
| -1F HST deadband | 8,065 | 7,981 | 1.0% | 25,579 | 25,604 | -0.1% | 58,006 | 58,049 | -0.1% |
| -2F HST deadband | 8,172 | 7,981 | 2.3% | 25,590 | 25,604 | -0.1% | 58,018 | 58,049 | -0.1% |
| Average | 9,277 | 7,981 | 12.5% | 26,444 | 25,604 | 3.1% | 58,852 | 58,049 | 1.3% |

*FIG. 7*

| OAT (F) a | Economizer heat removal $Q_e$ Btu b | Occupied Sensible cooling load $Q_i$ Btu c | Room air volume heat $Q_v$ Btu d | DX AC coil sensible cooling $Q_{sc}$ Btu e | Exceeds time delay or dead band? F | Net DX AC sensible capacity $Q_{sc}$ Btu g=e+b+c | DOE-2 DX AC kWh $e_{ac}$ h | Corrected DOE-2 DX AC energy kWh $e_c$ i=h*(1-d/g) | Occupied FDD CDC cooling savings $\Delta e_{FT}$ j=1-h/i |
|---|---|---|---|---|---|---|---|---|---|
| 63 | 63,302 | -61,636 | -2,285 | 3,824 | Yes | 5,489 | 0.33 | 0.46 | 29.4% |
| 64 | 57,621 | -58,101 | -2,285 | 6,297 | Yes | 5,816 | 0.50 | 0.70 | 28.2% |
| 65 | 51939 | -56972 | -2,285 | 11529 | Yes | 6,496 | 0.94 | 1.27 | 26.0% |
| 66 | 46258 | -58755 | -2,285 | 19723 | Yes | 7,226 | 1.67 | 2.19 | 24.0% |
| 67 | 40576 | -59721 | -2,285 | 27013 | Yes | 7,868 | 2.18 | 2.82 | 22.5% |
| 68 | 34895 | -56470 | -2,285 | 31190 | Yes | 9,614 | 2.43 | 3.00 | 19.2% |
| 69 | 29213 | -58713 | -2,285 | 39373 | Yes | 9,873 | 3.17 | 3.90 | 18.8% |
| 70 | 23532 | -54389 | -2,285 | 41930 | Yes | 11,072 | 3.44 | 4.15 | 17.1% |
| 71 | 17850 | -54763 | -2,285 | 49015 | Yes | 12,103 | 3.63 | 4.31 | 15.9% |
| 72 | 12168 | -59245 | -2,285 | 60610 | Yes | 13,533 | 4.53 | 5.29 | 14.4% |
| 73 | 6487 | -56268 | -2,285 | 64113 | Yes | 14,331 | 4.93 | 5.72 | 13.8% |
| 74 | 805 | -51190 | -2,285 | 64603 | Yes | 14,219 | 5.13 | 5.96 | 13.8% |
| 75 | -4876 | -54363 | -2,285 | 72883 | Yes | 13,643 | 5.86 | 6.84 | 14.3% |

*FIG. 8*

| OAT (F) a | Economizer heat removal $Q_e$ Btu b | Unoccupied sensible cooling load $Q_i$ Btu c | Room air volume heat $Q_v$ Btu d | DX AC coil sensible cooling $Q_{sc}$ Btu e | Exceeds time delay or dead band? F | Net DX AC sensible capacity $Q_{sc}$ Btu g=e+b+c | DOE-2 DX AC kWh $e_{ac}$ h | Corrected DOE-2 DX AC energy kWh $e_c$ i=h*(1-d/g) | Unoccupied FDD CDC cooling savings $\Delta e_{FT}$ j=(i-h)/i |
|---|---|---|---|---|---|---|---|---|---|
| 69 | 29,213 | -23,686 | -2,285 | 6,451 | Yes | 11,978 | 0.60 | 0.72 | 16.0% |
| 70 | 23,532 | -20,638 | -2,285 | 9,606 | Yes | 12,500 | 0.88 | 1.04 | 15.5% |
| 71 | 17850 | -22049 | -2,285 | 17381 | Yes | 13,182 | 1.59 | 1.86 | 14.8% |
| 72 | 12168 | -23118 | -2,285 | 24637 | Yes | 13,687 | 2.34 | 2.73 | 14.3% |
| 73 | 6487 | -21167 | -2,285 | 29737 | Yes | 15,057 | 2.75 | 3.16 | 13.2% |
| 74 | 805 | -21043 | -2,285 | 36007 | Yes | 15,770 | 3.36 | 3.85 | 12.7% |
| 75 | -4876 | -21925 | -2,285 | 42895 | Yes | 16,095 | 4.21 | 4.81 | 12.4% |

*FIG. 9*

| Description | OAT (F) [a] | Total power (W) [b] | Sensible cooling (Btuh) [c] | Sensible (EER*) [d=c/b] | Economizer only cooling savings (%) [e] | FDD CDC cooling savings (%) [f] |
|---|---|---|---|---|---|---|
| 1st-stage AC compressor | 95 | 5,684 | 20,485 | 3.60 | | |
| 1st + 2nd-stage AC compressor | 95 | 8,987 | 53,195 | 5.92 | | 39.1% |
| 1st-stage AC compressor | 82 | 5,103 | 21,532 | 4.22 | | |
| 1st + 2nd-stage AC compressor | 82 | 7,845 | 52,707 | 6.72 | | 37.2% |
| Economizer fan only | 70 | 1,539 | 5,015 | 3.26 | | |
| Economizer + 1st-stage AC | 70 | 4,586 | 35,264 | 7.69 | | |
| Economizer +1st+2nd-stage AC | 70 | 6,989 | 62,863 | 8.99 | | 14.5% |
| Economizer fan only | 65 | 1,550 | 12,989 | 8.38 | -25.3% | |
| Economizer + 1st-stage AC | 65 | 4,446 | 43,053 | 9.68 | | |
| Economizer +1st+2nd-stage AC | 65 | 6,651 | 69,813 | 10.50 | | 7.7% |
| Economizer fan only | 60 | 1,585 | 20,697 | 13.06 | 11.5% | |
| Economizer + 1st-stage AC | 60 | 4,342 | 49,245 | 11.34 | | |
| Economizer +1st+2nd-stage AC | 60 | 6,341 | 73,295 | 11.56 | | 1.9% |
| Economizer fan only | 55 | 1,583 | 28,942 | 18.28 | 27.3% | |
| Economizer + 1st-stage AC | 55 | 4,205 | 55,897 | 13.29 | | |
| Economizer +1st+2nd-stage AC | 55 | 6,052 | 79,444 | 13.13 | | -1.3% |

*FIG. 12*

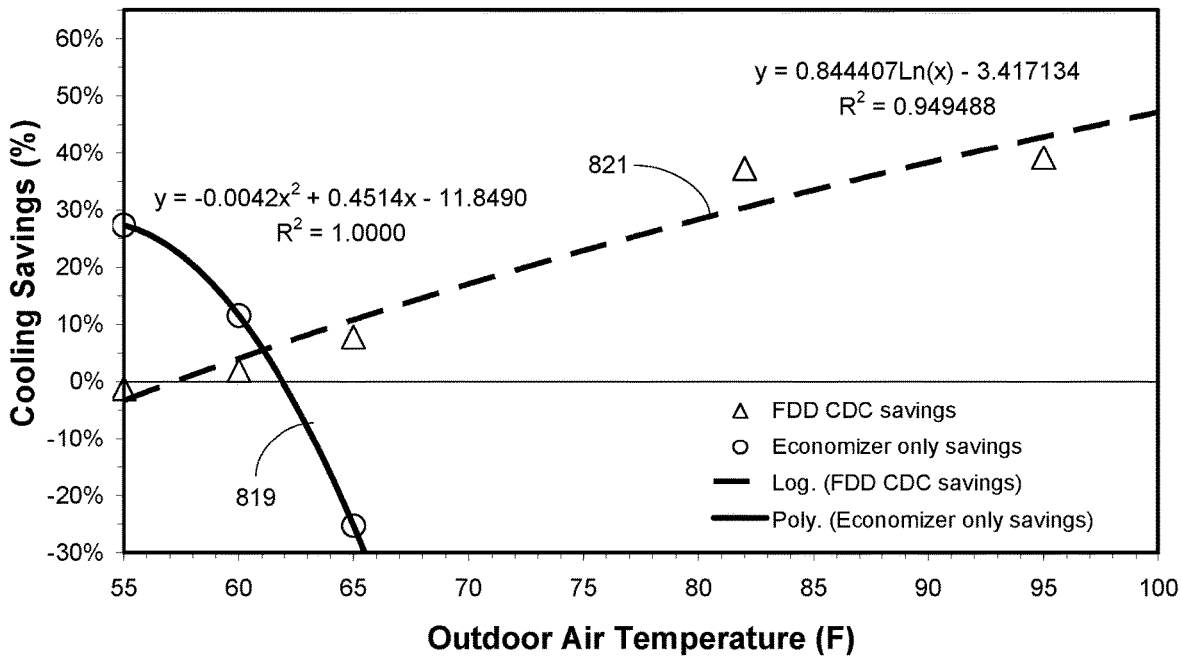

*FIG. 13*

ECONOMIZER COOLING DELAY CORRECTION

CROSS-REFERENCE TO RELATED APPLICATIONS

The present application is a Continuation In Part of U.S. patent application Ser. No. 16/289,313 filed Feb. 28, 2019, which is a Continuation In Part of U.S. patent application Ser. No. 15/614,600 filed Jun. 5, 2017, which is a Continuation In Part of U.S. patent application Ser. No. 15/358,131 filed Nov. 22, 2016, and the present application is a Continuation In Part of U.S. patent application Ser. No. 16/011,120 filed Jun. 18, 2018, which is a Continuation In Part of U.S. patent application Ser. No. 15/169,586 filed May 31, 2016, the present application claiming the priority of the above applications which are incorporated in their entirety herein by reference. The present invention is also a Continuation In Part of the application Ser. No. 16/565,464 filed Sep. 9, 2019 which claims the priority of U.S. Provisional Patent Application Ser. No. 62/728,518 filed Sep. 7, 2018, and the application Ser. No. 16/565,464 filed Sep. 9, 2019, is a Continuation In Part of U.S. patent application Ser. No. 16/289,313 filed Feb. 28, 2019.

BACKGROUND OF THE INVENTION

The present invention relates to a Heating, Ventilating, and Air Conditioning (HVAC) system with economizers.

Buildings are required to provide a minimum flow of outdoor air into their HVAC systems per the American Society of Heating Refrigeration and Air-Conditioning Engineers (ASHRAE) Standard 61.1 (ANSI/ASHRAE 62.1-2019. Standard Ventilation for Acceptable Indoor Air Quality) and the 2019 California Energy Commission (CEC) Building Energy Efficiency Standards for Residential and Nonresidential Buildings (https://ww2.energy.ca.gov/2018publications/CEC-400-2018-020/CEC-400-2018-020-CMF.pdf). When the outdoor airflow exceeds the minimum required airflow during severe weather, the additional airflow may introduce unnecessary hot outdoor air when the HVAC system is cooling the building, or introduce unnecessary cold outdoor air when the HVAC system is heating the building. During severe weather, this unnecessary or unintended outdoor airflow reduces space cooling and heating capacity and efficiency and increases cooling and heating energy consumption and the energy costs required to provide space cooling and heating to building occupants.

Known prior art economizer controllers fully open an economizer damper to provide a maximum amount of outdoor air to cool the building without using Direct Expansion (DX) refrigerant-based Air Conditioning (AC) during cool weather when the Outdoor Air Temperature (OAT) is cooler than the Conditioned Space Temperature (CST) and the OAT is less than an economizer drybulb setpoint temperature referred to as a High-limit Shut-off Temperature (HST) or the outdoor air enthalpy is less than the enthalpy setpoint. During moderate weather when the OAT is less than the CST, but greater than the HST or the outdoor air enthalpy is greater than the enthalpy setpoint typically 28 British thermal units (Btu) per pound mass (lbm) of dry air (da) (Btu/lbm), the economizer damper is set to a minimum outdoor air position and one or more DX AC compressors are used to provide cooling to the building without economizer cooling.

Known methods for measuring the amount of outdoor airflow introduced into buildings to meet minimum requirements are inaccurate and better methods are required to improve thermal comfort of occupants, reduce cooling and heating energy use, and improve energy efficiency. Known methods for cooling the building with economizers are inefficient and better methods are required to improve thermal comfort of occupants, reduce cooling energy use, and improve energy efficiency.

Non-patent publication by the American Society of Heating, Refrigerating and Air-Conditioning Engineers, Inc. (ASHRAE) "ANSI/ASHRAE/IEE Standard 90.1-2007, Energy Standard for Buildings Except Low-Rise Residential Buildings." Pages 25. Date: August 2010. Published by ASHRAE Inc., 1791 Tullie Cir NE, Atlanta, Ga. 30329 USA. https://www.ashrae.org/File%20Library/Technical%20Resources/Standards%20and%20Guidelines/Standards%20Addenda/90-1-2007/90_1_2007_cy_co_dd_de_df.pdf. p. 3-4 section 6.5.1.1.3 discloses a "High-Limit Shutoff. All air economizers shall be capable of automatically reducing outdoor air intake to the design minimum outdoor air quantity when outdoor air intake will no longer reduce cooling energy usage. High-limit shutoff control types for specific climates shall be chosen from Table 6.5.1.1.3A. High-limit shutoff control settings for these control types shall be those listed in Table 6.5.1.1.3B." Table 6.5.1.1.3B (p. 4) provides the High-Limit Shut-off Temperature (HST) hereinafter referred to as the HST wherein the HST ranges from 70 F to 75 F for US climate zones. The HST is also referred to by Honeywell as the DRYBLB Set and by Belimo as the Single Dry Bulb Changeover temperature.

Non-patent publication by HONEYWELL INC., "JADE Economizer Module (JADE W7220)," Date: 2014, Pages: 32, Copyright 2018, HONEYWELL INC., Golden Valley, Minn. 55422, USA. https://customer.honeywell.com/resources/techlit/TechLitDocuments/63-0000s/63-2700.pdf. The HONEYWELL JADE W7220 controller receives a first-stage AC input (Y1-I), a second-stage AC Y2 input (Y2-I), and an occupancy sensor input (OCC). The JADE W7220 provides an economizer actuator 2-10 VDC output (AC 2-10) to control the supply/return dampers, a first-stage AC compressor (mechanical cooling) output (Y1-O), and a second-stage AC output (Y2-O). When the JADE W7220 receives a thermostat first-stage cooling signal, and OAT is 62 F or 1 F less then the HST (DRYBLB Set default 63 F), then the JADE W7220 provides a 10V signal to the economizer actuator (AC 2-10) to fully open the damper with only the HVAC fan operating. If Y1-I is energized and the OAT is "64 F and above," then the JADE W7220 will provide a 2.8V signal on the AC 2-10 output and energize the first-stage cooling signal output (Y1-O) to operate the first-stage AC compressor. According to the JADE W7220 manual "Setpoint determines where the economizer will assume outdoor air temperature is good for free cooling; e.g.; at 63 F setpoint unit will economizer at 62 F and below and not economize at 64 F and above. There is a 2 F deadband." The 1 F deadband below the HST (2 F deadband total) cannot be changed by a user input, and the 1 F deadband below HST increases cooling energy use by 1 to 5.2% depending on climate zone. Table 5 (Page 21) describes parameter "DRYBLB DIF Available firmware 1.15, June 2018, and later." If JADE W7220 DRYBLB DIF is set to default of 0 F for a 2-stage AC system and only Y1-I is energized, then the JADE W7220 will fully open damper and operate fan by itself and attempt to satisfy the thermostat call for cooling until the thermostat second-stage cooling signal is received and Y2-I is energized due to the call for cooling not being satisfied. Most commercial thermostats have a thermostat second-stage time delay of 2 to 60 minutes and a thermostat second-stage deadband temperature delay of 2 F to 10 F. While the economizer is attempting to cool the building, the fan will operate, but no AC compressor cooling will be provided unless the thermostat provides the second-stage cooling signal to energize Y2-I which only occurs if the CST is 3 F above the setpoint temperature (2 F above the differential) AND the Y1-I has been energized for 2 to 60 minutes. Page 23 of the Honeywell JADE W7220 manual describes a default Parameter "STG3 DLY" time delay parameter setting of 2 hours to energize the economizer second-stage cooling signal output to energize a second-stage AC compressor after receiving a thermostat second-stage cooling signal. The Honeywell JADE economizer second-stage time delay reduces thermal comfort and increases cooling system energy use by 3 to 15% due to operating the first-stage AC compressor for 120 minutes before energizing the second-stage AC compressor causing the CST to increase by 2 F to 10 F.

Non-patent publication by BELIMO, "Belimo ZIP Economizer™ Installation and Operation Manual" (BELIMO ZIP MANUAL), Date: Jan. 1, 2020, Pages: 54, BELIMO, Danbury, Conn. 06810, USA. https://www.belimo.us/mam/americas/technical_documents/pdf-web/zip_economizer/zip_economizer_installation_operation_manual.pdf. BELIMO ZIP MANUAL page 34 discloses a Single Dry Bulb Changeover (similar to the ASHRAE 90.1 HST). The BELIMO ZIP HST is described as follows: "If only an OAT sensor is connected, it will be analyzed against the reference Outdoor Air changeover temperature value (based on entered ZIP code). IF OAT is 2° F. below the reference value THEN economizing will be enabled. IF OAT is above the reference value THEN economizing will be disabled." The BELIMO ZIP has a 2 F deadband delay and the HST is based on US ZIP codes mapped to the ASHRAE 90.1 climate HST climate zones per ASHRAE 90.1, California Title 24, and Canada NECB see BELIMO Page 34). The 2 F deadband below the HST cannot be changed by a user input, and the 2 F deadband below the HST increases cooling energy use by 1 to 5.2% depending on climate zone. The BELIMO ZIP MANUAL page 34 also discloses a "Differential Dry Bulb Changeover" using OAT and RAT sensors analyzed against the reference Differential Temperature High Limit (DTHL) based on entered ZIP code. IF OAT is 4° F. below the RAT and OAT is 3° F. below the reference DTHL, then economizing will be enabled. IF OAT is greater than or equal to 2° F. below the RAT or the OAT is greater than the reference DTHL, then economizing will be disabled. When economizing the ZIP does not energize the AC Compressor output Y1 unless the thermostat second-stage cooling signal is energized which occurs after the CST is 3 F greater than the thermostat setpoint AND after a delay of 2 to 60 minutes (i.e., user input). Page 33 of the BELIMO ZIP MANUAL describes a default time delay to energize a second-stage cooling signal to energize a second-stage AC compressor after receiving a thermostat second-stage cooling signal. "If Y2 Limit is set to "On" compressor 2 is delayed by 240 seconds to evaluate if the single compressor already operating can bring SAT less than or equal to setpoint+1.5° F. (56.5° F.)." The Belimo ZIP economizer second-stage time delay reduces thermal comfort and increases cooling system energy use by 3 to 15% or more due to operating the first-stage AC compressor for a 4 minute delay before energizing the second-stage AC compressor causing the CST to increase by 2 F.

Non-patent publication by PELICAN WIRELESS SYSTEMS, Installation Guide Pearl Economizer Controller (WM500 MANUAL), Date: Feb. 10, 2016, Pages: 36 pages, Pelican Wireless Systems, 2655 Collier Canyon Rd. Livermore, Calif. 94551. USA. https://www.pelicanwireless.com/wp-content/uploads/2016/04/InstallGuide_PEARL.pdf. The PELICAN WM550 Manual provides installation instructions on pages 27-32. "The economizer sequence provides cool outside air to satisfy room cooling demand either by itself or in combination with mechanical cooling stages. The proprietary algorithm maximizes the use of free cooling and minimizes the use of mechanical cooling."

Non-patent publication by Venstar Inc., Venstar Commercial Thermostat T2900 Manual, Date: Dec. 21, 2010, Pages: 113 pages, Venstar Inc., 9250 Owensmouth Ave, Chatsworth, Calif. 91311. USA. https://files.venstar.com/thermostats/slimline/documents/T2900ManualRev5.pdf. The Venstar Commercial Thermostat T2900 manual provides the following instructions for economizer operation. "ECONOMIZER OPERATION—If your HVAC unit is equipped with an economizer system, the thermostat will provide power to the MISC2 or MISC3 terminal of the thermostat when the thermostat is in an occupied time period. The MISC2 or MISC3 terminal will be de-energized when the thermostat is in an unoccupied time period. Y2 OPERATION—Section 13 Control up to two Cool stages. The 2nd Stage of heat or cool is turned on when: (A) The 1st Stage has been on for the time required (step #27, page 13.6). It is adjustable from 0-60 minutes and the default is two minutes. AND (B) The temperature spread from the setpoint is equal to or greater than: the setpoint plus the deadband (step #24, page 13.5), plus the 2nd deadband (step #25, page 13.5). This 2nd deadband is adjustable from 0-10 degrees and the default is two degrees." The Venstar T2900 thermostat does not energize the Y2 operation (for second-stage cooling) until BOTH the $1^{st}$ stage time (default 2 minutes) AND the 2nd deadband (default 2 F) have been met.

Non-patent publication by Ecobee Inc., ENERGY MANAGEMENT SYSTEM Manual, Date: Apr. 11, 2013, Pages: 26 pages, Ecobee Inc., 25 Dockside Dr Suite 700, Toronto, ON M5A 0B5, Canada https://support.ecobee.com/hc/en-us/articles/360012061792-EMS-Guides-and-Manuals. Page 27 provides the following information: "Stage X Maximum Runtime The maximum amount of time X stage will run before engaging the next stage. Options are Auto and 10-120 minutes. Stage X Temperature Delta. The minimum difference between the current temperature and the set temperature that will activate this stage (regardless if the maximum run time of the previous stage was reached). Options are Auto and 1-10 F." The Ecobee EMS controller does not energize the Y2 Stage 2 operation (for second-stage cooling) until the Stage 1 temperature difference is met or a maximum runtime of 10 to 120 minutes has been met.

Non-patent publication by Carrier Corporation Inc., Totaline Gold Commercial Thermostat Installation and Operating Instructions. Date: November 1999. Pages: 12, United Technologies Corporation, One Carrier Place, Farmington, Conn. 06034-4015 USA https://dms.hvacpartners.com/docs/1005/Public/08/P274-2SI.pdf. Page 9 provides the following instructions. "ALLOW CONTINUOUS FAN DURING UNOCCUPIED HOURS (Configuration Number 20)—The fan can be configured by the user to run continuously (set to ON) or only during heating or cooling (set to AUTO). When the fan is set to ON (run continuously), the Allow Continuous Fan During Unoccupied Hours configuration determines whether the fan will run during unoccupied periods when heating or cooling is not active. When the configuration is set to ON and the fan is set to ON, the fan will run continuously during unoccupied periods, even when heating or cooling is not active. When the configuration is set to OFF, the fan will run during unoccupied periods only when heating or cooling is active. The default is On." Page 11 provides instructions for multi-stage heating or cooling. "Fifteen-Minute Staging Timer—When multi-stage heating or cooling is used, the staging timer prevents any higher stage from energizing until at least 15 minutes has passed from the start of the previous stage. The timer is disabled if the temperature demand is greater than 5 degrees." The Totaline second-stage control method would require about 2.5 times more AC compressor operation than the Venstar T2900 thermostat which has a default 2 minutes AND 2 F deadband. The Totaline thermostat provides default continuous fan-on during unoccupied periods.

A non-patent publication by Honeywell International Inc., "TB8220 Commercial VisionPRO™ Programmable Thermostat," Date: Mar. 15, 2005, Pages: 24, Honeywell International Inc., 1985 Douglas Drive North, Golden Valley, Minn. 55422 USA. https://customer.honeywell.com/resources/techlit/TechLitDocuments/63-0000s/63-2625.pdf. The Honeywell TB8220 page 21 describes "While maintaining setpoint, several factors affect when $2^{nd}$ stage energizes such as load conditions, environmental conditions, P+I control, and home insulation. The second stage energizes when the thermostat senses 1st stage is running at 90% capacity. This operation is droopless control." The Honeywell thermostat uses a patented Proportional plus Integral (P+I) control method to determine when to energize the second-stage cooling (Y2) signal.

U.S. Pat. No. 6,415,617 (Seem 2002) discloses a method for controlling an air-side economizer of an HVAC system using a model of the airflow through the system to estimate building cooling loads when minimum and maximum amounts of outdoor air are introduced into the building and uses the model and a one-dimensional optimization routine to determine the fraction of outdoor air that minimizes the load on the HVAC system.

US Patent Application Publication No. 2015/0,309,120 (Bujak 2015) discloses a method to evaluate economizer damper fault detection for an HVAC system including moving dampers from a baseline position to a first damper position and measuring the fan motor output at both positions to determine successful movement of the baseline to first damper position.

U.S. Pat. No. 7,444,251 (Nikovski 2008) discloses a system and method to detect and diagnose faults in HVAC equipment using internal state variables under external driving conditions using a locally weighted regression model and differences between measured and predicted state variables to determine a condition of the HVAC equipment.

U.S. Pat. No. 6,223,544 (Seem 2001) discloses an integrated control and fault detection system using a finite-state machine controller for an air handling system. The '544 method employs data regarding system performance in the current state and upon a transition occurring, determines whether a fault exists by comparing actual performance to a mathematical model of the system under non-steady-state operation. U.S. Patent Application US20160116177 (Sikora '177) discloses: "A damper controller may be configured to send damper control commands to open and close an outdoor air damper to provide free cooling as necessary to satisfy a temperature setpoint inside the building. In some cases, the damper controller may initiate a damper fault test to determine if a damper fault is present. The damper fault test may be based, at least in part, on an outdoor air temperature input, a discharge air temperature input, a commanded damper position, and a damper fault temperature threshold. If a damper fault is determined, the damper controller may send an alert indicative of a detected damper fault. In some cases, the damper fault test results may be weighted to reduce the false positives alerts."

U.S. Patent Application US20110160914 (Kennett '914) discloses: "A tilt sensor apparatus and method provide sensing and feedback of angular orientation. In preferred embodiments, the tilt sensor apparatus and method of the present disclosure may advantageously be used in an HVAC system to provide feedback on damper position to an HVAC controller."

Carrier. 1995. HVAC Servicing Procedures. SK29-01A, 020-040 (Carrier 1995). The Carrier 1995, page 149-150, describes the "Proper Airflow Method" (pp. 7-8 of PDF) based on measuring Temperature Split (TS), hereinafter referred to as the TS method. The CEC TS method focuses on measuring temperature split to determine if there is proper airflow and does not mention that temperature split can be used to detect low cooling capacity or other faults. The TS method is recommended after the superheat (non-TXV) or subcooling (TXV) refrigerant charge diagnostic methods are performed (pp. 145-149). The TS method was first required in the 2000 CEC Title 24 standards to check proper airflow, but not proper cooling capacity.

Non-patent publication by the California Energy Commission (CEC). 2008. "2008 Residential Appendices for the Building Energy Efficiency Standards for Residential and Nonresidential Buildings. CEC-400-2008-004-CMF." Date: December 2008, Pages 363, Published by the California Energy Commission, 1516 9th St, Sacramento, Calif. 95814 USA (CEC 2008). https://ww2.energy.ca.gov/2008publications/CEC-400-2008-004/CEC-400-2008-004-CMF.PDF. Pages RA3-9 to RA3-24 of the CEC 2008 report provides a Refrigerant Charge Airflow (RCA) protocol disclosed in the Carrier 1995 HVAC Servicing Procedures document and defined in Appendix RA3 of the CEC 2008 Building Energy Efficiency Standards, which is a California building energy code. The Temperature Split (TS) method is used to check for minimum airflow across the evaporator coil in cooling mode per pp. RA3-15, Section RA3.2.2.7 Minimum Airflow. "The temperature split test method is designed to provide an efficient check to see if airflow is above the required minimum for a valid refrigerant charge test." In 2013, the CEC adopted the 2012 Building Energy Efficiency Standards (CEC-400-2012-005-CMF-REV3), and no longer allowed the TS method to check for minimum airflow due to the perceived inaccuracy of the TS method as disclosed in the Yuill 2012 report.

Non-patent publication by Yuill, David P., Braun, James E., "Evaluating Fault Detection and Diagnostics Protocols Applied to Air-Cooled Vapor Compression Air-Conditioners." Date: Jul. 16, 2012, Pages: 11, International Refrigeration and Air Conditioning Conference. Paper 1307. Published by Ray W. Herrick Laboratories, Purdue University, 177 S Russell St, West Lafayette, Ind. 47907 USA (Yuill 2012). http://docs.lib.purdue.edu/iracc/1307. Yuill 2012 evaluated the Refrigerant Charge Airflow (RCA) protocol including the TS method specified in the Appendix RA3 of the CEC 2008 Building Energy Efficiency Standards, which is the California building energy code. Yuill 2012 evaluated the accuracy of correctly diagnosing evaporator airflow faults from −90% to −10% of proper airflow (equivalent to 10% to 90% of proper airflow.) Yuill reported that the TS method was 100% accurate for diagnosing low airflow from −90% to −50% (i.e., 10% to 50% of proper airflow), but the accuracy was unacceptable for diagnosing low airflow from −40% to −10% (i.e., 60% to 90% of proper airflow). Based on the Yuill 2012, the CEC no longer recommends using the TS method for checking "proper airflow" or any other fault. In 2013, the CEC Title 24 standards mentioned the TS method, but did not allow this method to be used for field verification of proper airflow or to check low capacity or other faults. From 2000 through 2020, the CEC has not required using the TS method to diagnose low capacity faults which waste energy.

Non-patent publication by the California Energy Commission (CEC). 2012. "Reference Appendices The Building Energy Efficiency Standards for Residential and Nonresidential Buildings," CEC-400-2012-005-CMF-REV3. Date: May 2012, Pages 476, Published by the California Energy Commission, 1516 9th St, Sacramento, Calif. 95814 USA (CEC 2012). https://ww2.energy.ca.gov/2012publications/CEC-400-2012-005/CEC-400-2012-005-CMF-REV3.pdf. CEC 2012 reference appendices of the building standards page RA3-27-28 require the following methods to measure airflow: 1) supply plenum pressure measurements are used for plenum pressure matching (fan flow meter), 2) flow grid measurements (pitot tube array "TrueFlow"), 3) powered-flow capture hood, or 4) traditional flow capture hood (balometer) methods to verify proper airflow. CEC 2012 required supply plenum pressure measurements to be taken at the supply plenum measurement access locations shown in Figure RA3.3-1. These holes were previously used to measure TS, but TS is not required since the CEC and persons having ordinary skill in the art do not believe the TS method provides useful information.

Non-patent publication by the California Energy Commission (CEC). 2018. "2019 Building Energy Efficiency Standards for Residential and Nonresidential Buildings," CEC-400-2018-006-20-CMF, Date: December 2018, Pages 325, Published by the California Energy Commission, 1516 9th St, Sacramento, Calif. 95814 USA, https://ww2.energy.ca.gov/2018publications/CEC-400-2018-020/CEC-400-2018-020-CMF.pdf (CEC 2018). CEC 2018, page 210 provides the following requirements for economizer controllers. "E. The space conditioning system shall include the following: "A. Unit controls shall have mechanical capacity controls interlocked with economizer controls such that the economizer is at 100 percent open position when mechanical cooling is on and does not begin to close until the leaving air temperature is less than 45 F." This CEC 2018 requirement refers to the thermostat second-stage cooling signal (Y2) input after the economizer has attempted to satisfy the thermostat first-stage cooling signal (Y1). CEC 2018 page 210 also provides the following statement "3. Systems that include a water economizer to meet Section 140.4(e)1 shall include the following: B. Economizer systems shall be integrated with the mechanical cooling system so that they are capable of providing partial cooling even when additional mechanical cooling is required to meet the remainder of the cooling load." An "integrated" economizer system fully opens dampers and operates the fan by itself to attempt to satisfy the thermostat first-stage cooling signal (Y1) without DX AC compressor operation. If the "integrated" economizer cannot satisfy the thermostat first-stage cooling signal (Y1) before the Conditioned Space Temperature (CST) increases by 2 F (default) above the first dead band (or 3 F above the setpoint) AND a minimum time delay of 2 to 60 minutes, then the thermostat second-stage cooling signal (Y2) is energized for the "integrated" economizer to energize the first-stage DX AC compressor. The term "integrated" economizer defines the combination of economizer cooling and DX AC compressor cooling during the thermostat second-stage cooling signal (Y2). The CEC 2018 standards (p. 209, Table 140.4-E) require a High-limit Shut-off Temperature (HST) of 69 F to 75 F based on a climate zone.

R. Mowris, E. Jones, R. Eshom, K. Carlson, J. Hill, P. Jacobs, J. Stoops. 2016. Laboratory Test Results of Commercial Packaged HVAC Maintenance Faults. Prepared for the California Public Utilities Commission. Prepared by Robert Mowris & Associates, Inc. (RMA 2016). The RMA 2016 laboratory study states that the TS method was accurate 90% of the time when diagnosing low airflow (cfm) and low cooling capacity (Btu/hr) faults. Page iii of the RMA 2016 abstract makes the following statement. "The CEC temperature split protocol average accuracy was 90+/−2% based on 736 tests of faults causing low airflow or low capacity." The prior art does not disclose a method or a need to use the TS method to diagnose a low capacity fault based on excess outdoor air ventilation, blocked air filters or coils, low refrigerant charge, restrictions, non-condensables, or other cooling system faults. Due to the poor performance of the TS method for checking low airflow from −10 to −40% as disclosed by Yuill 2012, starting in 2013, the CEC no longer requires using the TS method to check minimum airflow.

U.S. Pat. No. 7,500,368 filed in 2004 and issued in 2009 to Robert Mowris (Mowris '368) discloses a method for correcting refrigerant charge (col 13:1-16). If "the delta temperature split is less than minus the delta temperature split threshold, and the air conditioning system is not a Thermostatic Expansion Valve (TXV) system: computing one of the a refrigerant undercharge and a refrigerant overcharge based on a superheat temperature; if the delta temperature split is less than minus the delta temperature split threshold, and the air conditioning system is the TxV system: computing one of the refrigerant undercharge and the refrigerant overcharge based on subcooling temperature; and adjusting the amount of refrigerant in the air conditioning system based on one of the refrigerant undercharge and the refrigerant overcharge." The Mowris '368 patent discloses a method to compute a refrigerant undercharge or overcharge based on superheat (non-TXV) or subcooling (TXV).

U.S. Pat. No. 8,066,558 (Thomle '558) discloses a method for demand control ventilation to address the issue of temperature sensor failure using an occupancy indicator such that if a temperature sensor measurement is determined to be incorrect, unexpected or otherwise erroneous, the ventilation system can provide an amount of fresh air sufficient for adequate ventilation without over-ventilating a building.

U.S. Pat. No. 8,195,335 (Kreft '335) discloses a method for controlling an economizer of an HVAC system with an outside air stream, a return air stream, and a mixed air stream to provide outdoor air cooling to an HVAC system. The economizer includes one or more controllable outdoor air dampers for controlling a mixing ratio of incoming outside air to return air in the mixed air stream. The control method includes positioning the one or more controllable dampers in first and second configurations such that the mixed air stream has first and second mixing ratios of incoming outside air to return air in the mixed air stream.

U.S. Pat. No. 9,435,557 (Belimo '577) discloses a control unit for an HVAC system comprising an economizer configured to introduce outdoor air into the HVAC system for cooling and/or ventilation purposes where the economizer is controlled by a control unit comprising a base module with: a control circuit, an interface, and first I/O means for connecting at least one sensor of the HVAC system to control circuit for delivering at least one control signal from the control circuit to control the operation of the economizer where the base module is configured to optionally receive at least one extension module, which can be snapped on and electrically connected to the base module for expanding the functionality of the control unit.

R. Hart, D. Morehouse, W. Price. 2006. The Premium Economizer: An Idea Whose Time Has Come. Pages 13. Date: August 2006. Prepared by the Eugene Water & Electric Board and published by the American Council for an Energy Efficient Economy (ACEEE). Washington, D.C. (Hart 2006). See https://www.semanticscholar.org/paper/The-Premium-Economizer%3A-An-Idea-Whose-Time-Has-Come-Hart/3b8311bdf8cb40210ccabd0cec8906bda00d0fec. Hart 2006 discloses five (5) levels of "integrated cooling" where an economizer is "capable of providing partial cooling even when additional mechanical cooling is required to meet the remainder of the cooling load" (ASHRAE 2004, 38). The five levels include: 1) "Non-integrated" where below the changeover, only the economizer operates and above only mechanical cooling operates; 2) "Time-delay integration" economizer operates for a set time beyond which mechanical cooling operates; 3) "Alternating integration" first-stage economizer and second-stage mechanical; 4) "Partial integration" with first-stage economizer and multiple-stage or variable-speed mechanical cooling where economizer dampers reduce outdoor airflow; and 5) "Full integration" with economizer cooling and hydronic chilled-water cooling coil modulated to any cooling output with a differential changeover.

U.S. Pat. No. 5,447,037 (Bishop et al. 037) assigned to American Standard Inc., discloses "A method of utilizing an economizer to reduce the energy usage of a mechanical refrigeration system. The method comprises the steps of: economizing if both cooling demand and the prerequisites to economize are present; measuring economizer capacity; determining if the measured economizer capacity is sufficient to meet the needs of a zone being conditioned; continuing to economize as long as there is both a cooling demand and the prerequisites to economize; and initiating the use of the mechanical cooling system only if the economizer capacity has been determined to be insufficient to meet the needs of the zone being conditioned."

S. Taylor, C. Cheng. Economizer High Limit Controls and Why Enthalpy Economizers Don't Work. 2010 (Taylor 2010). Pages 11. Date: November 2010. ASHRAE Journal. 52. 12-28, Published by the American Society of Heating, Refrigerating and Air-Conditioning Engineers, Inc. (ASHRAE). See https://www.scribd.com/document/390134082/ASHRAE-Why-Enthalpy-Economizers-D on-t-Work-Taylor-Cheng. Page 2 of the Taylor 2010 article describes the economizer is fully "integrated" in the figures and discussion "meaning the economizer and mechanical cooling can operate simultaneously" during the thermostat second-stage cooling signal (as discussed above with respect to the CEC 2018 non-patent publication CEC-400-2018-006-20-CMF). Page 10 of the Taylor 2010 article provides Table 2 "High limit control recommendations for integrated economizers" providing economizer HST values when: OAT exceeds 69 F for climate zones 1A through 5A, OAT exceeds 71 F for climate zones 5 C through 7, OAT exceeds 73 F for climate zones 1AB through 5B, and OAT exceeds 75 F for climate zones 3 C through 8. For each HST control strategy, the "integrated" economizer fully opens dampers and operates the fan by itself to satisfy the thermostat first stage (Y1) call for cooling without operating the first stage DX AC compressor.

U.S. Pat. No. 8,972,064 B2 (Grabinger et al. '064) assigned to Honeywell discloses: "A system incorporating an actuator. The actuator may have a motor unit with motor controller connected to it. A processor may be connected to the motor controller. A coupling for a shaft connection may be attached to an output of the motor unit. The processor may incorporate a diagnostics program. The processor may be connected to a polarity-insensitive two-wire communications bus. Diagnostic results of the diagnostics program may be communicated from the processor over the communications bus to a system controller. If the diagnostic results communicated from the processor over the communications bus to the system controller indicate an insufficiency of the actuator, then an alarm identifying the insufficiency may be communicated over the communications bus to the system controller."

U.S. Pat. No. 4,404,815 (Gilson '815) assigned to Carrier discloses: "An air conditioning economizer control method and apparatus for integrating the operation of the economizer with an air conditioning system is disclosed. An economizer position control arrangement is further disclosed incorporating a rotor locking circuit for maintaining the damper in position against a bias applied by mechanical means such as a spring. A multiple position indicator or multiple temperature sensor is utilized to modulate the position of the damper utilizing the motor for opening the damper, a spring for returning the damper and a rotor locking circuit for maintaining the damper in position. Multiple temperature sensors are also disclosed for making effective use of outdoor air when cooling through economizer operation is available. Staged cooling loads relative to outdoor ambient temperatures are utilized to select the appropriate mode of operation."

U.S. Pat. No. 9,500,382 B2 (Grabinger '382) assigned to Honeywell discloses: "methods and systems for automatically calibrating one or more damper positions of a demand control ventilation system are disclosed. In one illustrative embodiment, a demand control ventilation system includes a damper for controlling a flow of outside air into a building. A controller may be programmed to automatically execute a calibration algorithm from time to time to calibrate one or more calibration damper positions such that a predetermined flow of outside air is drawn through the damper and into the building at each of the one or more calibration damper positions. This calibration can, in some instances, help increase the efficiency and/or utility of the demand control ventilation system." Col. 9, lines 1-14 of the Grabinger '382 disclose an equation and method for modulating a damper position to achieve a Mixed Air Temperature (MAT) based on a % Ventilation rate (also referred to as a percent Outdoor Airflow Fraction or OAF). "(OAT−RAT)x % Ventilation+RAT=MAT {Equation 1} where OAT=Outside air temperature, RAT=Return air temperature, and MAT=Mixed air temperature. During the calibration, the outdoor and/or return air dampers may be repositioned by the controller until the correct ventilation percentage (% Ventilation) is achieved for each minimum and maximum ventilation settings. The controller 302 may then be programmed to interpolate an intermediate ventilation rate, depending on actual, sensed or scheduled occupancy, by modulating between these two calibrated damper positions (or extrapolating beyond the values). This calibration may be performed for each fan speed of fan 119 of the HVAC system 102."

U.S. Pat. No. 9,765,986 B2 (Thomle '986) assigned to Honeywell Inc. discloses: "a Demand Control Ventilation (DCV) and/or Economizer system that is capable of drawing outside air into an HVAC air stream. In some instances, the DCV and/or Economizer system may be configured to help perform one or more system checks to help verify that the system is functioning properly. In some instances, the DCV and/or Economizer system may provide some level of manual control over certain hardware (e.g. dampers) to help commission the system. The DCV and/or Economizer system may store one or more settings and or parameters used during the commissioning process (either in the factory or in the field), so that these settings and/or parameters may be later accessed to verify that the DCV and/or Economizer system was commissioned and commissioned properly."

Non-patent publication by the California Energy Commission (CEC). 2016. "Reference Appendices the Building Energy Efficiency Standards for Residential and Nonresidential Buildings." Date: June 2015. Pages: 503, CEC-400-2015-038-CMF, Published by the California Energy Commission, 1516 9th St, Sacramento, Calif. 95814 USA (CEC 2016). https://ww2.energy.ca.gov/2015publications/CEC-400-2015-038/CEC-400-2015-038-CMF.pdf. The CEC 2016 Reference Appendices of the Building Standards JA6.3 Economizer Fault Detection and Diagnostics (pp. JA6-7 through JA6-12), requires economizer controllers to be capable of detecting the following faults: 1) air temperature sensor failure/fault, 2) not economizing when it should, 3) economizing when it should not, 4) damper not modulating and 5) excess outdoor air. However, the CEC 2016 does not describe methods to diagnose or evaluate these faults. Therefore, an unresolved need remains to develop apparatus and methods for evaluating economizer faults to improve HVAC energy efficiency.

U.S. Pat. No. 6,684,944 (Byrnes et al, 2004) and U.S. Pat. No. 6,695,046 (Byrnes et al, 2004) disclose a variable speed fan motor control for forced air heating/cooling systems using an induction-type fan motor controlled by a controller circuit which is operable to continuously vary the speed of the fan motor during a start-up phase and a shut-down phase of the heating and/or cooling cycle. The Byrnes fan motor controller circuit includes a Return Air Temperature (RAT) sensor and a Supply Air Temperature (SAT) sensor which are operable to control start-up and shutdown of the fan motor over continuously variable speed operating cycles in response to sensed temperature of the air being circulated by the fan. Byrnes does not disclose an economizer controller monitoring a Mixed Air Temperature (MAT) where the MAT is based on a mixture of air at the OAT and the RAT where the MAT varies based on an economizer damper position and the OAT and the RAT.

The Chapman et al. U.S. Pat. No. 7,469,550 ('550) is an energy saving control for appliances via an intelligent thermostat that provides programmatic control over the HVAC system, and provides coordinated control over the appliances via a communications network between the thermostat and appliances. The appliances include occupancy sensors and transmit usage and occupancy information to the thermostat.

The Keating U.S. Pat. No. 5,544,809 ('809) assigned to Senercomm, Inc., provides an apparatus and methods to control an HVAC system for enclosed areas. Selected internal environmental variables in an enclosed area are measured including data from a motion sensor indicating an occupancy status of the area for automatically controlling the operation of the HVAC system. Control settings are made to meet desired temperature and energy consumption levels. A logic algorithm and microcomputer determine humidity levels. The humidity levels are controlled to minimize the occurrence of mold and mildew. Algorithm timing strategies optimize air drying initiated by an occupancy sensor.

The Parker U.S. Pat. No. 5,996,898 ('898) assigned to University of Central Florida, describes a ceiling fan operation control for turning a ceiling fan on and off based on a passive infrared sensor, combined with a temperature sensor to regulate the speed of the fan. The passive infrared sensor, the temperature sensor and controls for both are in a housing directly mounted to the fan motor of the ceiling fan.

The Lutron occupancy sensor wall switch model MS-OPS5M can be used to turn on the lights or an exhaust fan "ON" when occupants enter a room and turn "OFF" the lights or an exhaust fan when the room is vacant. The Lutron wall switch has not been used to control an HVAC fan and does not provide a fault detection diagnostic method to detect, report, and override a fan-on setting fault for an HVAC system. http://www.lutron.com/TechnicalDocumentLibrary/3672236_Sensor_Spec_Guide.pdf Non-patent publication by Ecobee Inc., "How to control your HVAC system's fan with your ecobee thermostat" Date: Jan. 13, 2020, Page 7, Published by Ecobee Inc. 25 Dockside Dr Suite 700, Toronto, ON M5A 0B5, Canada https://support.ecobee.com/hc/en-us/articles/360004798951-How-to-control-your-HVAC-system-s-fan-with-your-ecobee-thermostat. The non-patent publication by Ecobee Inc. describes an intermittent fan-on minimum setting operating on an hourly basis. "If the Fan Min On Time is set for 15 minutes or lower, the fan will operate in two separate segments across the hour; if the Fan Min On Time is set for 20 minutes or higher, the fan will run in four equal segments across the hour. If a heating or cooling cycle operates within any given hour, the length of either cycle will be deducted from the Fan Min On Time. For example, if your cooling runs for 5 minutes and your Fan Min On Time is set to 20 minutes, 5 minutes will be deducted from the Fan Min On Time."

Non-patent publication by Google Inc. "How to Control Your Fan with a Nest Thermostat," Date: Dec. 30, 2019, Pages 1, Published by Google, Inc. 1600 Amphitheatre Parkway, Mountain View, Calif. 94043 USA. https://support.google.com/googlenest/answer/9296419?hl=en
The non-patent publication by Google describes an intermittent fan-on setting operating on an hourly basis.

Non-patent publication by Lawrence Berkeley National Laboratory (LBNL) and Hirsch, J. "DOE-2.2 Building Energy Use and Cost Analysis Program Volume 2: Dictionary," Date: February 2014, Pages: 522, E. O. Lawrence Berkeley National Laboratory Simulation Research Group, Berkeley, Calif. 94720 USA http://doe2.com/download/doe-22/DOE22Vol2-Dictionary_48r.pdf. The DOE-2 building energy analysis program is used to predict the energy use and cost for residential and commercial buildings based on a description of the building layout, constructions, usage, lighting, equipment, and HVAC systems.

Known prior art economizer controllers would position the economizer outdoor air dampers to a minimum position and energize one or more DX AC compressors if: 1) the OAT is 62 F or 1 to 2 F less than the HST (63 F default DRYBLB Set and +/−1 F deadband); or 2) if the OAT is 0 to 1 F greater than the HST (i.e., 69 to 75 F per the CEC-400-2018-020-CMF, p. 209, Table 140-E) or the OAT is greater than or equal to a threshold temperature 2 F below the RAT or the OAT is greater than a reference Differential Temperature High Limit (DTHL).

Known prior art "integrated" (i.e., a combination of economizer cooling and DX AC compressor cooling during the thermostat second-stage cooling signal (Y2)) economizer controllers fully open dampers and operate the fan by itself to attempt to satisfy the thermostat first-stage cooling signal (Y1) without DX AC compressor operation. If the "integrated" economizer cannot satisfy the thermostat first-stage cooling signal (Y1) before the Conditioned Space Temperature (CST) increases by 2 F (default) above the first dead band (or 3 F above the setpoint) AND a minimum first-stage time delay of 2 to 60 minutes, then the thermostat second-stage cooling signal (Y2) is energized for the "integrated" economizer to energize the first-stage DX AC compressor. Compressor operation is delayed until both the thermostat second-stage time delay (default 2 minutes up to 10 minutes) AND the thermostat second-stage temperature deadband (2 F default) have been met.

Known prior art economizer calibration methods disclose an unresolved need for economizer cooling fault detection diagnostics, but fail to provide solutions to resolve the unresolved need to improve economizer calibration and cooling system efficiency.

BRIEF SUMMARY OF THE INVENTION

The present invention provides a solution for an unresolved need to improve cooling equipment efficiency for buildings with a packaged Direct Expansion (DX) Air Conditioning (AC) system, an air economizer, and a thermostat. The Fault Detection Diagnostic (FDD) Cooling Delay Correction (CDC) method efficiently and quickly satisfies a thermostat cooling setpoint, and maintains a consistent indoor temperature for occupants and/or equipment. The FDD CDC method includes an AC Control Temperature (ACT) and a High-limit Control Temperature (HCT). The ACT is used to control when an AC compressor is energized with an economizer cooling and a fully open damper position when the OAT is greater than the ACT. The ACT is also used to control when the AC compressor is de-energized when the OAT is less than or equal to the ACT. The HCT corrects or supersedes a known High-limit Shut-off Temperature (HST). The HST is one type of High-limit Shut-off Control (HSC) value used to control a "changeover" from the economizer cooling (or the economizer cooling plus AC compressor cooling) to the AC compressor cooling. The HST is used by known economizer controllers to enable the economizer cooling with the fully open damper position when the OAT is less than or equal to the HST minus a deadband, typically 1 degree Fahrenheit (F) or 2 F depending on the manufacturer. Temperatures in degrees Fahrenheit are indicated by an "F" directly following a number. The HST is also used to disable the economizer cooling and position the damper to a minimum outdoor airflow and enable AC compressor cooling when the OAT increases to greater than or equal to the HST plus a deadband, typically 0 to 1 F.

The known HST is one type of High-limit Shut-off Control (HSC) value used to control a "changeover" from the economizer-only cooling to the AC compressor-only cooling. Known economizer controllers only enable economizer cooling plus AC compressor cooling, if the economizer receives a thermostat second-stage cooling signal after a thermostat second-stage time delay and/or thermostat second-stage temperature delay. The HSC is selected from the group consisting of: a fixed drybulb temperature where the changeover occurs when the Outdoor Air Temperature (OAT) is greater than the HST, a differential drybulb temperature where the changeover occurs when the OAT increases to greater than a Return Air-drybulb Temperature (RAT), a fixed enthalpy based on a drybulb and wetbulb temperature or relative humidity where the changeover occurs when the Outdoor Enthalpy (OE) is greater than 28 British thermal units (Btu) per pound of air (lbm) (Btu/lbm) corresponding to a curve on a psychometric chart that goes through a point at approximately 75 degrees Fahrenheit (F) and 40 percent (%) Relative Humidity (RH), a differential enthalpy where the changeover occurs when the OE increases to greater than a Return-air Enthalpy (RE), and a dewpoint temperature where the changeover occurs when the Outdoor Dewpoint (OD) is greater than 55 F or OAT is greater than 75 F. The HST or the HCT may be referred to as a "fixed dry bulb" temperature, a "changeover drybulb temperature," a DRYBLB SET (Honeywell), a "Single Dry Bulb Changeover" (Belimo), or a "High Limit Temperature" (Pelican). The present invention FDD CDC method uses the ACT and the HCT as HSC values to correct a default HST value or supersede the known HST values. Other embodiments of the present invention may comprise using other HSC values based on the differential drybulb or dewpoint temperature, the fixed enthalpy, and the differential enthalpy.

The FDD CDC method corrects or supersedes at least one cooling fault and/or time or temperature delay selected from the group consisting of: 1) a default or user-selected HST which is less than the HCT, 2) an economizer HST temperature delay, 3) an economizer HST deadband delay, 4) a thermostat second-stage time delay, 5) a thermostat second-stage temperature delay, 6) a thermostat second-stage temperature deadband delay, 7) an economizer second-stage time delay, and 8) an economizer second-stage temperature delay. The correcting or superseding comprises: energizing an actuator to move a damper to a fully open damper position for a fan to provide an outdoor airflow to enable an economizer cooling and/or energizing an AC compressor otherwise precluded or delayed by the at least one cooling fault and/or time or temperature deadband delay.

The FDD CDC increases an amount of cooling capacity delivered to a conditioned space by a DX AC system with an economizer and a thermostat, the method comprising: correcting at least one cooling fault or superseding at least one cooling delay, the correcting or superseding selected from the group consisting of: correcting or superseding the HST fault or the HST delay at the beginning of or during a thermostat call for cooling based on detecting an Outdoor Air-drybulb Temperature (OAT) is less than or equal to the HCT, wherein the HST fault or the HST delay is selected from the group consisting of: a default or user-selected HST which is less than the HCT, an economizer HST temperature delay, and an economizer HST deadband delay, the correcting or superseding comprising energizing an economizer actuator to move a damper to a fully open damper position for a fan to provide an outdoor airflow to enable an economizer cooling otherwise precluded or delayed by the HST fault or the HST delay, superseding at least one thermostat second-stage delay based on detecting an OAT is greater than the ACT and less than or equal to the HCT at the beginning or during a thermostat call for cooling, wherein the thermostat second-stage delay is selected from the group consisting of: a thermostat second-stage time delay, a thermostat second-stage temperature delay, and a thermostat second-stage temperature deadband delay, the superseding comprising energizing an AC compressor otherwise delayed by the thermostat second-stage delay, and superseding an economizer second-stage delay selected from the group consisting of: an economizer second-stage time delay, and an economizer second-stage temperature delay, wherein the at least one economizer second-stage delay is based on detecting a thermostat second-stage cooling signal, the superseding comprising energizing an AC compressor otherwise delayed by the economizer second-stage delay.

The FDD CDC method wherein the economizer cooling is enabled when the OAT is less than or equal to the HCT at the beginning of or during the thermostat call for cooling, and the economizer cooling is disabled when the OAT increases to greater than the at least one HCT plus a deadband, and wherein the AC compressor is energized when the OAT is greater than the ACT, and the AC compressor is de-energized when the OAT is less than or equal to the ACT. Superseding the at least one cooling delay comprises reducing the at least one cooling delay, wherein the reducing the at least one cooling delay comprises reducing the at least one cooling delay to zero. The known prior art HST deadband delay is 1 F to 2 F below the HST which prevents economizer cooling until the OAT is less than or equal to 1 F to 2 F below the HST. The known prior art does not disable economizer cooling unless the OAT increase to greater than or equal to 0 to 1 F above the HST. The 1 F to 2 F deadband delays below the HST cannot be changed by a user input, and these deadband delays increase cooling energy use by 2.2 to 5.3% depending on climate zone (as shown in FIG. 7).

The HCT may be selected from the group consisting of: a default HCT, a user-selected HCT, a HCT for a climate zone, a Return Air-drybulb Temperature (RAT), the RAT minus a RAT differential. The RAT differential may vary from 0 to 4 F, and the HCT may vary from 69 F to 80 F. The ACT may be based on at least one occupancy indicator selected from the group consisting of: an occupancy sensor signal, a geofencing signal, or an occupancy schedule. The ACT may be selected from the group consisting of: a Variable Economizer-drybulb Setpoint Temperature (VEST), a default ACT, and a user-selected ACT. The VEST may be adjusted based on at least one HVAC parameter selected from the group consisting of: a building occupancy schedule, an occupancy sensor signal, a geofencing signal, a building cooling load, the OAT, the RAT, a Supply Air-drybulb Temperature (SAT), an outdoor air relative humidity, a return air relative humidity, a conditioned space temperature (CST), and a thermostat call for cooling cycle duration including at least one duration selected from the group consisting of: a thermostat first-stage cooling cycle duration, and a thermostat second-stage cooling cycle duration, and an off-cycle duration. The default ACT or the user-selected ACT may vary from 60 F to the HCT.

The thermostat second-stage time delay may also be referred to as a thermostat time delay, and the thermostat second-stage temperature deadband delay may also be referred to as a thermostat deadband delay. The economizer second-stage cooling signal time delay may also be referred to as a economizer second-stage mechanical cooling time delay. Mechanical cooling refers to cooling provided by an AC compressor. The mechanical cooling time delay refers to the time delay after the thermostat second-stage cooling signal has been active, and before the economizer controller turns on the second-stage mechanical cooling (i.e., second-stage) AC compressor. Superseding an economizer HST includes detecting an HST is set too low to allow the economizer actuator to move a damper to a fully open damper position for an HVAC fan to provide a maximum amount of outdoor airflow for cooling when the OAT is greater than a ACT and less than or equal to the HCT. In some embodiments, the HCT might be equal to the Belimo ZIP HST defined as the Single Dry-Bulb Changeover (SDC) temperature which is based on the US ZIP code and ranges from 69 F to 75 F based on US climate zones per the ASHRAE 90.1 Standards. The Belimo ZIP uses the HST to close the economizer dampers and changeover to mechanical AC compressor cooling only typically using the first-stage compressor unless the Belimo ZIP second-stage time delay of 240 seconds or second-stage SAT temperature delay where the SAT is greater than 56.5 plus 1.5 F or 58 F.

The FDD CDC method for a HVAC system with an economizer and thermostat may also be embodied in separate add-on electronic device referred to as an Efficient Economizer Controller (EEC) or a FDD CDC controller. The FDD controller may energize the economizer actuator and AC compressors directly or send a signal to the economizer for the economizer to energize the economizer actuator and the AC compressors.

The FDD CDC method for an HVAC system with an economizer may also be embodied in a smart communicating thermostat wherein the method comprises: detecting the OAT is greater than the ACT and less than or equal to the HCT at the beginning or during a thermostat call for cooling; and superseding at least one thermostat cooling delay selected from the group consisting of: a thermostat second-stage time delay, a thermostat second-stage temperature delay, and a thermostat second-stage temperature deadband delay, the superseding comprising energizing a first-stage cooling signal, and energizing a second-stage cooling signal.

The FDD CDC method may also be embodied in an economizer controller without pre-existing cooling time or temperature delays wherein the method comprises: increasing the amount of cooling capacity delivered by the HVAC system based on detecting at least one condition selected from the group consisting of: detecting the OAT is less than or equal to the HCT at the beginning of or during a thermostat call for cooling and enabling an economizer cooling by energizing an economizer actuator to move a damper to a fully open damper position without the HST temperature or deadband delay; detecting the OAT is greater than the ACT and less than or equal to the HCT at the beginning of or during the thermostat call for cooling without a thermostat second-stage cooling signal and energizing at least one AC compressor without a delay, and detecting the thermostat second-stage cooling signal, and energizing the at least one AC compressor to deliver additional cooling capacity without a second-stage time delay or a second-stage temperature delay. The FDD CDC method for an economizer may also comprise: detecting a thermostat second-stage cooling signal is energized; superseding at least one economizer second-stage delay selected from the group consisting of: an economizer second-stage time delay, and an economizer second-stage temperature delay; and energizing a second-stage AC compressor. Superseding the at least one economizer second-stage cooling signal delay fault may comprise reducing at least one economizer second-stage delay, and the reducing the at least one economizer second-stage delay may comprise the reducing selected from the group consisting of: reducing the economizer second-stage time delay to zero, and reducing the economizer second-stage temperature delay by at least 10 F.

Persons having ordinary skill in the art recognize that when the HVAC system with a known prior art economizer receives a thermostat first-stage cooling signal when the OAT is less than 1 F to 2 F or more below the HST (depending on the manufacturer), the economizer will move the damper to a fully open damper position for the HVAC fan to provide a maximum amount of economizer outdoor airflow to satisfy the thermostat call for cooling without energizing an AC compressor. If the economizer outdoor airflow cannot satisfy the thermostat call for cooling within a thermostat second-stage time delay (2 to 60 minutes) or a thermostat second-stage temperature deadband delay (2 to 10 F), then the thermostat will energize a second-stage cooling signal to satisfy the thermostat call for cooling, and the economizer will energize an AC compressor to provide additional cooling capacity to satisfy the thermostat call for cooling. If the OAT is between 63 F and 75 F, then the outdoor airflow provided by the fully open economizer damper position might not be able to satisfy the thermostat call for cooling when the building is occupied with lighting, equipment and other cooling loads which will cause the Conditioned Space Temperature (CST) to increase by 2 F to 4 F causing the thermostat to provide a second-stage cooling signal for the economizer to energize the AC compressor. This will increase the CST causing thermal comfort issues and cause the AC compressor to operate longer causing increased energy use. A minimum indoor-outdoor temperature difference of about 12 F (75 F CST minus 65 F OAT) is required to satisfy the thermostat call for cooling with only economizer cooling when a building is occupied. If the OAT is greater than the HST and the economizer receives a thermostat second-stage cooling signal, then the known prior art economizer does not energize the second-stage AC compressor for a 4 to 120 minute second-stage time delay. The economizer second-stage time delay will increase the CST by 2 to 10 F causing the AC compressor to operate longer which will increase energy use and decrease occupant thermal comfort.

The FDD CDC method can be embodied in an economizer controller, a smart communicating thermostat, or a separate add-on electronic device referred to as an EEC or FDD controller. The thermostat embodiment of the FDD CDC method can detect the rate of change of the CST with respect to time (dT/dt) increasing and provide a FDD alarm "economizer not cooling" and immediately energize the second-stage cooling Y2 signal to correct this fault. The smart communicating thermostat can access the local OAT (local weather data online) to control the economizer by energizing the first-stage cooling signal and immediately energizing the second-stage cooling signal to provide the FDD cooling delay correction method when the OAT is between an ACT (preferably 63 F) and an HCT (preferably 75 F) or energizing the second-stage cooling signal after a short delay. The local OAT is often lower than the rooftop OAT, but the local OAT will allow a thermostat to determine when to energize a second-stage cooling signal to enable economizer cooling plus AC compressor cooling to improve cooling efficiency and indoor comfort.

Known prior art economizer control methods are 3 to 19% less efficient than the FDD CDC method due to HST deadband delays, thermostat second-stage time or temperature deadband delays, and economizer second-stage time or temperature delays. Known prior art "integrated" economizer controllers only energize the AC compressor after the thermostat second-stage Y2 cooling signal is energized. Known thermostats do not provide a second-stage cooling Y2 signal immediately, and instead wait until a second-stage time delay has expired or wait until the CST increases by 3 F above the setpoint (2 F dead band), to provide a second-stage cooling Y2 signal, or wait to energize the second stage when the thermostat senses 1st stage is running at 90% capacity (Honeywell 2005). Known prior art economizer controllers and thermostats allow the CST to increase by 2 to 4 F above the setpoint which requires AC compressors to operate longer and use more energy to satisfy the call for cooling compared to the FDD CDC method.

A geofencing signal can be used to detect occupancy within a building boundary. A geofence is a location-based signal from a software application using GPS, RFID, WiFi or cellular data to trigger a pre-programmed action when a mobile device, mobile phone, or RFID tag enters or exits a virtual boundary set up around a geographical location, known as a geofence boundary. GPS refers to a Global Positioning System using signals from satellites orbiting the earth to determine a geographic boundary location. RFID refers to Radio Frequency Identification using a form of wireless communication and electromagnetic or electrostatic coupling in the radio frequency portion of the electromagnetic spectrum to uniquely identify the location of an object or person. WiFi refers to a "Wireless Local Area Network (W LAN) based on the Institute of Electrical and Electronics Engineers' (IEEE) 802.11 standards" using radio waves to provide high-speed network and internet connections.

The present invention may also include a Fault Detection Diagnostic (FDD) method to monitor, detect, report, and override a fan-on setting and turn off an HVAC fan controlled by a fan-on setting where the fan-on setting is enabled for longer than a Threshold Fan-on Time (TFT) or the fan-on setting is enabled when a building is unoccupied. The FDD method checks if the fan-on time (F6) is greater than the TFT which will vary depending on monitored HVAC parameters in combination with an occupancy sensor to evaluate building occupancy or a Carbon Dioxide ($CO_2$) sensor to evaluate indoor air quality requirements. As noted above, prior art patents '550, '809, and -898 and the Lutron wall sensor switch use occupancy sensors to turn OFF appliances ('550), the HVAC system ('809), a ceiling fan ('898), or an exhaust fan (Lutron) when a building is unoccupied. However, these prior art patents and products do not detect a fan-on setting, report a fan-on setting, or override a fan-on setting to turn off an HVAC fan. Prior art and persons having ordinary skill in the art do not recognize a fan-on setting as a fault. After the FDD method detects the fan-on setting controlling the HVAC fan to be on by itself when the building is unoccupied or when the fan-on time (F6) is greater than a TFT as shown in FIG. 16, the present invention can generate a FDD alarm fan-on message using a display, an email, a text, or other communication method, and override the fan-on setting to turn off the fan HVAC fan.

The FDD fan-on method comprises monitoring a fan-on setting detecting that the HVAC fan is controlled by a fan-on setting; and performing at least one action selected from the group consisting of: providing a FDD alarm fan-on message; and overriding at least one fan-on setting, the overriding selected from the group consisting of: overriding the fan-on setting and turning off the HVAC fan, overriding an intermittent fan-on setting and turning off the HVAC fan, overriding the intermittent fan-on setting and turning off the HVAC fan for a percentage of the intermittent fan-on setting time period, overriding an intermittent hourly fan-on setting and turning off the HVAC fan for each hour or a percentage of each hour based on a thermostat call for cooling or a thermostat call for heating, and overriding a fan-on setting and turning off the HVAC fan based on a geofencing or an occupancy sensor signal.

The decision to override the fan-on setting can be a user-setting control or an automatic control. A user might need the fan-on setting when the conditioned space is unoccupied for equipment or for air filtration and Indoor Air Quality (IAQ) which can be programmed to operate intermittently. If the FDD method detects intermittent fan-on operation, then the FDD method can override intermittent fan-on operation every other intermittent cycle or override the intermittent fan-on cycle for hours when a thermostat call for cooling or heating occurs to reduce fan energy. Overriding the fan-on setting during unoccupied periods of time is the most energy efficient control method, but most building occupants might want to override the fan-on setting even when the building is occupied to save energy since IAQ and $CO_2$ concentrations can be maintained when the fan operates during the thermostat call for cooling or heating.

Conventional thermostats provide a fan-on setting to operate the fan-on ALWAYS (24×7 continuously) or operate the fan-on AUTO where the HVAC fan only operates only during a thermostat call for cooling or heating. Some smart communicating thermostats provide similar fan-on settings for ALWAYS and AUTO, and also provide an intermittent fan-on setting where the fan-on setting will operate the HVAC fan intermittently for 1 to 24 hours per day (e.g., Nest). Other smart communicating thermostats (e.g., Ecobee) provide an intermittent fan-on setting to operate the HVAC fan for a minimum hourly setting. "If the Fan Min On Time is set for 15 minutes or lower, the fan will operate in two separate segments across the hour; if the Fan Min On Time is set for 20 minutes or higher, the fan will run in four equal segments across the hour. If a heating or cooling cycle operates within any given hour, the length of either cycle will be deducted from the Fan Min On Time. For example, if your cooling runs for 5 minutes and your Fan Min On Time is set to 20 minutes, 5 minutes will be deducted from the Fan Min On Time." The known prior art thermostats do not provide a FDD method to detect, report, and override a fan-on setting to turn off the HVAC fan or reduce an intermittent fan-on setting to reduce or eliminate the number of intermittent fan-on settings for an hourly, daily, weekly, or monthly schedule.

An intermittent fan-on setting operating for only 10 minutes per hour can increase annual fan electricity consumption by about 750 kWh/year for a typical small commercial or residential building. Continuous fan-on settings can increase annual fan electricity consumption by 3000 to 4500 kWh/year for a typical single family home. Continuous or intermittent fan-on settings will also cooling and heating energy use due to increasing the frequency of the thermostat call for a cooling or heating due to increased outdoor airflow through the economizer and ducts (i.e., duct leakage) and increased outdoor airflow through the building shell from infiltration and exfiltration due to fan-induced indoor-outdoor pressure differences. The FDD method can also check geofencing signals and occupancy sensor signals to override the fan-on setting and turn off the fan when a building is unoccupied. The present invention can override each and every fan-on setting to reduce or eliminate a fan-on setting scheduled on an hourly, daily, monthly, or annual basis.

The method for calibrating the economizer controller for an HVAC system comprises: determining a functional relationship between an economizer actuator voltage "x" and a corresponding damper position Outdoor Airflow Fraction (OAF) "y" comprising: measuring the economizer actuator voltage "x" and a corresponding damper position OAF "y" to obtain a set of "y-versus-x" data for at least two damper positions selected from the group consisting of: a closed damper position, at least one intermediate damper position, and a fully open damper position; and calculating coefficients of the functional relationship between the economizer actuator voltage "x" and the corresponding damper position OAF "y" using the set of "y-versus-x" data; and calculating the economizer actuator voltage, "$x_i$", based on the corresponding damper position OAF "y."

The method for calibrating the economizer controller further comprises: measuring the economizer actuator voltage "x" and the corresponding damper position OAF "y" comprising: measuring the economizer actuator voltage "x" and the corresponding damper position OAF "y" when an absolute value of a difference between the OAT and RAT is at least 10 F, where the damper position OAF is defined as a ratio of an outdoor air volumetric flow rate divided by a total HVAC system volumetric flow rate.

The coefficients of the functional relationship between the economizer actuator voltage "x" and the corresponding damper position OAF "y" may be a fit of an Nth order function to N+1 points, for example, at least a first order line fit to two points, but preferably at least a second-order line fit to the set of three "y-versus-x" data points, to calculate the required intermediate economizer actuator voltage, "$x_r$", required for intermediate damper position "$OAF_r$".

The coefficients of the functional relationship between the economizer actuator voltage "x" and the corresponding damper position OAF "y" may also be calculated using a least squares regression equation method involving partial derivatives to minimize residuals for each ordered pair of the set of "y-versus-x" data. The least squares regression equation may be expressed in matrix form using a 3×3 matrix X containing the economizer actuator voltage "x" measurement data, a 3×1 matrix Y containing the corresponding damper position OAF "y" measurement data, and a 3×1 coefficient-matrix C representing the coefficients of the least squares regression equation based on the set of "y-versus-x" data. The matrix descriptors are defined as follows: the matrix X element "x23" refers to the element in row 2, column 3, the matrix Y element "y31" refers to the element in row 3, column 1, and the coefficient-matrix C element "c11" refers to the element in row 1, column 1. With at least three measurements of the economizer actuator voltage "x" and the corresponding damper position OAF "y", the method may include fitting a second order polynomial to the economizer actuator voltage "x" and the corresponding damper position OAF "y". Various methods for curve fitting are suitable, for example, solving three equations in three unknowns.

With at least three (and preferably four or more) measurements of the "y-versus-x" data the least squares regression equation method may comprise: forming a 3×3 matrix X containing exactly one "n" element (x33), n−1 summations of x-values (x23 and x32), n summations of x-values to a power n−1 (x13, x22, x31), n−1 summations of x-values to a power n (x12, x21), and exactly one summation of x-values to a power n+1 (x11); inverting the 3×3 matrix X to obtain a 3×3 inverse-matrix X; forming a 3×1 matrix Y containing one summation of y-values (y31), one summation of x-values times y-values (y21), and one summation of x-values to the power n−1 times y-values (y11); multiplying the 3×3 inverse-matrix X times the 3×1 matrix Y and obtaining a 3×1 regression equation coefficient-matrix C containing coefficients "a" (c11), "b" (c12), and "c" (c13); and calculating the intermediate economizer actuator voltage, "$x_i$", based on a quadratic formula using coefficients "a" (c11), "b" (c12), and "c" (c13) and the intermediate damper position "$OAF_i$" is subtracted from the coefficient "c" (c13).

The method for calibrating the economizer controller may further comprise: measuring the at least three damper positions where the measurement of the intermediate damper position OAF "$y_i$" is made with the actuator control voltage close to a mid-range of the economizer control voltage range, to increase accuracy of the line fit to the set of "y-versus-x" data, to calculate values of the economizer actuator voltage "x", based on the corresponding damper positions OAF "y".

The method for calibrating the economizer controller may further comprise: measuring the set of "y-versus-x" data for the at least three damper positions and at least one fan-motor speed used by the HVAC system selected from the group consisting of: at least one fan-motor speed for the HVAC fan operating by itself, a first-stage cooling fan-motor speed, a second-stage cooling fan-motor speed, a first-stage heating fan-motor speed, a second-stage heating fan-motor speed, and a representative set of fan-motor speeds for a variable-speed fan-motor.

Prior to calibrating the economizer, the method may also comprise reducing uncontrolled economizer outdoor airflow by sealing an economizer perimeter gap between an economizer frame and an HVAC system cabinet using at least one sealing material selected from the group consisting of: an adhesive tape sealant, an adhesive sealant, a mastic sealant, and a weatherstripping. The method for sealing the economizer perimeter gap comprises at least one action selected from the group consisting of: disconnecting the electrical power to the HVAC system; removing the economizer hood; locating the economizer perimeter gap between the economizer frame and the system cabinet where the economizer perimeter gap is generally unsealed to allow easy installation and removal of the economizer from the HVAC system wherein the economizer perimeter gap allows outdoor air to be unintentionally drawn into the HVAC system by a heating or cooling ventilation fan and where the unintended outdoor airflow mixes with a return airflow causing increased heating and cooling loads when the economizer dampers are closed or in a minimum economizer damper position to provide a minimum outdoor airflow to meet a minimum indoor air quality recommendation; cleaning a metal surface on both sides of the economizer perimeter gap between the economizer frame and the system cabinet prior to sealing; applying at least one sealing material selected from the group consisting of: an adhesive tape sealant, an adhesive sealant, a mastic sealant, and a weatherstripping material over or into the economizer perimeter gap between the economizer frame and the system cabinet to reduce uncontrolled outdoor airflow and mixing of the outdoor airflow drawn through the economizer perimeter gap by the heating or cooling ventilation fan with the return airflow; and after the economizer perimeter gap is sealed the method further includes reconnecting the electrical power to the HVAC unit; and reinstalling the economizer hood.

The method may also comprise: monitoring and detecting the economizer damper is open when the OAT is greater than 105 to 115 F, and performing at least one action selected from the group consisting of: overriding an economizer controller actuator voltage control signal based on a geofencing/occupancy signal and closing the economizer damper, and providing a FDD alarm OAT high-limit message via display, text, email, or other message when the short-cycle is detected.

The method may also comprise: monitoring and detecting the economizer damper is open when the OAT is less than an outdoor air low-limit threshold of −20 to 32 degrees Fahrenheit, and performing at least one action selected from the group consisting of: overriding an economizer actuator voltage control signal based on a geofencing/occupancy signal and closing the economizer damper, and providing a FDD alarm OAT low-limit message via display, text, email, or other message when the short-cycle is detected.

The method may also comprise: energizing an HVAC fan control signal and operating an HVAC fan for a variable fan-off delay after a thermostat call for cooling or after a thermostat call for heating where the variable fan-off delay is based on an air temperature difference between a Mixed Air Temperature (MAT) and a Supply Air Temperature (SAT) wherein the MAT is based on a mixture of air at the OAT and the RAT and the MAT varies based on a position of the economizer damper and the OAT and the RAT. Known prior art fan-control methods by Byrnes '944 and '046 disclosed a fan motor controller circuit including a RAT sensor and a SAT sensor which are operable to control start-up and shutdown of the fan motor over continuously variable speed operating cycles in response to sensed temperature of the air being circulated by the fan. However, the Byrnes '944 and '046 did not disclose a system with an economizer with outdoor airflow or an economizer controller monitoring a MAT where the MAT is based on a mixture of air at the OAT and the RAT where the MAT varies based on an economizer damper position and the OAT and the RAT. With an economizer providing a variable amount of outdoor airflow, the RAT can be 5 to 10 F less than the MAT while cooling when the OAT is 95 to 110 F, and while heating the RAT can be 8 to 15 F higher than the MAT when the OAT is 30 to 50 F. Since known prior art fan control methods do not disclose using the air temperature difference between the MAT and the SAT, the present invention variable fan-off control method satisfies an unresolved need.

Furthermore, known prior art economizers do not have an HVAC fan (G) output to energize the HVAC fan. Known fixed HVAC fan-off delays are provided by the on-board HVAC system controls and not the economizer controller, and known fixed fan-off delays are generally less than or equal to 90 seconds long leaving considerable heating and cooling energy in the HVAC system that is wasted. The method for energizing the HVAC fan control signal and operating the HVAC fan for the variable fan-off delay until an absolute value of the air temperature difference between the MAT and the SAT is 4 to 8 degrees Fahrenheit. The thermostat call for cooling is based on at least one signal selected from the group consisting of: the first-stage cooling signal, and a second-stage cooling signal. The thermostat call for heating is based on at least one signal selected from the group consisting of: the first-stage heating signal, and a second-stage heating signal.

The method may also comprise: detecting at least one cooling short-cycle selected from the group consisting of: a thermostat cooling short-cycle, and an AC compressor short-cycle where the AC compressor is turning off prior to satisfying a thermostat call for cooling; and performing at least one action selected from the group consisting of: overriding the thermostat call for cooling and de-energizing the control signal to the AC compressor, and providing a FDD alarm cooling short-cycle message via display, text, email, or other message when the short-cycle is detected.

The method may also comprise: detecting at least one heating short-cycle selected from the group consisting of: a thermostat heating short-cycle, and a heating system short-cycle where the heating system is turning off prior to satisfying a thermostat call for heating; and performing at least one action selected from the group consisting of: overriding the thermostat call for heating and de-energizing the control signal to the heating system, and providing a FDD alarm heating short-cycle message via display, text, email, or other message when the short-cycle is detected.

Known prior art (i.e., Byrnes) fan motor controller circuit includes a RAT sensor and a SAT sensor which are operable to control start-up and shutdown of the fan motor over continuously variable speed operating cycles in response to sensed temperature of the air being circulated by the fan. However, Byrnes (U.S. Pat. Nos. 6,684,944 and 6,695,046) does not disclose an economizer controller microprocessor monitoring a MAT where the MAT is based on a mixture of air at the OAT and the RAT where the MAT varies based on an economizer damper position and the OAT and the RAT. Nor does Byrnes disclose an apparatus or method for a variable fan-off delay (after the thermostat call for cooling or after the thermostat call for heating) based on the absolute value of an air temperature difference between the MAT and the SAT.

The present invention FDD method can detect the following economizer faults listed in the California Energy Commission building standards: 1) air temperature sensor failure/fault, 2) not economizing when should, 3) economizing when should not, 4) damper not modulating, 5) excess outdoor air, 6) economizer dampers stuck in the open, minimum, or closed position, 7) bad or unplugged actuator and 8) actuator mechanically disconnected.

The FDD method may also detect the cooling or heating system not operating properly or not satisfying the call for cooling. The FDD method provides apparatus and/or methods to measure damper position based on inertial sensor measurements combined with data from temperature sensor measurements to perform FDD for economizers to meet the CEC building energy standard requirements.

The invention meets an unresolved need for apparatus and/or methods to detect absolute damper position and/or whether or not an economizer damper is stuck open or stuck closed. The present invention discloses a method to detect the outdoor air damper position using a permanent magnet and a magnetometer to measure the magnetic field of the permanent magnet using a Micro-Electro-Mechanical Systems (MEMS) sensor defined as miniaturized mechanical and electro-mechanical elements (i.e., devices and structures) that are made using the techniques of micro-fabrication. The magnetometer MEMS device is attached to a stationary frame of the economizer and a small permanent magnet is attached to the movable damper and when the damper moves from one position (i.e., closed) to another position (i.e., open) the magnetometer detects the magnitude and direction of the 3-dimensional permanent magnetic field (Gauss) from the magnet and from this information the magnetometer provides a damper position with respect to at least one reference or rotational position within a 3-dimensional coordinate system.

The invention addresses the above unresolved needs by providing apparatus and methods to accurately: 1) measure the outdoor airflow through economizer or non-economizer outdoor air dampers to determine outdoor airflow faults and establish a damper position to meet minimum outdoor airflow requirements without excess outdoor air; 2) measure and use temperature split to diagnose low cooling capacity or other faults; 3) measure and use temperature rise to diagnose low heating capacity or other faults; and 4) measure and use the absolute position of the outdoor air dampers to establish a damper position to meet minimum outdoor airflow requirements without excess outdoor air.

The invention further addresses unresolved needs by providing apparatus and methods to perform FDD of HVAC systems and HVAC economizers based on measuring the OAT, the RAT, the MAT, a SAT, a Heat Exchanger Temperature (HXT), a Refrigerant Temperature (RT), a Refrigerant Pressure (RP), a Relative Humidity (RH) and an outdoor air damper position.

The invention measures and establishes the OAF defined as the ratio of outdoor airflow through the economizer or non-economizer outdoor air dampers (i.e., louvers) and/or cabinet, to the total airflow introduced into the air conditioner evaporator or heat exchanger. The correct economizer damper position can be determined either manually or automatically using an OAF economizer calibration method to meet, but not exceed the ASHRAE minimum outdoor airflow requirements when the OAT is greater than the RAT. Calibrating the economizer controller by determining a functional relationship between an economizer actuator voltage "x" corresponding to a damper position OAF "y" will improve the space cooling efficiency and the space heating efficiency, save energy, and reduce carbon dioxide emissions.

The invention determines the OAF and the mixed-air humidity ratio and mixed-air wetbulb temperature, for packaged and split-system HVAC equipment equipped with economizer or non-economizer outdoor air dampers. An outdoor airflow exceeding the ASHRAE Standard 62.1 minimum outdoor air requirements wastes space cooling and heating energy and increases carbon dioxide emissions contributing to global warming.

The OAF measurements are used for calibrating the economizer controller for an HVAC system by determining a functional relationship between an economizer actuator voltage "x" and a corresponding damper position OAF "y" to determine an intermediate economizer actuator voltage "$x_i$," corresponding to a required intermediate (or minimum) damper position OAF "$y_i$." The required intermediate damper position OAF preferably meets the ASHRAE 62.1 minimum outdoor airflow requirements per the ANSI/ASHRAE 62.1-2019 Standard Ventilation for Acceptable Indoor Air Quality and the California Energy Commission (CEC) Building Energy Efficiency Standards for Residential and Nonresidential Buildings.

After the economizer damper position is verified to be within the accepted tolerance of the required intermediate damper position $OAF_r$ to meet minimum outdoor airflow requirements, the mixed-air wetbulb temperature is determined to measure evaporator entering air drybulb and wetbulb temperatures and supply air drybulb temperature to evaluate temperature split, sensible cooling or heating capacity, and refrigerant charge FDD in order to determine whether or not the evaporator airflow, sensible cooling or heating capacity, and refrigerant charge of the air conditioning system, needs to be adjusted or corrected.

The present invention discloses how measurements of low temperature split are useful for detecting low cooling capacity to meet an unresolved need for a simple and accurate method to diagnose low cooling capacity and alert technicians or occupants about the presence of low cooling capacity faults. Low cooling capacity causes air conditioners to operate longer to satisfy the call for cooling which causes increased energy and peak demand use during the summer cooling season which causes unintended consequences of electric power shortages and increased emissions of carbon dioxide contributing to global warming.

In accordance with another aspect of the invention, there is provided a method for measuring the sensible temperature split across the evaporator in cooling mode or the sensible temperature rise across the heat exchanger in heating mode. The sensible temperature split for cooling, or for temperature rise for heating, can be used to evaluate over ventilation, airflow, sensible cooling capacity, sensible heating capacity, and/or refrigerant charge FDD information.

In accordance with another aspect of the invention, there is provided a method to use sensors to transmit temperature or humidity measurement data using wires or wirelessly to a device or controller in order to display, store, or use the data to measure the OAF or to provide measurement data to an economizer controller or outdoor air damper controller where the controller uses the data to calculate the measured OAF and compares the measured OAF to a minimum outdoor airflow specification for a building conditioned space and occupancy, and communicates a low-voltage signal to an actuator to energize the actuator to adjust the damper position to establish an optimally minimum damper position to provide an OAF within tolerances of the minimum outdoor airflow based on requirements for a building occupancy.

In accordance with another aspect of the present invention, the measured damper position based on the permanent-magnet magnetic field damper position measurements can be combined with data from temperature sensor measurements to detect the following economizer faults listed in the California Energy Commission Title 24 building standard which require fault detection diagnostics for economizers: 1) economizer dampers stuck in the open, minimum, or closed position, 2) bad or unplugged actuator, 3) sensor hard failure, 4) actuator mechanically disconnected, 5) air temperature sensor failure/fault, 6) not economizing when should, 7) economizing when should not, 8) damper not modulating, or 9) excess outdoor air. The present invention can also perform FDD of the cooling or heating system not operating properly or delivering less than optimal performance and FDD cooling delay correction to increase cooling capacity and efficiency.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 5 provides a chart showing the OAF versus the economizer control voltage on an HVAC system according to the present invention.

FIG. 6 shows a table of damper position data, and equations 7, 9, 11, and 19, according to the present invention.

FIG. 7 provides calculations of the FDD CDC savings from correcting the default 62 F HST and superseding the HST deadband delay fault.

FIG. 8 provides calculations of the FDD Cooling Delay Correction (CDC) savings when the building is occupied.

FIG. 9 provides calculations of the FDD CDC savings when the building is unoccupied.

FIG. 12 provides a table of laboratory measurements of the total power (Watts), sensible cooling capacity (Btu per hour, Btuh), sensible Energy Efficiency Ratio (EER) (EER*s equal to Btuh divided by Watts), and energy savings for a packaged HVAC system with two compressors, a first-stage and a second-stage, and an economizer.

FIG. 13 provides cooling savings versus OAT for the packaged HVAC system for OAT ranging from 55 to 100 F.

Corresponding reference element numbers indicate corresponding components throughout several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined based on the claims.

Where the terms "about" or "generally" are associated with an element of the invention, it is intended to describe a feature's appearance to the human eye or human perception, and not a precise measurement, or within 10 percent of a stated value. Drybulb temperature measurements at indicated without asterisks and corresponding wetbulb temperatures are indicated by the addition of an asterisk. As noted previously, temperatures in degrees Fahrenheit are indicated by an "F" directly following a number.

Figure 1:
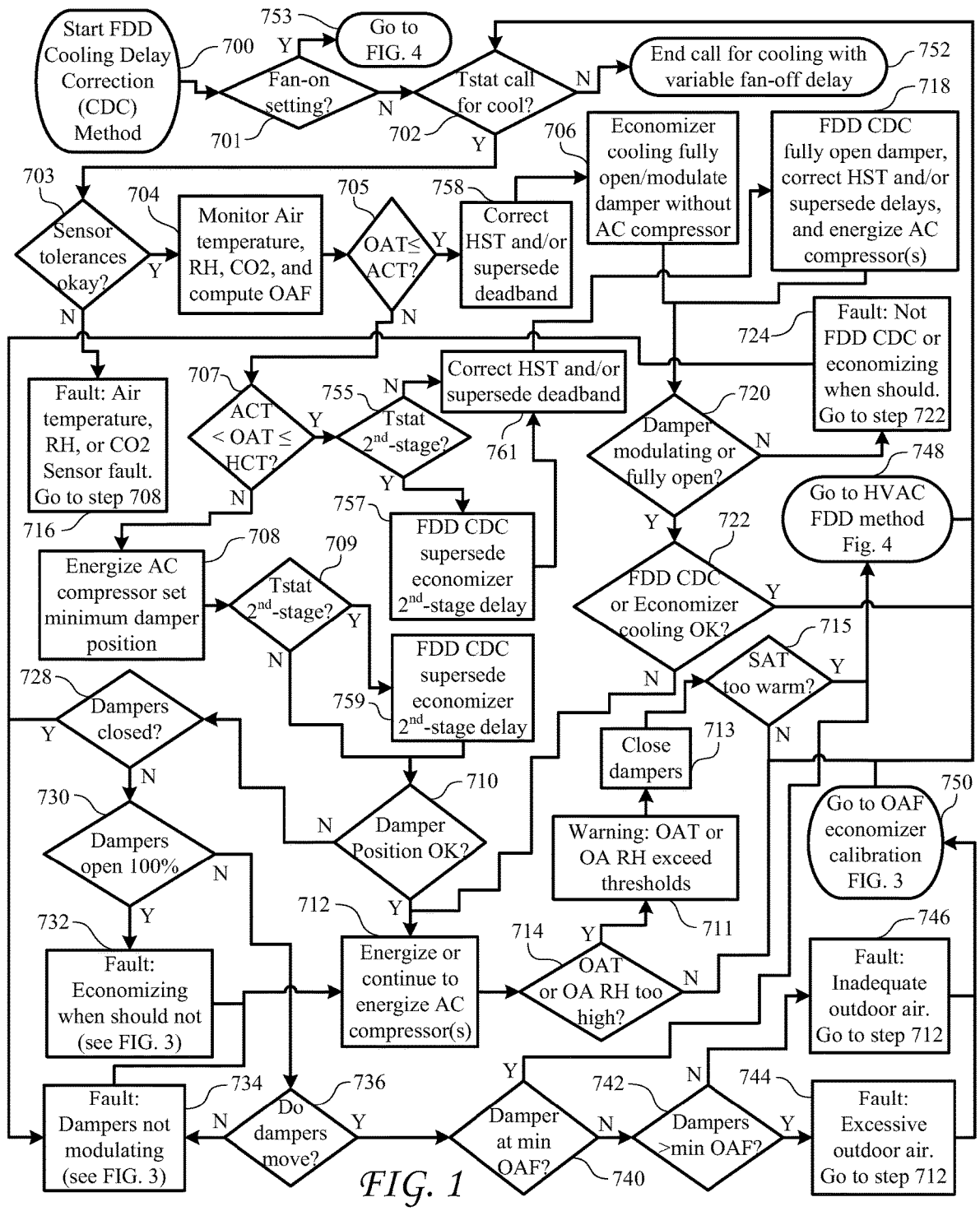
FIG. 1 shows a flow chart according to the present invention of: 1) FDD cooling delay correction (CDC) method; 2) conventional economizer cooling; 3) DX AC cooling; and 4) a variable fan-off delay based on HVAC parameters. The method includes a permanent-magnet and magnetometer or other MEMS device to measure the physical position of the dampers and air temperature, RH, and CO2 sensors to control the economizer, AC compressor(s), and measure the Outdoor Airflow Fraction (OAF).

FIG. 1 provides a flow chart for the present invention FDD CDC method to improve energy efficiency for a Heating, Ventilating, Air Conditioning (HVAC) system with an economizer and a thermostat by fully opening an economizer damper and simultaneously energizing a DX AC system (including the first-stage DX AC compressor and HVAC fan) based on receiving a first-stage cooling signal from a thermostat when the OAT is greater than the ACT and the OAT is less than or equal to the HCT. The FDD method may also comprise calibrating the economizer by sealing an economizer perimeter gap to reduce uncontrolled outdoor airflow, and determining a functional relationship between the economizer actuator voltage and a corresponding damper position OAF using a line-fit equation or least squares matrix regression equation (discussed in FIG. 5 and FIG. 6). The FDD method detects, reports, corrects, and supersedes economizer and HVAC faults including: an economizer deadband delay, a thermostat second-stage time or temperature deadband delay, an economizer second-stage mechanical cooling time delay or temperature delay, a cooling or heating short-cycle fault, fan-on setting fault, a sensor/damper/actuator fault, and an insufficient or excess outdoor air fault.

The FDD method includes operating an HVAC fan for a variable fan-off delay after a thermostat call for cooling or heating based on a difference between a MAT and a SAT, where the MAT is based on an economizer damper position and an HVAC fan operating and providing a mixture of an outdoor airflow at an OAT and a return airflow at a RAT. The FDD method for overriding an economizer actuator control signal may be based on a geofencing/occupancy signal, and closing the economizer damper when the OAT conditions are above/below an OAT threshold temperature.

The method uses a magnetometer, MEMS sensor, or other suitable sensor to measure the physical damper position and determine whether or not there is a fault with the economizer damper position actuator mechanism. The method determines a computed OAF with respect to a damper position command or the economizer actuator voltage command (i.e., closed, intermediate, or fully open position) where the computed OAF is based on the ratio of the difference between the RAT minus the MAT divided by the difference between the RAT minus the OAT. The computed OAF may also be based on humidity or CO2 measurements.

FIG. 1 step 700 is the start of the FDD Cooling Delay Correction (CDC) method which detects, supersedes, and corrects: 1) an HST deadband delay, 2) a thermostat second-stage time delay or a thermostat second-stage deadband temperature delay; and 3) an economizer second-stage cooling signal time delay. In step 701, the method checks if the fan-on setting is enabled. If step 701 is Yes (Y), then the method proceeds to step 753 to Go to FIG. 2 FDD HVAC Methods. If step 701 is No (N), then the method proceeds to step 702 to check if there is a thermostat call for cooling. In step 702, the method monitors signals from the thermostat to determine if there is a thermostat call for cooling. If the thermostat call for cooling has ended at step 702, then the method proceeds to step 752, and at end of thermostat call for cooling provides a variable fan-off delay based on at least one HVAC parameter selected from the group consisting of: a thermostat call for cooling, a cooling cycle duration P4, a thermostat call for heating, a heating cycle duration P3, and an air temperature difference between the MAT and the SAT where the MAT is based on a mixture of outdoor air and return air. If step 702 call for cooling is Yes (Y), then the method proceeds to step 703.

At step 703 of FIG. 1, the FDD method determines if the air temperature, RH, CO2 sensors, and the magnetometer MEMS device are within expected tolerances. If step 703 is No (N), one or more sensors are an open circuit or a short circuit, then the method proceeds to step 716 to flag this fault and provide a FDD alarm "Fault: air temperature, RH, or CO2 sensor failure/fault" for sensors not working. If the OAT and RAT sensors are okay and step 703 is Yes (Y), then the method proceeds to 704. Otherwise, if the OAT and RAT sensors are faulted and the economizer controller cannot function, then the method continues to step 716 and on to step 708 (see below).

At step 704 the method continuously monitors sensors to measure the OAT, RAT, and MAT and compute the OAF (described above). After step 704, the method proceeds to step 705. At step 705 the method checks if the OAT is less than the AC Control Temperature (ACT) or Variable Economizer-drybulb Setpoint Temperature (VEST). The ACT (or VEST) is based on at least one occupancy indicator selected from the group consisting of: an occupancy sensor signal, a geofencing signal, or an occupancy schedule (see previous description). The VEST may be adjusted up or down to allow conventional economizer cooling with the HVAC fan operating and fully open damper position to satisfy the call for cooling. During unoccupied periods with fewer people in the building and less of lights/equipment turned on, the VEST can be adjusted up to allow more economizer cooling to satisfy the call for cooling without AC compressor operation (i.e., preferably OAT<66 to 69 F).

If step 705 is Yes (Y), and the OAT is less than or equal to the ACT which may be the VEST, then the method proceeds to step 758. At step 758, the FDD CDC method corrects a default High-limit Shut-off Temperature (HST) and/or supersedes the HST deadband temperature (1 F or 2 F deadband or default 62 F HST) to fully open the damper. After step 758, the method proceeds to step 706. At step 706, the method provides economizer cooling with the damper fully open (or modulated during cold weather) using the HVAC fan without the first-stage DX AC compressor. If the thermostat call for cooling is not satisfied within a 2 to 60 minutes AND the CST increases by 3 F above the setpoint (or 2 F deadband above upper differential), then the thermostat second-stage cooling signal (Y2-I) is energized and the known prior art economizer controller will energize the first-stage signal (Y1) to energize the first-stage DX AC compressor. Energizing the first-stage signal (Y1) to operate the DX AC system (including the first-stage DX AC compressor and HVAC fan) will only happen if the economizer receives the thermostat second-stage cooling signal (Y2) signal.

If step 705 is No (N), OAT is not less than or equal to the AC control temperature, then the method proceeds to step 707. At step 707, the FDD CDC method detects whether or not the OAT is greater than the ACT and the OAT is less than or equal to the HCT at the beginning of or during a call for cooling. Alternatively, at step 707, the FDD CDC method detects whether or not the OAT is less than or equal to the HST at the beginning of or during a thermostat call for cooling, and if Yes (Y).

If step 707 is Yes (Y), then the FDD CDC method proceeds to step 755 and determines whether or not the thermostat second-stage cooling signal is energized. If step 755 is No (N), the thermostat second-stage cooling signal is not energized, then the FDD CDC method proceeds to 761 and corrects the HST fault (default or user-selected HST setting below the HST or the HCT) and/or supersedes the HST deadband delay and fully opens the damper to enable the economizer cooling otherwise precluded or delayed by the HST fault or the HST delay. After step 761, the FDD CDC method proceeds to step 718. If step 755 is Yes (Y), the method proceeds to step 757.

At step 757, the FDD CDC method supersedes an economizer-second-stage time delay and proceeds to step 761. At step 761 the FDD CDC method corrects the default HST and/or supersedes the HST deadband (1 or 2 F HST deadband or default 62 F HST) which prevent the damper from fully opening. After step 761, the method proceeds to step 718.

At step 718, the FDD CDC method corrects the at least one fault or supersedes the at least one delay selected from the group consisting of: an HST fault, an HST deadband delay, a thermostat second-stage time delay, a thermostat second-stage temperature deadband delay, an economizer second-stage time delay, and an economizer second-stage time temperature delay, wherein the at least one fault or at least one delay is used to determine when to energize the economizer cooling or at least one AC compressor (i.e., first-stage or second-stage). The correcting or superseding comprises: energizing an economizer actuator to move a damper to a fully open damper position for an HVAC fan to provide the economizer cooling and energizing at least one AC compressor selected from the group consisting of: a first-stage AC compressor (Y1), and a second-stage AC compressor (Y2) otherwise precluded or delayed by the at least one fault or the at least one delay.

If step 707 is No (N), where the OAT is greater than the HCT, then the method proceeds to Step 708. At step 708, the FDD CDC method energizes the first-stage AC compressor and sets the damper to a minimum position to provide a minimum outdoor airflow to the conditioned space to satisfy the ASHRAE 62.1 minimum Indoor Air Quality (IAQ) requirements. Optionally, the FDD method may command the economizer actuator to modulate the damper position from a closed to fully open damper position based on a Demand Control Ventilation (DCV) control comparing a $CO_2$ concentration measurement to an indoor air $CO_2$ control threshold. The $CO_2$ control threshold is typically 1200 ppm (per ASHRAE 62-2019, page 38 "maintaining a steady-state $CO_2$ concentration in a space no greater than about 700 ppm above outdoor air levels will indicate that a substantial majority of visitors entering a space will be satisfied with respect to human bioeffluents (body odor). $CO_2$ concentrations in acceptable outdoor air typically range from 300 to 500 ppm." 1200 ppm $CO_2$ threshold equals 700 ppm above the 500 ppm outdoor $CO_2$ concentration). After step 708, the FDD CDC method proceeds to step 709.

At step 709, the FDD CDC method determines whether or not the thermostat second-stage cooling signal is energized. If step 709 is No (N), the thermostat second-stage cooling signal is not energized, then the FDD CDC method proceeds to step 710 to check whether or not the damper position sensor indicates the dam per position is OK and at the correct position or stuck in a different position (see below).

If step 709 is Yes (Y), the thermostat second-stage cooling signal is energized, then the FDD CDC method proceeds to step 759 and supersedes the economizer-second-stage time delay and for an HVAC system with two (or more) AC compressors (first-stage, second-stage, etc.). At step 759, for an HVAC system with two (or more) AC compressors (first-stage, second-stage, etc.), the FDD CDC method supersedes the economizer second-stage cooling signal time delay which prevents the thermostat second-stage cooling signal from energizing the 2nd-stage AC compressor (or higher stages). At step 759, the FDD CDC method may comprise superseding the second-stage cooling signal time delay by reducing the economizer second-stage cooling signal time delay, and in some instances, setting the economizer second-stage cooling signal time delay to zero.

At step 710, the FDD CDC method checks if the damper position is okay and within +/−5% of the commanded position as determined by a magnetometer MEMS sensor checking if the dampers are in the correct position (within +/−5%)? If step 710 is Yes (Y), and the dampers are at the minimum position, the method proceeds to step 712 and continues to energize the AC compressor. If step 710 is No (N), where the magnetometer MEMS device indicates an incorrect damper position, then the method proceeds to step 728. If step 728 is Yes (Y), the dampers are in the closed position, then the method proceeds to step 734 to provide a FDD alarm "Fault: dampers not modulating." From step 734, the method loops back to step 712 to continue economizer cooling. If step 728 is No (N), the magnetometer MEMS device indicates the dampers are not in a closed position, then the method proceeds to step 730.

If step 730 is Yes (Y), the magnetometer MEMS device indicates the dampers are 100% open, then the method proceeds to step 732 and provides a FDD alarm "Fault: economizing when should not (see FIG. 3)" for maintenance, and proceeds to step 712 during the call for cooling. The FDD alarm in step 732 is discussed in FIG. 3. If step 730 is No (N), the dampers are not 100% open the method proceeds to step 736. If step 736 is No (N), the dampers did not move, then the method proceeds to step 734 and provides a FDD alarm "Fault: dampers not modulating (see FIG. 3)" and proceeds to step 712 during a call for cooling. The FDD alarm in step 734 is discussed in FIG. 3. If step 736 is Yes (Y), the method proceeds to step 740.

If step 740 is No (N), the damper position is not at the minimum OAF position, then method proceeds to step 742. If step 742 is Yes (Y), the damper position is greater then the minimum position, then the method proceeds to step 744 and provides a FDD alarm "Fault: excessive outdoor air" entering the conditioned space for maintenance, and proceeds to step 750 to the OAF economizer calibration method FIG. 3 to correct this fault in the future when the thermostat is not calling for cooling. During a current thermostat call for cooling, the FDD method proceeds from step 744 to step 712 to continue the cooling process. If step 740 is Yes (Y), the method proceeds to step 748 "Go to HVAC FDD method" (FIG. 4) and loops back to step 702 to continue "thermostat call for cooling." With the AC compressor(s) on and damper in minimum position, the dam. If step 742 is No (N), the damper position not greater than the minimum OAF damper position, then the method proceeds to step 746 to provide a FDD alarm "Fault: inadequate outdoor air" for maintenance, proceeds to step 750 to the OAF economizer calibration method FIG. 3 to correct this fault and proceeds to step 702 to continue "thermostat call for cooling." During a current call for cooling, the FDD method may also proceed from step 746 to step 712 (skips previous FDD steps already performed) to continue energizing the first-stage cooling signal Y1 to energize the AC system (including the first-stage DX AC compressor and HVAC fan). If the thermostat second-stage cooling signal (Y2) is active, then the method energizes the second-stage cooling signal Y2 (to energize the second-stage AC compressor and second-stage cooling fan-motor speed, if applicable) and the method proceeds to step 714.

Figure 17:
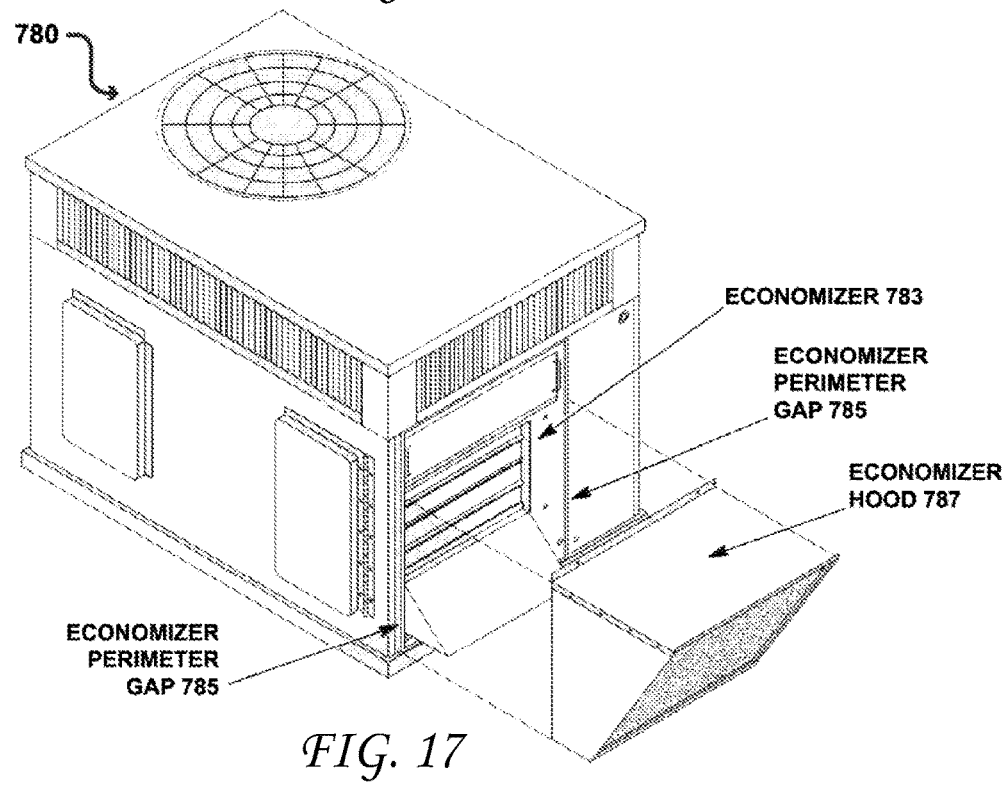
FIG. 17 shows the economizer 783 installed into an HVAC system cabinet 780 showing an economizer perimeter gap 785 of an economizer frame where it connects to the HVAC system cabinet and the economizer hood 787 temporarily removed to allow the economizer perimeter gap 785 to be sealed.

If step 714 is No (N), where OAT and OA RH are not too high (i.e., OAT greater than 105 to 115 F or OA RH greater than 80 to 90%), then the method loops back to 702 to continue cooling until the thermostat call for cooling is satisfied. If step 714 is Yes (Y), then the method goes to step 711 and provides a: "FDD alarm or warning message OAT, outdoor air relative humidity, or outdoor air enthalpy greater than the outdoor air high-limit threshold" and the method proceeds to 713. At step 713, the method closes the dampers by overriding the economizer actuator voltage control signal based on a geofencing or an occupancy sensor signal (OCC). Closing the economizer dampers during hot weather improves comfort, reduces energy use, and meets the 10% minimum outdoor airflow requirements specified for most building occupancies in the ASHRAE 61.1-2019 Standard Ventilation for Acceptable Indoor Air Quality (discussed above). After step 713, the method proceeds to step 715. The method for method for sealing the economizer perimeter gap is shown in FIG. 17.

Figure 2:
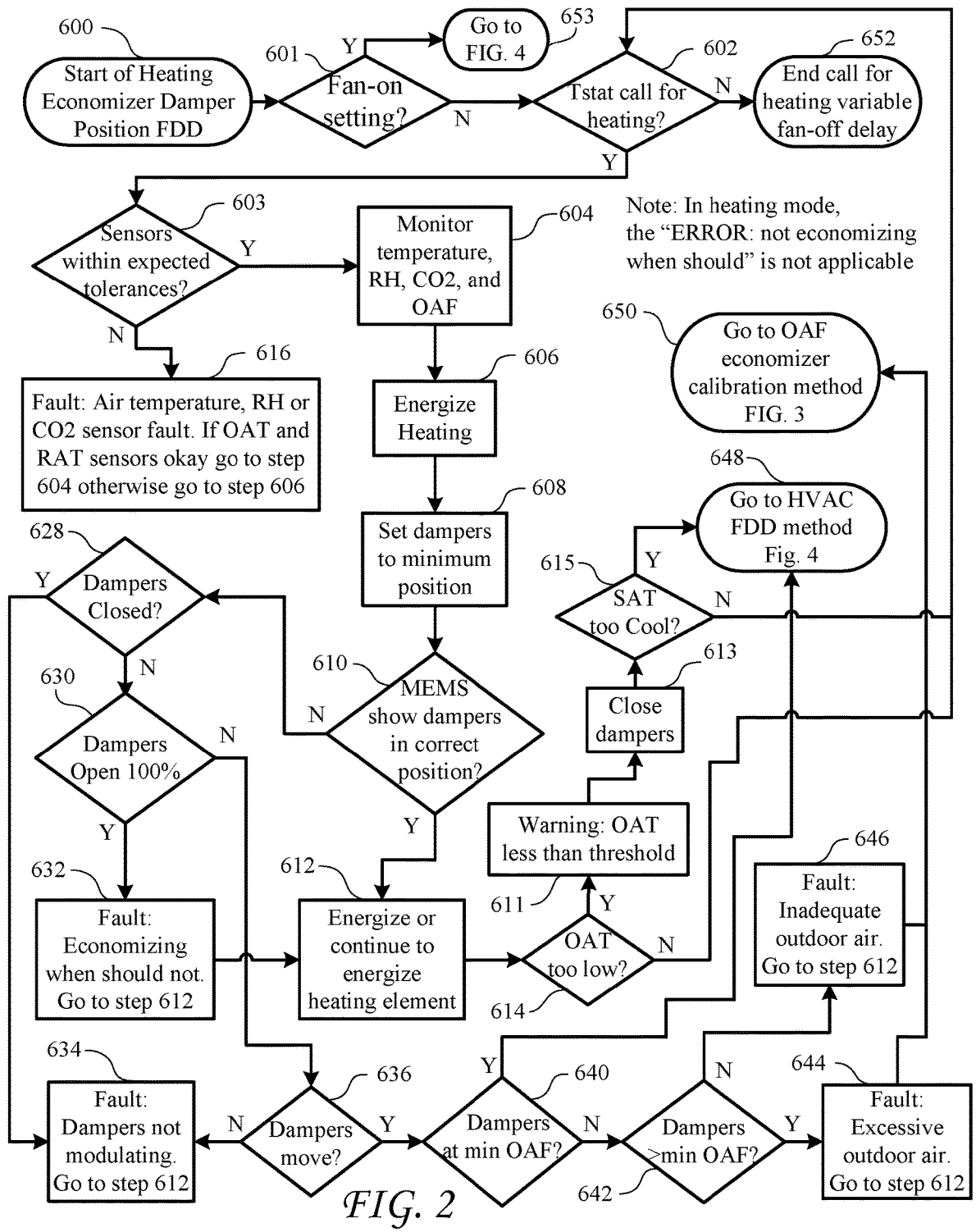
FIG. 2 shows a flow chart according to the present invention of a FDD method during a thermostat call for heating. The method includes a magnetometer or other MEMS device to measure the physical position of the economizer dampers and air temperature, RH, and CO2 sensors to control the economizer and measure the OAF.

At step 715, the FDD method checks if the SAT is too warm (i.e., above 65 F) based on monitoring the SAT using the temperature sensor 32 shown in FIG. 1 and FIG. 2. If step 715 is No (N) the SAT is not too warm indicating the DX AC compressor is able to meet the SAT temperature requirement, then the method loops back to 701 to continue cooling until the thermostat call for cooling is satisfied. If step 715 is Yes (Y), then the method proceeds to step 748 to go to the FDD Evaluation Method FIG. 4 to determine if another cooling fault is causing the SAT to be too warm. The FDD Evaluation Method is performed in real-time and will provide maintenance personnel with FDD alarms if the sensors are okay in step 716.

After step 718 (FDD CDC fully opens economizer with HVAC fan and AC compressor(s)) or after step 706 (economizer cooling with the HVAC fan), the method continues to step 720. At step 720, the magnetometer MEMS sensor checks if the economizer damper is fully open or modulating? If step 720 is No (N), then the FDD CDC method proceeds to step 724 and provides a FDD alarm "Fault: not FDD CDC or economizing when should." The method then loops back to step 722 to continue the economizer or FDD CDC method with whatever damper position is provided.

If step 720 is Yes (Y), the magnetometer MEMS sensor shows dampers are fully open or modulating properly, then the FDD CDC method proceeds to step 722.

If step 722 is Yes (Y), the OAT is less than the RAT or the HCT and the OAT is greater than the LEST or VEST and the thermostat first-stage cooling signal (Y1) is active with no thermostat second-stage cooling signal (Y2), then the FDD CDC method loops back to step 701 and continues to provide FDD CDC until the thermostat call for cooling is satisfied (i.e., no thermostat Y1 or Y2 signals).

If step 722 is No (N), the OAT is greater than RAT or the economizer controller receives a thermostat second-stage cooling signal (Y2) where the CST is 2 F (default) above the first-stage thermostat differential (3 F above the setpoint) AND the timer from 2 to 60 minutes has been reached, then the method proceeds to step 712 to energize or continue to energize the first-stage (or second-stage) AC compressor cooling and the FDD cooling delay correction method proceeds to step 714.

In some embodiments, the method includes providing FDD alarms regarding faults. In some embodiments the method communicates FDD alarms using wired or wireless communication to display fault codes or alarms on the present invention apparatus through a built-in display or external display through wired or wireless communication signals to a building energy management system, standard thermostat, WIFI-enabled thermostat, internet-connected computer, internet telephony system, or smart phone indicating maintenance requirements to check and correct damper position, evaporator airflow and/or refrigerant charge of the air conditioning system.

FIG. 2 shows the heating economizer damper position FDD method using a magnetometer or other MEMS device to measure the physical position of the dampers and determine if there is a fault with the economizer damper positioning mechanism. The FDD process involves positioning the dampers to a fully closed position, intermediate position, and fully open damper position and the MEMS device is sampled to measure and store these positions. As the dampers modulate between the fully closed and fully open positions, the MEMS device provides an angular value and the physical position of the dampers can be calculated.

Step 600 is the start of the heating economizer damper position FDD method. In step 601, the method checks if the fan-on setting is enabled. If step 601 is Yes (Y), then the method proceeds to step 653 to Go to FIG. 4 FDD HVAC Methods. If step 601 is No (N), then the method proceeds to step 602 to check if there is a thermostat a call for cooling. If step 602 is No (N), the thermostat call for heating has ended, then the method proceeds to step 652 and after a thermostat call for heating, the method provides a variable fan-off delay based on HVAC parameters where at least one HVAC parameter includes operating the fan for a variable fan-off delay after a heating cycle based on the absolute value of the air temperature difference between the SAT and the MAT wherein the MAT is based on a mixture of outdoor air and return air. At step 602, if Yes (Y), there is a thermostat call for heating, then the method proceeds to step 603.

Step 603 determines if the air temperature, RH, CO2 sensors, and the magnetometer MEMS device within expected tolerances or failed/faulted. Step 603 continuously monitors the OAT, MAT, RAT, RH, and CO2, and computes the OAF based on air temperature, RH, or CO2 measurements.

If step 603 is No (N), then the method proceeds to step 616 to flag this fault and provide a FDD alarm "Fault: air temperature, RH, or CO2 sensor failure/fault" for sensors not working. If the OAT and RAT sensors are okay, then the FDD method proceeds to step 604. Otherwise, if the OAT and RAT sensors are faulted and the economizer controller cannot work properly, then the FDD method continues to step 606 to energize the heating system.

If step 603 is Yes (Y), then the method proceeds to continuously monitor the OAT, MAT, and RAT air temperature, RH, and CO2 sensors, and compute the OAF based on sensor measurements of air temperature, RH, and CO2 concentration.

In step 606, the method energizes the heating system and the method proceeds to step 608. In step 608, the economizer positions the dampers to the minimum position to provide a minimum amount of outdoor air to the conditioned space to satisfy the ASHRAE 62.1 minimum IAQ requirements or Demand Control Ventilation (DCV) based on carbon dioxide thresholds (typically ~1000 ppm per ASHRAE 62.1-2019). The method then proceeds to step 610.

Step 610 uses the magnetometer MEMS device to determine if the actuator responded by positioning the damper to the correct minimum position. This will be indicated by the MEMS device providing an angular reading that the dampers have been positioned to the minimum position. If the dampers are at the minimum position, the method proceeds to step 612 and heating continues to be enabled. If the MEMS device indicates an incorrect damper position, then the method proceeds to step 628.

If step 628 is (Y) the dampers are in the closed position, the method proceeds to step 634 and the economizer provides a FDD alarm "Fault: dampers not modulating." If step 628 is No (N), the dampers are not in a closed position, then the method proceeds to step 630. If step 630 is Yes (Y), the dampers are 100% open, the method proceeds to step 632 and provides a FDD alarm "Fault: economizing when should not."

If step 630 is No (N), the dampers are not 100% open, then the method proceeds to step 636. If step 636 is No (N), the dampers did not move, then the method proceeds to step 634 and the economizer provides a FDD alarm "Fault: dampers not modulating." If step 636 is Yes (Y), the dampers move, then the method proceeds to step 640. If step 640 is Yes (Y), the dampers are the minimum position, then the method proceeds to step 648 to go to the FDD evaluation method FIG. 4.

If step 640 is No (N), the dampers are not at the minimum position, then method proceeds to step 642. If step 642 is Yes (Y), the damper position is greater then the minimum position, then the method proceeds to step 644 and provides a FDD alarm "Fault: excessive outdoor air" entering the conditioned space and proceeds to step 650 to go to the OAF economizer calibration method FIG. 3 to correct this fault. If step 642 is No (N), the dampers are less than the minimum position, then the method proceeds to step 646 and provides a FDD alarm "Fault: inadequate outdoor air" and proceeds to step 650 and to FIG. 3 of the OAF economizer calibration method to correct this fault.

After step 610 the method proceeds to step 612 to enable or continue enabling the heating element and proceeds to step 614. If step 614 is Yes (Y) the economizer low limit setpoint OAT is too low during heating (OAT less than −20 F to 32 F), then the method goes to step 611 and provides a: "FDD alarm or warning: OAT less than the outdoor air low-limit threshold" and the method proceeds to 613 to close the dampers by overriding the actuator voltage control signal based on a geofencing or occupancy sensor signal (OCC). If step 614 is No (N), the method returns to step 602.

At step 613, the microprocessor overrides the economizer actuator voltage control signal based on a geofencing or occupancy sensor signal (OCC) and closes the dampers. The method closes the economizer dampers to reduce excess outdoor airflow from entering the mixed air chamber to satisfy the thermostat call for heating and save energy. After step 613, the method proceeds to step 615.

If step 615 is Yes (Y), the SAT is too cool (i.e., below 105 F or Temperature Rise [TR] less than 30 F), then the method proceeds to step 648 to go to the FDD Evaluation Method FIG. 4 to determine if another heating fault is present. If step 615 is No (N), the SAT is above hot (i.e., above 105 F or TR greater than 30 F) and the heating system is able to meet the SAT minimum requirement, then the method loops back to 602 to continue heating until the thermostat call for heating is satisfied.

Figure 3:
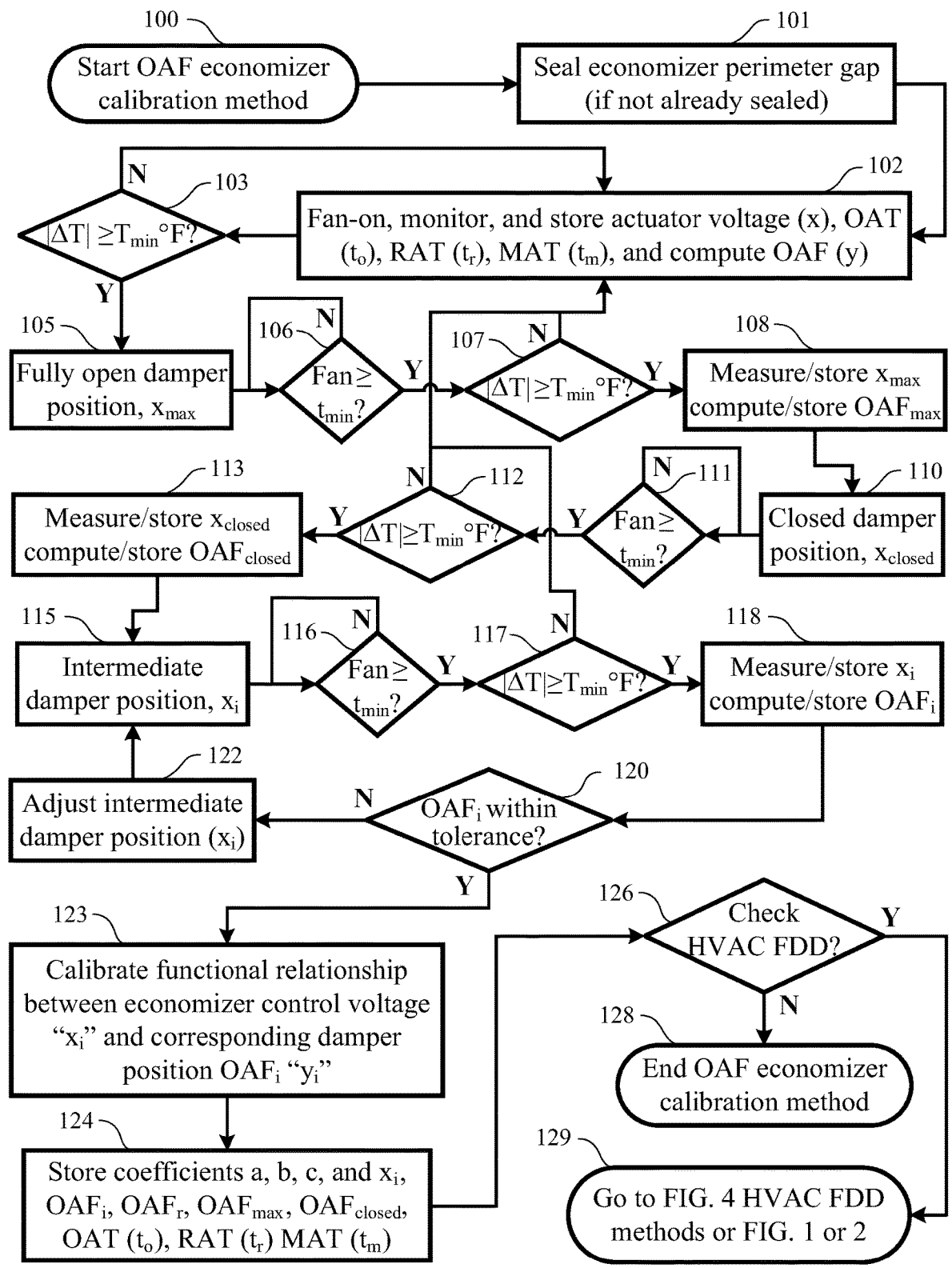
FIG. 3 shows an OAF economizer calibration method for an HVAC system while the HVAC system is operating, according to the present invention.

FIG. 3 shows an OAF economizer controller calibration method for an HVAC system with the HVAC fan-on during occupied or unoccupied periods according to the present invention. The OAF economizer calibration method starts at step 100. At step 101, the method comprises sealing the economizer perimeter gap 785 (see FIG. 17), if necessary. Known prior art economizer calibration methods do not seal the economizer perimeter gap 785 which allows unintended, uncontrolled, and unconditioned outdoor airflow to enter the economizer, HVAC system, and conditioned space whether or not the ventilation fan is operating. FIG. 17 shows the economizer hood 787 must be removed in order to properly seal the economizer perimeter gap 785. Sealing around the perimeter gap of the economizer frame where it connects to the HVAC system cabinet is performed with at least one sealant selected from the group consisting of: adhesive tape sealant, adhesive sealant, mastic sealant, or weatherstripping to reduce untended outdoor air leakage through the economizer perimeter frame to prevent unintended outdoor airflow during the off cycle or during the cooling or heating cycle. Sealing the economizer perimeter gap 785 includes sealing the metal surfaces between the economizer frame and the HVAC system cabinet 780 to reduce unintended outdoor airflow and increase cooling and heating efficiency by about 5 to 10% during severe hot or cold weather when the economizer dampers are closed or at minimum position during operation of the DX AC compressor(s). After the economizer perimeter gap is sealed, the OAF economizer calibration method proceeds to step 102 to calibrate the economizer damper position as a function of actuator voltage.

At step 102 of FIG. 3 with the fan-on, the OAF calibration method monitors and stores the economizer actuator voltage "$x_i$", and the OAT (or $t_o$), the Return Air Temperature (RAT) (or $t_r$), the MAT (or $t_m$), and compute the initial OAF (y) at step 102 using the following general OAF equation.

$$OAF = \frac{t_r - t_m}{t_r - t_o} \qquad \text{Eq. 1}$$

Where, OAF=outdoor airflow fraction (dimensionless), and $t_m$=mixed-air drybulb temperature or MAT (F).

At step 102, if the economizer actuator voltage (x) is at the fully open, closed, or intermediate damper position or the method is looping back to step 102 from a previous OAF calibration, then one (or more) measurement steps may be skipped (i.e., from the previous OAF calibration).

At step 103, the method checks if the absolute value of the OAT minus RAT |ΔT| is greater than a minimum temperature difference, preferably 10 F, and increasing to allow time to complete the calibration method, according to the following equation.

$$|\Delta T| = |t_o - t_r| \geq t_{min} \qquad \text{Eq. 3}$$

Where, |ΔT|=absolute value of the OAT minus RAT (F), $t_o$=outdoor-air drybulb temperature or OAT (F), $t_r$=return-air drybulb temperature or RAT (F), and $T_{min}$=the minimum temperature (preferably 10 F) to obtain an accurate measurement of the OAF within a tolerance of +/−5% of the desired OAF.

If the absolute value of |ΔT| is not greater than $T_{min}$, then the method loops back to step 102. The OAF calibration steps for the fully open, closed, or intermediate damper positions shown in FIG. 3 may be performed in a different order. For example, the intermediate $OAF_i$ may be measured during a call for cooling or heating when the damper is in the minimum position and $|\Delta T| \geq T_{min}$. After the call for cooling or heating, the closed $OAF_{closed}$ may be measured, and later during an unoccupied period the fully open $OAF_{max}$ may be measured.

At step 103, if the $|\Delta T| \geq T_{min}$, then the method proceeds to step 105 and energizes the actuator to the maximum actuator voltage, $x_{max}$ (typically 10V), to fully open the damper. The method proceeds to step 106 and waits for a minimum wait time ($t_{min}$) for sensors to reach equilibrium. The minimum wait time ($t_{min}$) may comprise waiting preferrably 5 to 10 minutes depending on sensor measurement stability. The method then proceeds to step 107 to check if the $|\Delta T|$ is greater than or equal to a minimum temperature difference $|\Delta T| \geq T_{min}$? The minimum temperature difference is preferrably 10 F. If step 107 is No (N), then the method loops back to step 102, and returns to step 105 to finish calibration when $|\Delta T| \geq 10$ F. If step 107 is Yes (Y), then the method proceeds to step 108 to measure and store the maximum actuator voltage, $x_{max}$, and calculate the $OAF_{max}$ ($y_{max}$) based on OAT ($t_o$), RAT ($t_r$), and MAT ($t_m$) using the general OAF equation.

The method then proceeds to step 110 to energize the economizer actuator to the closed damper position, $x_{closed}$ (2V). The method proceeds to step 111 and waits for a minimum wait time ($t_{min}$) for sensors to reach equilibrium (to measure the OAT, RAT, and MAT), and proceeds to step 112 to check if the $|\Delta T|$ is greater than or equal to the minimum temperature difference ($|\Delta T| \geq T_{min}$)? If step 112 is No (N), then the method loops back to step 102, and skips to step 110 to finish calibration. If step 112 is Yes (Y), then the method proceeds to step 113 to measure and store the closed actuator voltage, $x_{max}$, and calculate the $OAF_{closed}$ ($y_{closed}$) based on OAT ($t_o$), RAT ($t_r$), and MAT ($t_m$).

The method proceeds to step 115 to energize the economizer actuator to the intermediate damper position, $x_{min}$ (typically 2.8V or 2V plus 10% of the 2 to 10V range). The method proceeds to step 116 and waits for a minimum wait time ($t_{min}$) for sensors to reach equilibrium (to measure the OAT, RAT, and MAT), and proceeds to step 117 to check if the $|\Delta T| \geq T_{min}$? If step 117 is No (N), then the method loops back to step 102, and returns to step 115 to finish calibration. If step 117 is Yes (Y), then the method proceeds to step 118 to measure and store the intermediate actuator voltage, $x_i$, and calculate the $OAF_i$($y_i$) based on OAT ($t_o$), RAT ($t_r$), and MAT ($t_m$).

The method proceeds from step 118 to step 120 to check if the intermediate damper position $OAF_i$ is within the tolerance (typically +/−5%). If No (N), the method proceeds to step 122 to adjust the intermediate damper position ($x_i$) with respect to the required $OAF_i$ and returns to step 115. If step 120 is Yes (Y), then the method proceeds to step 123 to calibrate the functional relationship between economizer control voltage, $x_i$, and the corresponding damper position $OAF_i$ ($y_i$), and precedes to step 124 (described below) and to step 126. At step 126, the method checks HVAC FDD? If step 126 is Yes (Y), the method proceeds to step 129 and goes to FIG. 4 "HVAC FDD methods" or goes to FIG. 1 to perform the FDD Cooling Delay Correction (CDC) method or goes to FIG. 2 to enable the heating economizer damper position FDD method. If step 126 is No (N), OAF calibration method ends.

At step 123, the method determines a functional relationship between the economizer control voltage "$x_i$" and corresponding damper position $OAF_i$ "$y_i$" using a least squares regression equation method involving partial derivatives to minimize residuals for each ordered pair of the set of "y-versus-x" data using the following equations (also shown in FIG. 6).

$$y_i = ax_i^2 + bx_i + c \qquad \text{Eq. 7}$$

Where, $y_i = OAF_i$ based on the corresponding damper position (dimensionless),
$x_i$=the economizer actuator voltage from 2V closed to 10V fully open,
a=regression coefficient,
b=regression coefficient, and
c=regression coefficient.

The regression equation coefficients are calculated using the following matrix equations and measurements of the economizer actuator voltage "x" and the corresponding damper position OAF "y" for at least two damper positions, and preferably for at least three damper positions selected from the group consisting of: a closed damper position, at least one intermediate damper position, and a fully open damper position.

$$\underbrace{\begin{bmatrix} \Sigma x_i^4 & \Sigma x_i^3 & \Sigma x_i^2 \\ \Sigma x_i^3 & \Sigma x_i^2 & \Sigma x_i \\ \Sigma x_i^2 & \Sigma x_i & n \end{bmatrix}}_{X} \underbrace{\begin{bmatrix} a \\ b \\ c \end{bmatrix}}_{C} = \underbrace{\begin{bmatrix} \Sigma x_i^2 y_i \\ \Sigma x_i y_i \\ \Sigma y_i \end{bmatrix}}_{Y} \qquad \text{Eq. 9}$$

Where, matrix X=the economizer actuator voltages in a 3×3 matrix X containing exactly one "n" element (x33), n−1 summations of x-values (x23 and x32), n summations of x-values to the power n−1 (x13, x22, x31), n−1 summations of x-values to the power n (x12, x21), and exactly one summation of x-values to the power n+1 (x11), matrix C=the coefficients of a quadratic regression equation in a 1×3 coefficient-matrix C containing coefficients "a" (c11), "b" (c12), and "c" (c13), and matrix Y=the corresponding damper position OAF measurements in a 3×1 matrix Y containing one summation of y-values (y31), one summation of x-values times y-values (y21), and one summation of x-values to the power n−1 times y-values (y11).

The method includes solving the above equation by multiplying the 3×3 inverse-matrix X times the 3×1 matrix Y and obtaining the 3×1 regression equation coefficient-matrix C using the following equation.

$$C = X^{-1}Y \qquad \text{Eq. 11}$$

Where, $X^{-1}$=3×3 inverse-matrix X of the 3×3 matrix X calculated according to the following equation,
C=3×1 (3 rows and 1 column) coefficient-matrix C containing coefficients, "a" (c11), "b" (c12), and "c" (c13) of the quadratic regression equation, and
Y=3×1 matrix Y noted in the above equation.

The method includes solving the inverse of the 3×3 matrix X using the following equations.

$$X = \begin{bmatrix} h & k & n \\ i & l & o \\ j & m & o \end{bmatrix} X^{-1} = \frac{1}{\det X} \begin{bmatrix} lb-om & nm-kp & ko-nl \\ oj-ip & hp-ni & ni-ho \\ im-lj & kj-hm & hi-ki \end{bmatrix} \qquad \text{Eq. 13}$$

$$X^{-1} = \frac{1}{\det X} \begin{bmatrix} lb-om & nm-kp & ko-nl \\ oj-ip & hp-ni & ni-ho \\ im-lj & kj-hm & hl-ki \end{bmatrix} \qquad \text{Eq. 15}$$

$$\frac{1}{\det X} = \frac{1}{hlp - imn + jko - hmo - jln - ikp} \quad \text{Eq. 17}$$

Where, detX=determinant of matrix X which cannot equal zero.

After calculating the 3×1 coefficient-matrix C coefficients "a" (c11), "b" (c12), and "c" (c13), using the above equations, the method includes calculating the required intermediate economizer actuator voltage, "$x_r$", equal to a first quantity (minus "b") plus a second quantity (square root of a third quantity ("b" squared) minus a fourth quantity (4 times "a") times a fifth quantity ("c" minus the required intermediate damper position "$OAF_r$")) where the first quantity is divided by a sixth quantity (2 times "a") according to the following equation. In Eq. 19, the variables "$OAF_r$" (or "$y_r$") may be substituted with the variables "OAF" (or "y") using any numerical value from 0 to 1.0 providing functional values of "x" that can range from the minimum to the maximum economizer control voltage "x."

$$X_r = \frac{-b + \sqrt{b^2 - 4a(c - OAF_r)}}{2a} \quad \text{Eq. 19}$$

Where, $x_r$=the required intermediate economizer actuator voltage $x_r$ corresponding to the required intermediate damper position $OAF_r$, and $OAF_r$=the required intermediate damper position $OAF_r$ for the building occupancy.

At step 124 of FIG. 3, the method stores the coefficients "a" (c11), "b" (c12), and "c" (c13) used to calibrate the economizer controller and obtain the functional relationship between the economizer actuator voltage, "$x_i$", and the corresponding damper position OAF "$y_i$". At step 124, the method may also store the economizer actuator voltage, "$x_i$", corresponding damper position "$OAF_i$", the required damper position "$OAF_r$", the fully open maximum $OAF_{max}$, and the closed $OAF_{closed}$, OAT ($t_o$), RAT ($t_r$), and MAT ($t_m$). The method may also use outdoor, return, and mixed-air, wetbulb, relative humidity, or CO2 measurements. The method can also loop back to step 100 and measure OAT ($t_o$), RAT, ($t_r$), and MAT ($t_m$), and compute a final intermediate damper position "$OAF_i$" in step 120, and check whether or not the "$OAF_i$" is within an acceptable tolerance of preferably +/−5% of $OAF_r$ in step 120.

The OAF calibration method shown in FIG. 3 may be implemented manually or automatically on units with an analog economizer controller with temperature sensors and economizer actuator voltage output signals. The method may also be implemented on units with a digital economizer controller with FDD capabilities, temperature sensors, and economizer actuator voltage output signals. The method comprises: calibrating the economizer controller for the HVAC system by determining a functional relationship between an economizer actuator voltage "x" and a corresponding damper position Outdoor Airflow Fraction (OAF) "y" comprising: measuring the economizer actuator voltage "x" and the corresponding damper position OAF "y" to obtain a set of "y-versus-x" data for at least two damper positions, and preferably for at least three damper positions selected from the group consisting of: a closed damper position, at least one intermediate damper position, and a fully open damper position; and calculating coefficients of the functional relationship between the economizer actuator voltage "x" and the corresponding damper position OAF using the set of "y-versus-x" data; and calculating an intermediate economizer actuator voltage, "$x_i$", based on the corresponding intermediate damper position OAF "$y_i$" (also referred to as "$OAF_i$").

The method for calculating coefficients of the functional relationship may also comprise calculating coefficients of the functional relationship between the economizer actuator voltage "x" and the corresponding damper position OAF "y" by fitting an Nth order function to N+1 points, for example, using at least a first order line fit to a set of two "y-versus-x" data points, but preferably using at least a second-order line fit to a set of three "y-versus-x" data points to calculate the economizer actuator voltage, "x", based on the second-order line fit and the corresponding damper position OAF "y."

The FDD method may comprise calculating coefficients of the functional relationship between the economizer actuator voltage "x" and the corresponding damper position OAF "y", by fitting an Nth order function to N+1 or more points, using a least squares regression equation method. The least squares regression equation method uses partial derivatives to minimize residuals for each ordered pair of the set of "y-versus-x" data by expressing the least squares regression equation method in matrix form, comprising: forming a 3×3 matrix X containing exactly one "n" element (x33), n−1 summations of x-values (x23 and x32), n summations of x-values to a power n−1 (x13, x22, x31), n−1 summations of x-values to a power n (x12, x21), and exactly one summation of x-values to a power n+1 (x11); inverting the 3×3 matrix X to obtain a 3×3 inverse-matrix X; forming a 3×1 matrix Y containing one summation of y-values (y31), one summation of x-values times y-values (y21), and one summation of x-values to the power n−1 times y-values (y11); multiplying the 3×3 inverse-matrix X times the 3×1 matrix Y and obtaining a 3×1 regression equation coefficient-matrix C containing coefficients "a" (c11), "b" (c12), and "c" (c13); calculating the intermediate economizer actuator voltage, "$x_i$", based on a quadratic formula using coefficients "a" (c11), "b" (c12), and "c" (c13) and the intermediate damper position OAF "$y_i$" (or "$OAF_i$") is subtracted from the coefficient "c" (c13).

The economizer calibration method also comprises: measuring the economizer actuator voltage "x" and the corresponding damper position OAF "y" when an absolute value of a difference between the OAT and RAT is at least 10 F, where the damper position OAF is defined as a ratio of an outdoor air volumetric flow rate divided by a total HVAC system volumetric flow rate.

The measurement of the intermediate damper position OAF "$y_i$" is preferably made with the economizer actuator voltage "x" close to the middle of the economizer actuator voltage range.

The economizer calibration method also comprises: measuring the set of "y-versus-x" data for the at least three damper positions and at least one fan-motor speed used by the HVAC system selected from the group consisting of: at least one fan-motor speed for the HVAC fan operating without heating or cooling, a first-stage cooling fan-motor speed, a second-stage cooling fan-motor speed, a first-stage heating fan-motor speed, a second-stage heating fan-motor speed, and a representative set of fan-motor speeds for a variable-speed fan-motor.

The method may optionally comprise calculating the relative humidity (RH) or Carbon Dioxide (CO2) concentration (ppm) in the return air, mixed air, and outdoor air. The method may also comprise calculating humidity ratios (lbm/lbm) of return-air $W_r$, outdoor-air, $W_o$ and mixed-air $W_m$ using the Hyland Wexler formulas from the 2013 ASHRAE Handbook. The method may also comprise calculating the saturation humidity ratio ($W^*_m$) from the saturation pressure ($p_{ws}$).

Figure 4:
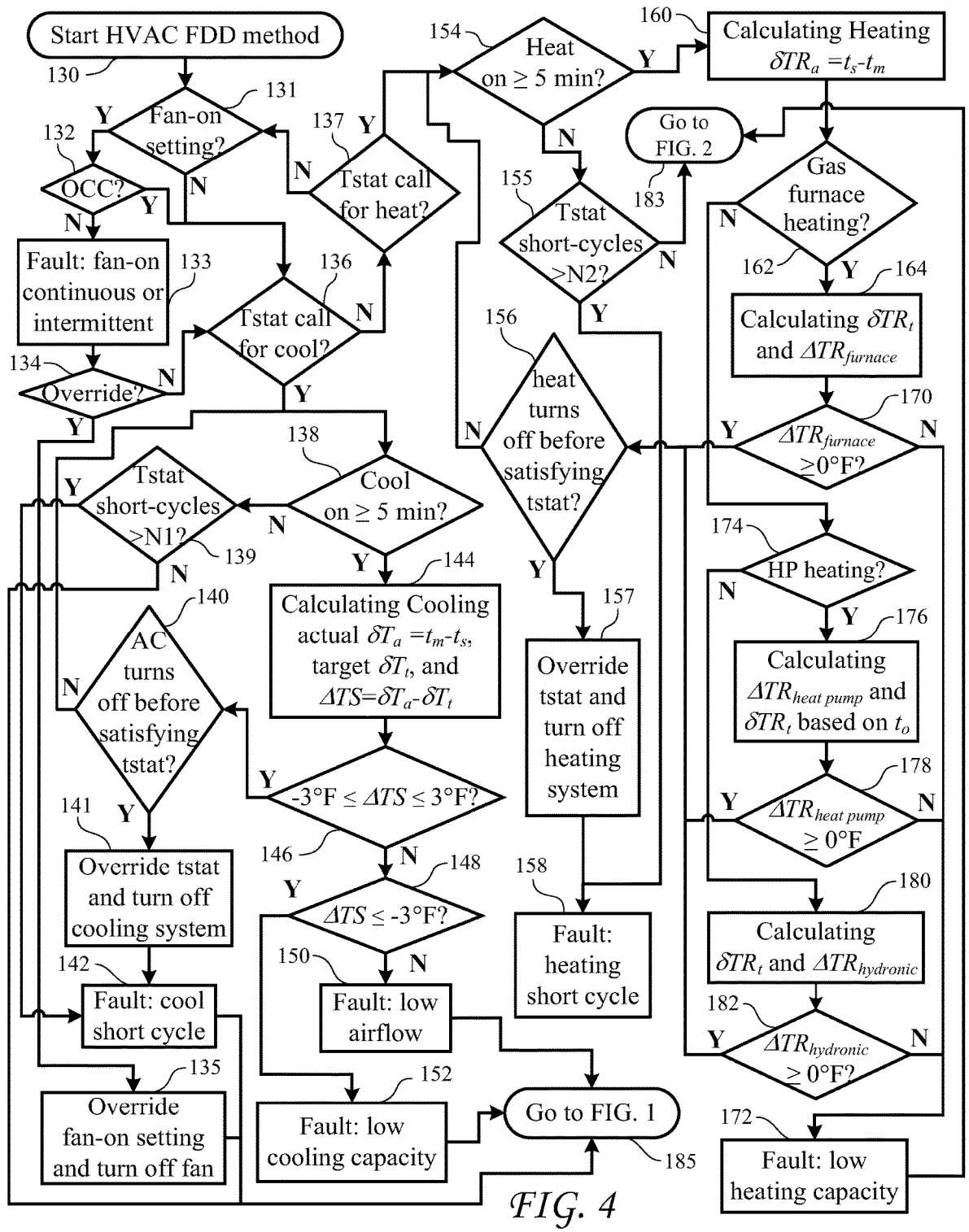
FIG. 4 shows a method for an HVAC Fault Detection Diagnostic (FDD) method while the HVAC system is operating, according to the present invention.

FIG. 4 shows a method for performing a FDD evaluation on an HVAC system while the HVAC system is operating. The method starts at step 130 and proceeds to step 131. If Step 131 is Yes (Y), a fan-on setting is operating, then the method proceeds to step 132 to check if the conditioned space is occupied based on a geofencing signal or an occupancy sensor signal. If step 132 is Yes (Y), then the method proceeds to step 136 to check the thermostat call for cooling. If step 132 is No (N), conditioned space is not occupied, then the method proceeds to step 133 to provide a "FDD alarm fan-on continuously fault or fan-on intermittently fault." After step 133, the method proceeds to step 134 to determine whether or not to "override" the fan-on setting? If step 134 is No (N), the method loops back to step 136 to check the thermostat call for cooling. If step 134 is Yes (Y), override the fan-on setting, then the method proceeds to step 135 and overrides the fan-on setting. After step 134, the FDD method proceeds to step 185 to Go to FIG. 1 step 700 to continue the thermostat call for cooling for the FDD CDC method (including known economizer or DX AC cooling).

If step 131 is No (N), the fan-on setting is not operating, then the method proceeds to Step 136 and checks whether or not the HVAC system is in cooling or heating mode. If in cooling mode, the method includes detecting and diagnosing low airflow and low cooling capacity faults in steps 138 through 185. In some embodiments in cooling mode, the method includes performing FDD of refrigerant superheat based on $t^*_m$ and $t_o$ in steps 138 through 185. If in heating mode, the method includes FDD for low heating capacity and fan-on faults in steps 154 through 182.

At step 138 of FIG. 4, the FDD method checks if the cooling system has operated for a minimum operating time (at least 5 minutes). If step 138 is Yes (Y), the cooling system is on for 5 minutes, then the method proceeds to step 144 (skip to next paragraph). If step 138 is No (N), then the method continues to step 139 to check for if the number of thermostat short-cycle cooling events is greater than N1 where N1 is based on at least one number of cooling short-cycles selected from the group consisting of: user-selected number of cooling short-cycles from 2 to 10, a number of cooling short-cycles based on the OAT, a number of cooling short-cycles based on a cooling capacity of the AC compressor, a number based on the cooling cycle duration.

If step 139 of FIG. 4 is Yes (Y), the number of thermostat short-cycle cooling events is greater than N1, then the method proceeds to step 142 to provide an FDD alarm cooling short cycle fault, and proceeds to step 185 to Go to FIG. 1 step 700 to continue the thermostat call for cooling for the FDD CDC method. If step 139 is No (N), the number of thermostat short-cycle cooling events is not greater than N1, then the method proceeds to step 185 to Go to FIG. 1 for the FDD CDC method.

At step 144 of FIG. 4, the method includes calculating the actual Temperature Split (TS) difference ($dT_a$) based on the mixed-air drybulb temperature ($t_m$) minus the supply-air temperature ($t_s$) according to the following equation.

$$\delta T_a = t_m - t_s \qquad \text{Eq. 21}$$

At step 144, the method comprises calculating the target TS difference ($dT_t$) across the cooling system evaporator and the delta TS difference (TS) defined as the actual TS minus the target TS. The method comprises calculating the target TS difference ($dT_t$) using a target TS lookup table, where the independent variables are the evaporator entering mixed-air drybulb temperature, $t_m$, and evaporator entering mixed-air wetbulb temperature, $t^*_m$. The method also comprises calculating the target TS difference ($dT_t$) using the following equation.

$$dT_t = C_7 + C_8 t_m + C_9 t_m^2 + C_{10} t^*_m + C_{11} t^{*2}_m + C_{12}(t_m \times t^*_m) \qquad \text{Eq. 23}$$

Where, $dT_t$=target temperature difference between mixed-air and supply-air in cooling mode (F),
 $t_m$=measured mixed-air drybulb temperature (F),
 $t^*_m$=mixed-air wetbulb temperature (F),
 $C_7$=−6.509848526 (F),
 $C_8$=−0.942072257 ($F^{-1}$),
 $C_9$=0.009925115 ($F^{-2}$),
 $C_{10}$=1.944471104 ($F^{-1}$),
 $C_{11}$=−0.0208034037991888 ($F^{-2}$)
 $C_{12}$=−0.000114841 ($F^{-2}$)

At step 144, the method also includes calculating the delta TS difference (TS) based on the actual TS difference ($dT_a$) minus the target TS difference ($dT_t$) using the following equation.

$$DTS = dT_a - dT_t \qquad \text{Eq. 25}$$

Where, DTS=delta TS difference between actual TS and target TS (F).

At step 146 the method checks whether or not the delta TS difference is within plus or minus of the delta TS threshold, preferably ±3 F (or a user input value). If the delta TS difference is within plus or minus of the delta TS threshold (or the user input value), then the cooling system is within tolerances, no FDD alarm signals are generated, and the method proceeds to step 148 to check if the delta TS difference is less than −3 F.

If step 148 is No (N), then the method determines the TS>3 F indicating low airflow, then the method continues to step 150 and reports an FDD alarm fault: "low airflow" which can cause ice to form on the air filter and evaporator and block airflow and severely reduce cooling capacity and efficiency. The method then proceeds to step 185, Go to FIG. 1 step 700 and continue the call for cooling for the FDD CDC method.

If step 148 is Yes (Y), the delta TS difference (TS) is less than a negative minimum delta TS difference threshold (preferably less than −3 F or a user input value), then the method proceeds to step 152 and provides a FDD alarm fault: "low cooling capacity" which can be caused by many faults including excess outdoor airflow, dirty or blocked air filters, blocked evaporator caused by dirt or ice buildup, blocked condenser coils caused by dirt or debris buildup, low refrigerant charge, high refrigerant charge, refrigerant restrictions, or non-condensable air or water vapor in the refrigerant system.

After step 152, the method proceeds to step 185, Go to FIG. 1 step 700 and continue the thermostat call for cooling for the FDD CDC method.

If step 146 is no, then the method proceeds to step 140 to check if the AC compressor is turning off before satisfying the thermostat call for cooling. If step 140 is Yes (Y), then the method proceeds to step 141 to override the thermostat call for cooling and turn off the cooling system by de-energizing the cooling signal to the AC compressor. Step 140 can be determined based on the Temperature Split (TS) between the MAT and RAT. If the TS is decreasing during the call for cooling, then the method will detect the AC compressor is turning off before satisfying the thermostat. The FDD method can also use a wired or wireless signal to detect the AC compressor contactor signal being de-energized by the control board during the call for cooling indicating a short-cycle fault. After step 141, the FDD method proceeds to step 142 and generates a FDD alarm reporting a "cooling short-cycle" fault via display, text, email, or other message. If step 140 is No (N), then the method loops back to step 138.

The FDD method for heating starts when step 136 is No (N), the thermostat is not calling for cooling, and then the method proceeds to step 137 to check if the thermostat is calling for heating. If step 137 is No (N), then the method loops back to step 132 to check the fan-on setting? If step 137 is Yes (Y), the thermostat is calling for heating, then the method proceeds to step 154.

At step 154 of FIG. 4, the FDD method checks if the heating system has operated for a minimum heating operating time (at least 5 minutes). If step 154 is No (N), then the method continues to step 155 to check for if the number of thermostat short-cycle heating events is greater than N1 where N1 is based on at least one number of heating short-cycles selected from the group consisting of: user-selected number from 2 to 10, a number based on the OAT, a number based on a heating capacity, a number based on the heating cycle duration. If step 155 is Yes (Y), the number of thermostat short-cycle cooling events is greater than N1, then the method proceeds to step 158 to provide an FDD alarm heating short cycle fault. If step 155 is No (N), the number of thermostat short-cycle heating events is not greater than N1, then the method loops back to step 183 to Go to FIG. 2 step 600 to continue the thermostat call for heating.

Step 156 and checks for a heating short-cycle (i.e., successive short-cycle heating operation) or detecting heating system turning off before satisfying the thermostat call for heating. Step 156 can be determined based on the Temperature Rise (TR) between the SAT and the MAT. If the TR is decreasing during the thermostat call for heating, then the FDD method will detect the heating system is turning off before satisfying the thermostat. The FDD method can also use a wired or wireless electrical signal to detect the burner signal for a gas furnace or heat pump compressor signal being de-energized by the control board during the call for heating indicating a short-cycle fault. If step 156 is Yes (Y), then the method proceeds to step 157 to override the call for heating and turn off the heating system by de-energizing the signal to the heat source. After step 157, the FDD method proceeds to step 158 and generates a FDD alarm reporting a heating short cycle fault via display, text, email, or other message. If step 156 is No (N), then the method loops back to 154 and checks if the heating system has been operating for greater then a minimum run time, preferably ten minutes.

After at least the minimum heater run time of the heating system operation at Step 160, the method includes calculating the actual temperature rise (dTR$_a$) for heating based on the supply-air temperature minus the mixed-air temperature according to the following equation.

$$\delta TR_B = t_s - t_m \qquad \text{Eq. 27}$$

At step 162, the method includes checking whether or not the heating system is a gas furnace, and if the method determines the heating system is a gas furnace, then the method proceeds to step 164.

At step 164, the method includes calculating the minimum acceptable target supply-air temperature rise for a gas furnace which is preferably a function of airflow and heating capacity based on furnace manufacturer temperature rise data, and is preferably 30 F as shown in the following equation.

$$\delta TR_{t_{furnace}} = 30 \qquad \text{Eq. 31}$$

Where, $\delta TR_{t_{furnace}}$ =minimum acceptable furnace temperature rise.

The minimum acceptable furnace temperature rise may vary from 30 to 100 F or more depending on make and model, furnace heating capacity, airflow, and return temperature.

At step 164, the method also includes calculating the delta temperature rise for the gas furnace heating system, DTR$_{furnace}$, according to the following equation.

$$\Delta TR_{furnace} = \delta T_a - \delta TR_{t_{furnace}} \qquad \text{Eq. 33}$$

At step 170 the method includes calculating whether or not the delta temperature rise for the furnace is greater than or equal to 0 F according to the following equation.

$$\Delta TR_{furnace} = \delta T_a = \delta TR_{t_{furnace}} \geq 0 \qquad \text{Eq. 35}$$

At step 170, if the method determines the delta temperature rise for the furnace is greater than or equal to 0 F, then the gas furnace heating system is considered to be within tolerances, no FDD alarm signals are generated, and the method includes a loop to continue checking the temperature rise while the furnace heating system is operational using steps 160 through 170.

At step 170, if the method determines the delta temperature rise for the furnace is less than 0 F, then proceeds to step 172.

At step 172, for a gas furnace heating system, the method comprises preferably providing at least one FDD alarm signal reporting a low heating capacity fault which can be caused by excess outdoor airflow, improper damper position, improper economizer operation, dirty or blocked air filters, low blower speed, blocked heat exchanger caused by dirt buildup, loose wire connections, improper gas pressure or valve setting, sticking gas valve, bad switch or flame sensor, ignition failure, misaligned spark electrodes, open rollout, open limit switch, limit switch cycling burners, false flame sensor, cracked heat exchanger, combustion vent restriction, improper orifice or burner alignment, or non-functional furnace. After step 172, the method loops back to step 183 to Go to FIG. 2 step 600 to continue the call for heating.

At step 162 of FIG. 4, the method includes checking whether or not the heating system is a gas furnace, and if the method determines the heating system is not a gas furnace, then the method proceeds to step 170.

At step 174, the method includes checking whether or not the heating system is a heat pump, and if the method determines the heating system is a heat pump, then the method proceeds to step 176.

At step 176, the method includes measuring the target temperature rise for heat pump heating based on the minimum acceptable target temperature rise which is preferably a function of OAT as shown in the following equation based on heat pump manufacturer minimum acceptable temperature rise data.

$$\delta TR_{t_{heat\,pump}} = [C_{21} t_o^2 + C_{22} t_0 + C_{23}] \qquad \text{Eq. 37}$$

Where, $\delta TR_{t_{heat\,pump}}$ =minimum acceptable heat pump temperature rise,
$C_{21}$=0.0021 (F$^{-1}$),
$C_{22}$=1.845 (dimensionless), and
$C_{23}$=8.0 (F).

Temperature rise coefficients may vary depending on user input, heat pump model, heating capacity, airflow, OAT, and return temperature. Minimum temperature rise coefficients for a heat pump are based on an OAT ranging from −10 F to 65 Fahrenheit, airflow from 300 to 400 cfm/ton, and return temperatures from 60 to 80 F.

At step 176, the method also includes calculating the delta temperature rise for the heat pump heating system according to the following equation.

$$\Delta TR_{heat\,pump} = \delta T_a - \delta TR_{t_{heat\,pump}} \qquad \text{Eq. 38}$$

At step 178, the method includes calculating whether or not the delta temperature rise for the heat pump heating system is greater than or equal to 0 F according to the following equation.

$$\Delta TR_{heat\,pump} = \delta T_a - \delta TR_{t_{heat\,pump}} \geq 0 \qquad \text{Eq. 39}$$

At step 178, if the method determines the delta temperature rise for the heat pump is greater than or equal to 0 F, then the heat pump heating system is considered to be within tolerances, no FDD alarm signals are generated, and the method includes a loop to continue checking the temperature rise while the heat pump heating system is operational using steps 160 through 178.

At step 178 of FIG. 4, if the method determines the delta temperature rise for the heat pump is less than 0 F, then the method proceeds to step 172.

At step 172 of FIG. 4, for a heat pump heating system, the method includes preferably providing at least one FDD alarm signal reporting a low heating capacity fault to check the system for low heating capacity. After step 172, the method loops back to step 183 to Go to FIG. 2 step 600 to continue the call for heating.

At step 174, if the method determines the heating system is not a heat pump, then the method proceeds to step 180.

At step 180, the method measures the target temperature rise for the hydronic heating system based on the minimum acceptable target supply-air temperature rise according to the following equation which is preferably a function of hot water supply temperature and may vary from 18 to 73 F depending on airflow, coil heating capacity, and hot water supply temperature, $t_{hw}$.

$$\delta TR_{t_{hydronic}} = [C_{25} t_{hw} + C_{26}] \qquad \text{Eq. 41}$$

Where, $\delta TR_{t_{hydronic}}$ = minimum acceptable hydronic temperature rise, $C_{25}$=0.35 (F$^{-1}$), and $C_{26}$=−24 (F).

The method also includes the following simplified equation to measure the target temperature rise for the hydronic heating system for all systems regardless of hot water supply temperature.

$$\delta TR_{t_{hydronic}} = C_{27} \qquad \text{Eq. 42}$$

Where, $\delta TR_{t_{hydronic}}$ = minimum acceptable hydronic temperature rise, $C_{27}$=19 F.

At step 180, the method also includes calculating the delta temperature rise for the hydronic heating system according to the following equation.

$$\Delta TR_{hydronic} = \delta T_a - \delta TR_{t_{hydronic}} \qquad \text{Eq. 43}$$

At step 182, the method includes calculating whether or not the delta temperature rise for the hydronic heating systems greater than or equal to 0 F according to the following equation.

$$\Delta TR_{t_{hydronic}} = \delta T_a - \delta TR_{t_{hydronic}} \geq 0 \qquad \text{Eq. 45}$$

At step 182 of FIG. 4, if the method determines the delta temperature rise for the hydronic heating system is greater than or equal to 0 F, then the hydronic heating system is considered to be within tolerances, no FDD alarm signals are generated, and the method includes a loop to continue checking the temperature rise while the hydronic heating system is operational using steps 160 through 182.

At step 182 of FIG. 4, if the method determines the delta temperature rise for the hydronic heating system is less than 0 F, then the method proceeds to step 172.

At step 172 of FIG. 4, for a hydronic heating system, the method includes preferably providing at least one FDD alarm signal reporting a low heating capacity fault to check the system for low heating capacity. After step 172, the method loops back to step 183 and Go to FIG. 2 step 600 call for heating.

FIG. 5 provides a graph showing the Outdoor Airflow Fraction (OAF) versus economizer damper actuator control voltage (x) for an HVAC system according to a known control 5 and the present invention 7. The known control 5 assumes OAF is proportional to economizer actuator voltage (0% OAF at 2V and 100% OAF at 10V). The present invention economizer calibration method 7 determines a functional relationship between the economizer actuator voltage "x" and the corresponding damper position OAF "y" based on a set of "y-versus-x" data for at least two or more damper positions selected from the group consisting of: a closed damper position, at least one intermediate damper position, and a fully open damper position. FIG. 5 shows the economizer calibration method 7 measuring the following "y-versus-x" data: 1) a closed damper position $x_3$=2V and $OAF_{3closed}$=15% at 3, 2) at least one intermediate damper position $x_{7a}$=6.8V and $OAF_{7a}$=41% at 7a, and 3) a fully open damper position $x_{13}$=10V and $OAF_{13\,max}$=74% at 13. These "y-versus-x" data are used to calculate the coefficients of a first-order (or greater) line fit regression equation, or a least-squares matrix-regression equation.

FIG. 6 shows the method based on the set of "y-versus-x" data, a second-order polynomial quadratic regression equation 7, the least-squares matrix-regression equations 9 and 11, and a quadratic formula equation 19 with coefficients a, b, and c that provides the solution to the quadratic regression equation 7. Equation 19 provides the following economizer actuator voltage "$x_i$" of 3.46V based on a damper position OAF "$y_i$" of 0.20 (20%) at 7b (see FIG. 5). The known control 5 at 6.8V assumes an OAF of 60% at 5a which is 19% greater than the measured OAF of 41% at 7a. The known control was originally set to 6.8V at 5a by a technician who used two fingers placed between the damper blades to set the actuator voltage. The known control 5 provides user inputs to set the minimum position (MIN POS) based on voltage. The known control 5 can be set to 3.6V (based on 0.2 times 8V range equals 1.6V plus 2V offset) shown in FIG. 5 at 5b. The actuator control voltage of 3.6V provides a measured OAF of 21% which is only 1% greater than the required OAF of 20% at 7b. For the economizer tested, the actuator control voltage was set to 6.8V providing a measured OAF of 41% which is 21% more outdoor air than the required 20% OAF at 3.46V at 7b. FIG. 5 shows for the economizer tested, the known control 5 is only accurate for the economizer actuator voltages of 3.6V+/−0.1V. Otherwise the known control 5 significantly overestimates the OAF from 3.7V to 10V and significantly underestimates the OAF from 2V to 3.5V.

FIG. 6 illustrates how a set of "y-versus-x" data are used in a least squares matrix regression equation method to determine coefficients of the Eq. 7 least-squares matrix-regression equation. The Eq. 19 quadratic formula provides the method for calculating the economizer actuator voltage, "x", based on the corresponding damper position OAF "y". FIG. 6 provides a table of the set of "y-versus-x" data based on measurements of the economizer actuator voltage "$x_i$," and corresponding measurements of the damper position OAF$_i$ "$y_i$" data. FIG. 6 shows the measurement data entered into matrix X and matrix Y in Eq. 9. FIG. 6 shows the inverse-matrix X is multiplied by matrix Y to calculate the coefficient-matrix C quadratic regression coefficients in Eq. 11. FIG. 6 shows how the Eq. 19 quadratic formula is used with the required intermediate damper position "OAF$_r$" ($y_i$=OAF$_r$=0.2) to calculate the required intermediate economizer actuator voltage "$x_r$" ($x_i$=$x_r$) from "y-versus-x" measurements per step 100 through step 124 of FIG. 3 to verify that the "OAF$_i$" is preferably within an acceptable tolerance of the required intermediate damper position. Preferably, the economizer calibration method is performed with the economizer perimeter gap sealed to reduce unintended and uncontrolled outdoor airflow and when the difference between OAT and RAT is at least 10 F and preferably greater than 20 F. Preferably the economizer calibration method is performed to obtain a set of "y-versus-x" data for at least three damper positions selected from the group consisting of: a closed damper position, at least one intermediate damper position, and a fully open damper position. Preferably, the at least one intermediate damper position measurement is close to the middle of the economizer actuator voltage range (i.e., 6 V if the offset is 2V and closed position is 2V and the fully open position is 10V) to provide an upward-opening regression curve with a positive "a" coefficient. Measuring multiple intermediate damper positions will provide a more accurate calibration curve. For HVAC systems with multiple-speed or variable-speed fan motors, the "y-versus-x" measurements should be made at each of the fan-motor speeds to provide a complete economizer calibration database of the set of "y-versus-x" data.

FIG. 7 provides calculations of the FDD CDC savings from correcting the known prior art default 62 F High-limit Shut-off Temperature (HST) (63 F minus 1 F deadband), and superseding the known prior art −1 F and −2 F HST deadband delays. The present invention FDD CDC moves the damper to the fully open position when OAT is less than or equal to ≤HST and closes the damper when OAT increases to greater than or equal ≥(HST plus 2 F). The FDD CDC method moves the damper to the fully open position and energizes at least one AC compressor when OAT is greater than the ACT and OAT is less then or equal to the HCT. Savings are based on comparing the same building with the present invention FDD CDC HST of 71 F for CZ06 and HST of 75 F for CZ13 and CZ15. The FDD CDC HST values are referenced to the ASHRAE 90.1 and CEC Building Energy Efficiency Standards. The calculations are based on hourly simulations of the annual energy use for a commercial retail building prototype using the DOE-2.2 building energy analysis program (LBNL 2014). Known economizer controllers use a 2 F deadband to reduce or eliminate "hunting" where the economizer opens and closes dampers multiple times during a call for cooling when the OAT is vacillating above or below the HST. The FDD CDC method prevents economizer "hunting," and also prevents overshooting the HCT when the damper is in the fully open position, by superseding at least one thermostat second-stage time/temperature delay and energizing an AC compressor otherwise delayed by the at least one thermostat second-stage time/temperature delay. By energizing the AC compressor when the damper is in the fully open position, the FDD CDC method is able to quickly satisfy the call for cooling and prevent hunting and overshooting. FIG. 7 shows the FDD CDC method provides average savings of 1.3 to 12.5%. The average savings assume 50% weighting for correcting the known prior art default 62 F HST, 45% weighting for correcting the −1 F HST deadband, and 5% for correcting the −2 F HST deadband. The savings for correcting the default 62 F HST are 2.8 to 23.8% savings, savings for correcting the −1 F HST deadband are −0.1% to 1%, and savings for correcting the −2 F HST deadband are −0.1 to 2.3%. In the hotter climate zones (CZ13 and CZ15), the 75 F HST recommended by the ASHRAE 90.1 and the CEC Building Energy Efficiency Standards requires 0.1% more cooling energy compared to 74 F or 73 F HST (i.e., −1 F or −2 F deadband delays). The known prior art −1 F to −2 F deadband delays cannot be changed by user inputs. The known prior art reduces cooling capacity, efficiency, and occupant comfort. The FDD CDC method provides a solution to resolve these problems.

FIG. 8 provides calculations of the FDD CDC method savings for an HVAC system with an economizer based on hourly building energy simulations of a commercial retail building when the building is occupied. The building energy simulations are based on the US Department Of Energy (DOE) DOE-2.2 building energy analysis program (LBNL 2014). The DOE-2 building energy analysis program is used to predict the energy use and cost for residential and commercial buildings based on a description of the building layout, constructions, usage, lighting, equipment, and HVAC systems. The FDD CDC savings are calculated using the following heat balance equations to determine how much extra DX AC compressor energy is required to remove heat from the room air due to the thermostat second-stage time delay ($t_d$) or thermostat second-stage dead band ($T_d$). The time delay can vary by 2 to 60 minutes and the deadband delay can vary from 2 to 10 F depending on default settings or user-selected thermostat settings. The net sensible heat removal rate Q$_{net}$ (column g) is calculated as follows.

$$Q_{net}=Q_{sc}+Q_e+Q_i \qquad \text{Eq. 46}$$

Where, Qnet=net DX AC sensible heat removal rate (Btu) (column g), Q$_{sc}$=average DOE-2 hourly DX coil sensible cooling (Btu) (column e), Q$_e$=average DOE-2 hourly economizer heat removal (Btu) (column b), Q$_i$=average DOE-2 hourly sensible heat load (Btu) added to the room air volume from the building shell, infiltration, and solar radiation as well as internal sensible heat loads generated by occupants, lights, and equipment (column c). The peak internal loads are 250 Btu/hour-person from occupants, 5.1 Btu/ft$^2$ (1.5 Watts/ft$^2$) from lighting, and 3.1 Btu/ft$^2$ (1 W/ft$^2$) from equipment. The magnitude of the sensible heat load varies based on the building type and schedules (hour, day, week and month). The retail building is modeled with peak occupancy of 45 people, 6400 ft$^2$ of conditioned sales floor area, 1600 ft$^2$ of conditioned non-sales floor area, 80000 ft$^3$ of total interior volume, 0.25 window-to-wall ratio in sales area (no windows in non-sales area), 25 tons of mechanical AC compressor cooling (300,000 Btu/hr), 9400 cfm airflow (376 cfm/ton), 0.14 OAF when the economizer is closed (2V), 0.3 OAF when the economizer is at the minimum position, and 0.663 OAF when the economizer is fully open (10V).

FIG. 8 shows the economizer average heat removal varies from −4876 at 75 F OAT to 63302 at 63 F OAT (column b), and the sensible cooling load varies from −54363 to −61636 Btu per hour (column c). The following heat balance equation is used to determine the corrected DOE-2 DX AC power input for each hour.

$$e_c=e_{ac}(1-Q_v/Q_{ac}) \qquad \text{Eq. 47}$$

Where, $e_c$=corrected DOE-2 AC power (kWh) (column i), $e_{ac}$=average DOE-2 hourly DX AC plus fan power (kWh) (column h), $Q_v$=−2285 Btu or quantity of heat in the room air volume which caused the Conditioned Space Temperature (CST) to increase by the 2 F thermostat deadband (Btu) (column d) calculated as room volume times the air specific heat (0.244 Btu/F-lbm) times the average air density (0.073 lbm/ft$^3$) times 2 F.

$$\Delta e_{fi} = 1 - e_{ac}/e_c \qquad \text{Eq. 48}$$

Where, $\Delta e_{fi}$=FDD CDC savings occupied FIG. 8 or unoccupied FIG. 9 (column j). FIG. 8 indicates that the known prior art economizer controller cannot satisfy the thermostat call for cooling and exceeds the thermostat second-stage time delay and the thermostat second-stage temperature deadband ("Yes" in column f) when the building is occupied and the OAT ranges from 63 F to 75 F. This unresolved issue is caused by the thermostat second-stage time delay and thermostat second-stage temperature deadband delay preventing the thermostat from energizing the second-stage cooling signal for the economizer to energize the first-stage AC compressor to cool the conditioned space and prevent the CST from increasing by 2 F to 4 F. The FDD CDC method supersedes the thermostat second-stage time delay/temperature-deadband delay and energizes the AC compressor with the fully open damper position to allow the HVAC fan to provide a maximum amount of outdoor airflow for cooling when the OAT is greater than the ACT and the OAT less than or equal to least one HCT at the beginning of a thermostat call for cooling. The FDD CDC methods saves 14 to 29% compared to the known prior art control when the building is occupied (column j). Annual savings are 7.2+/−2.9% depending on the commercial building type, HVAC system, occupancy schedule, thermostat, economizer controller, and climate zone.

FIG. 9 provides calculations of the FDD cooling delay correction savings when the building is unoccupied using the same equations discussed above. FIG. 9 shows the sensible cooling load from people, lights, and equipment ranges from −21925 to −23686 Btu per hour (column c), and the economizer heat removal ranges from −4876 at 75 F OAT to 29213 at 69 F OAT. The unoccupied cooling load from people, lights, and equipment is 61% less than the occupied cooling load shown in FIG. 8 (column c). FIG. 9 indicates that the known prior art economizer controller cannot satisfy the thermostat call for cooling and exceeds the thermostat second-stage time delay and the thermostat second-stage temperature deadband ("Yes" in column f) when the building is unoccupied and the OAT ranges from 69 F to 75 F. The FDD CDC method supersedes the thermostat second-stage time delay and the thermostat second-stage deadband delay and energizes the AC compressor and fully opens the damper to provide the maximum amount of outdoor airflow for cooling when the OAT is greater than at least one low-limit control temperature and the OAT less than or equal to least one high-limit control temperature at the beginning of a thermostat call for cooling. The FDD CDC methods saves 12.4 to 16% compared to the known prior art control when the building is unoccupied (column j).

Figure 10:
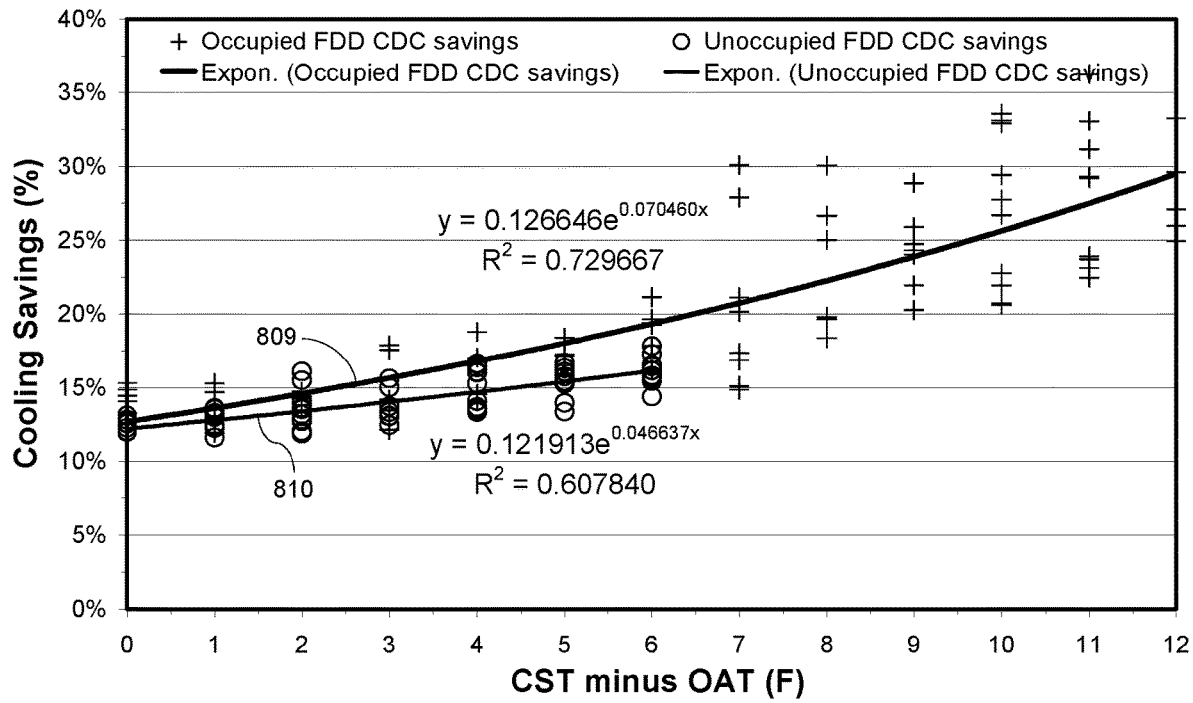
FIG. 10 provides measurements representing the FDD CDC cooling savings versus the temperature difference between the Conditioned Space Temperature (CST) and the OAT for an occupied and unoccupied building.

FIG. 10 shows a curve 809 representing the FDD cooling delay correction savings versus CST minus OAT temperature difference for an occupied building. FIG. 10 also shows a curve 810 representing the FDD cooling delay correction cooling savings for an unoccupied building. The savings range from 12 to 29% for a CST-OAT temperature difference from 0 F to 12 F. FIG. 10 shows how the FDD cooling delay correction ACT varies depending on the building occupancy.

When the building is occupied economizer cooling is able to meet the load up to 63 F or CST-OAT difference of 12 F due to the sensible cooling load from people, lights, and equipment. When the building is unoccupied economizer cooling is able to meet the load up to 69 F or CST-OAT difference of 6 F due to less cooling loads from people, lights, and equipment. Known prior art economizer controllers allow economizer cooling to attempt to satisfy the thermostat call for cooling with a thermostat first-stage time delay of 2 to 60 minutes and temperature deadband of 2 to 4 F. The known prior art control causes CST to increase by 2 to 4 F above the setpoint which increases AC compressor operation and energy use and decreases thermal comfort. The present invention FDD CDC method provides the VEST to automatically determine when to increase the cooling capacity delivered to the conditioned space by the AC system depending on the OAT and the building occupancy to maximize cooling efficiency and thermal comfort.

FIG. 10 provides two trendline regression equations.

$$y = 0.126646 e^{-0.07046\,x} \qquad \text{Eq. 49}$$

Where, y=occupied FDD CDC plus fan savings based on $\Delta e_{fi}$ in FIG. 8, and x=CST minus OAT with low-limit 63 F OAT and high-limit OAT of 69 to 80 F depending on climate zone. The low-limit OAT is the temperature below which the economizer can fully meet the sensible load and not the economizer-lock-out temperature.

$$y = 0.12191 e^{-0.046637\,x} \qquad \text{Eq. 50}$$

Where, y=unoccupied FDD CDC plus fan savings based on $\Delta e_{fi}$ in FIG. 9, and x=unoccupied CST minus OAT with low-limit OAT of 69 F and high-limit OAT of 69 F to 80 F depending on climate zone. Eq. 49 and Eq. 50 can be used to calculate savings for the FDD CDC method superseding the thermostat second-stage time delay and the thermostat second-stage deadband delay. The regression equations can be used with the equation provided in FIG. 13 to calculate cooling savings for the FDD CDC method superseding the thermostat delays and the economizer time delay (see below).

Figure 11:
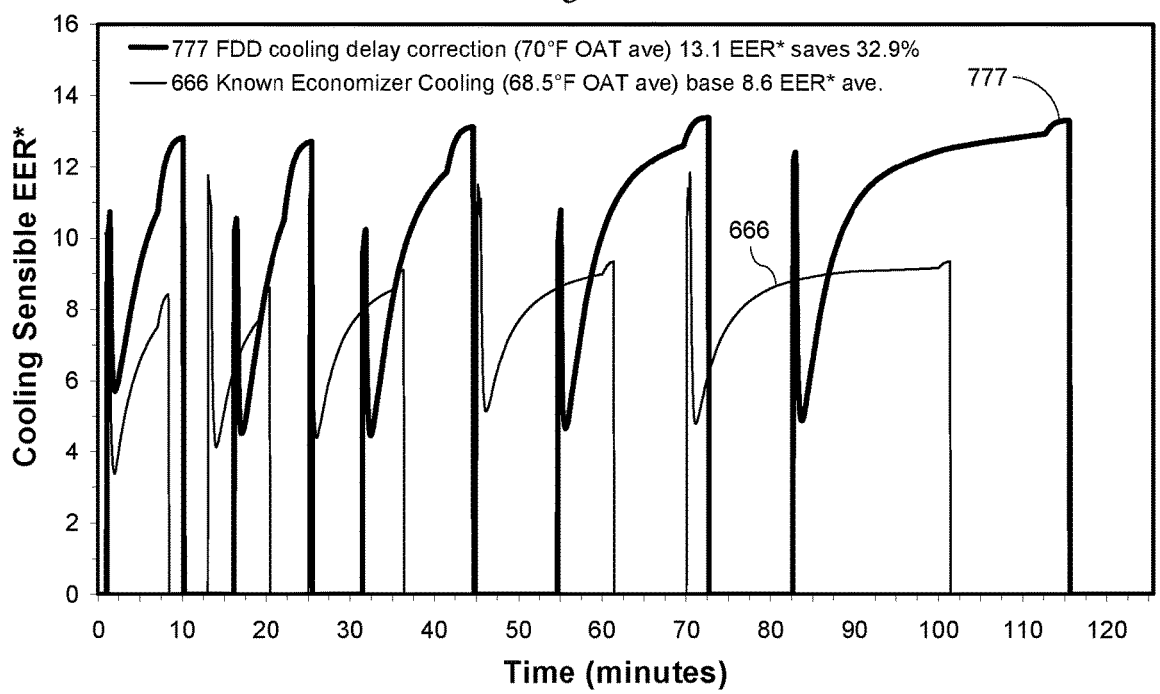
FIG. 11 shows five tests of the known economizer cooling control and five tests of the present invention FDD cooling delay correction method.

FIG. 11 shows five tests of the known economizer cooling control 666 with average application cooling sensible Energy Efficiency Ratio* (EER*) of 8.6 where EER* is the ratio of sensible cooling energy output in British thermal units (Btu) divided by the total energy input in kilo Watt hours (kWh). The known economizer control positions the dampers at the minimum OAF damper position actuator voltage command of 2.8 Volts with the DX AC compressor energized and a fixed fan-off delay operating for 80 seconds after the end of the DX AC cooling cycle.

FIG. 11 also shows five tests of the present invention FDD cooling delay correction control 777 with average application cooling sensible Energy Efficiency Ratio* (EER*) of 13.1 with average EER* improvement of 51.5% and average savings of 32.9%. The FDD cooling delay correction control positions the dampers at the fully open OAF damper position actuator voltage command of 10 Volts with the AC compressor energized and a variable fan-off delay after a cooling cycle based on the air drybulb temperature difference between the MAT and the SAT wherein the MAT is based on a mixture of outdoor air and return air and the fan-off delay operates until the MAT minus SAT drybulb temperature difference is less than 6 F.

FIG. 12 provides a table of laboratory test measurements of the OAT [column a], total power (Watts) [column b], sensible cooling capacity (Btuh) [column c], sensible Energy Efficiency Ratio (EER*s) [column d=c/b], economizer only cooling savings for a packaged HVAC system with an economizer, fully open damper, and HVAC fan [column e], and the present invention FDD Cooling Delay Correction (CDC) savings for a packaged HVAC system with an economizer, fully open damper, and HVAC fan plus a first-stage and a second-stage AC compressor [column f]. The laboratory maintains 75 F drybulb and 62 F wetbulb indoor conditions to emulate an occupied commercial building during the testing period. FIG. 12 shows the economizer only cooling savings [column e] are negative (−25.3%) at 65 F OAT compared to the FDD CDC method which is more efficient at 65 F OAT. The economizer is 11.5% more efficient at 60 F OAT, and 27.3% more efficient at 55 F compared to the FDD CDC method. The FDD CDC cooling method provides cooling savings when the building is occupied during economizer operation from about 63 F to 75 F. The FDD CDC method also provides cooling savings when the building is occupied during mechanical cooling with the economizer damper in the minimum position when the OAT is greater than 75 F OAT.

FIG. 13 shows the economizer cooling savings 819 going from 27.3% at 55 F OAT, crossing 0% at about 61.9 F OAT, and going down to −30% at 65.49 F OAT based on data provided in FIG. 12. FIG. 13 also shows the FDD CDC cooling savings 821 going from −1.9% at 55 F OAT to 47.2% at 100 F OAT. The economizer cooling savings 819 with fully open damper and the FDD CDC cooling savings 821 with fully open damper plus first- and second-stage AC compressor intersect at 61.054 F with the same savings of 5.45%. The FDD CDC method provides annual savings of approximately 4.9+/−1.1% depending on the commercial building type, HVAC system, economizer and thermostat settings, occupancy schedule, and climate zone. The known prior art economizer energizes the second-stage AC compressor after a default 4 to 120 minute time delay which increases energy use and reduces thermal comfort. The following trendline regression equation can be used to calculate FDD CDC cooling savings for superseding the economizer second-stage time delay.

$$y=0.844407 \, \text{Ln}(x)-3.417134 \qquad \text{Eq. 51}$$

Where, y=the FDD CDC savings for superseding the economizer second-stage time delay, and x=OAT from 55 to 120 F. Eq. 51 can be used to calculate FDD CDC savings during periods of time when a known prior art economizer controller provides a second-stage time-delay during economizer cooling or AC compressor mechanical cooling. Eq. 51 can also be used with Eq. 49 and Eq. 50 from FIG. 10 to calculate FDD CDC savings from superseding the economizer second-stage time delay and the thermostat second-stage time delay/temperature-deadband delay.

FIG. 13 shows negative economizer-only savings 819 for OAT greater than 62.5 F when a building is occupied, are not obvious to persons having ordinary skill in the art who assume economizers provide enough cooling to meet commercial building cooling loads when the OAT is between 69 F and 75 F. The California Energy Commission 2019 Building Energy Efficiency Standards require a high-limit economizer drybulb setpoint temperature of 69 F to 75 F based on climate zone.

Figure 14:
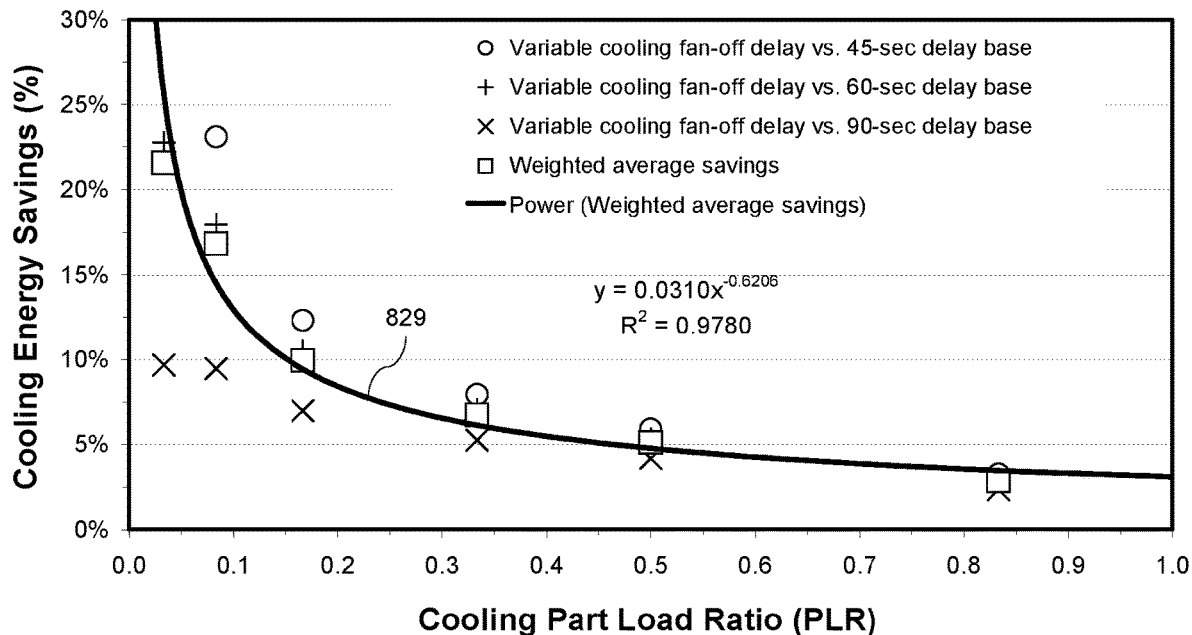
FIG. 14 provides measurements representing the cooling energy savings (%) versus the cooling Part Load Ratio (PLR) for the present invention FDD variable fan-off delay method compared to known fixed fan-off delays of 45, 60, and 90-seconds, where the PLR is defined as the sensible cooling capacity for operating for less than 60 minutes divided by the total sensible cooling capacity for 60 minutes operation.

FIG. 14 provides curve 829 representing a power-function regression curve of the cooling energy savings (%) versus cooling system Part Load Ratio (PLR) for the present invention FDD variable fan-off delay method compared to a known cooling control with a fixed fan-off delay of 45, 60, and 90-seconds. The cooling PLR is defined as the sensible cooling capacity provided by a cooling system operating for less than 60 minutes divided by the total sensible cooling capacity for the cooling system operating for 60 minutes. The FDD variable fan-off delay method energizes an HVAC fan control (G) signal to operate an HVAC fan for a variable fan-off delay after a thermostat call for heating wherein the variable fan-off delay is based on an air temperature difference between a Mixed Air Temperature (MAT) and a Supply Air Temperature (SAT) wherein the MAT is based on a mixture of air at the OAT and the RAT, and the MAT varies based on a position of the economizer damper and the OAT and the RAT. Known prior art economizers do not have an HVAC fan (G) output to energize the HVAC fan. Known fixed fan-off delays are provided by the on-board HVAC system controls or a thermostat, and not the economizer controller. Known fixed fan-off delays are generally less than 90 seconds leaving considerable energy in the HVAC system that is wasted. The method energizes the HVAC fan control signal and operates the HVAC fan for the variable fan-off delay until an absolute value of the air temperature difference between the MAT and the SAT is 4 to 8 F.

Figure 15:
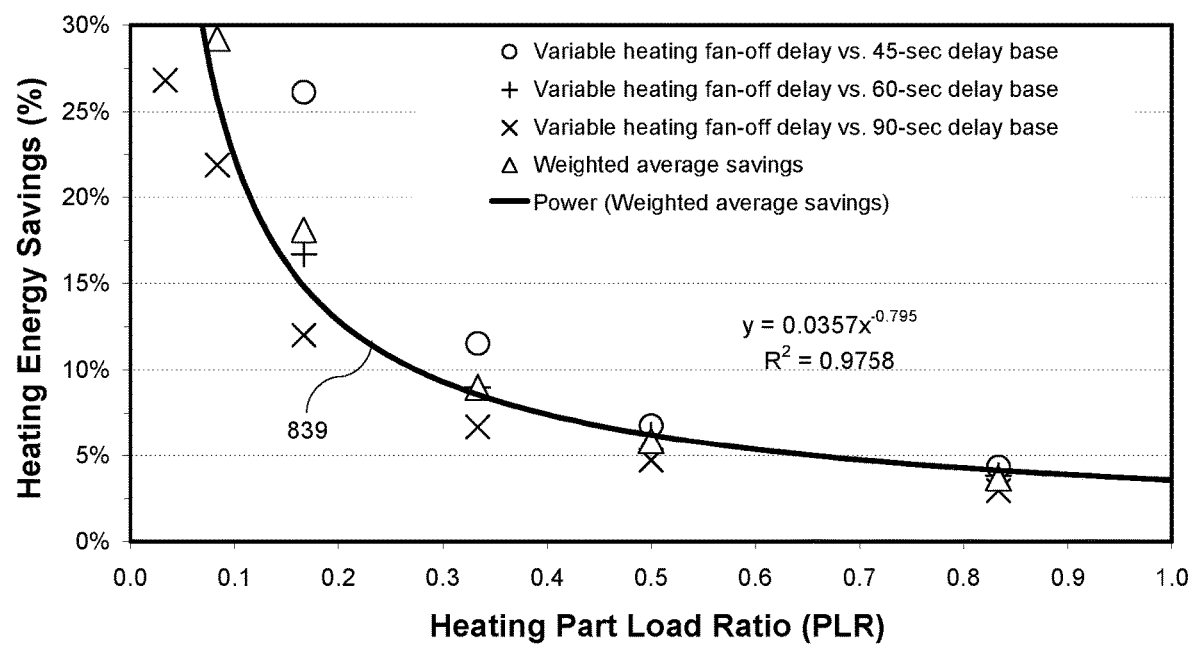
FIG. 15 provides measurements representing the heating energy savings (%) versus the heating system PLR for the present invention FDD variable fan-off delay method compared to known fixed fan-off delays of 45, 60, and 90-seconds, where the PLR is defined as the heating capacity for a heating system operating for less than 60 minutes divided by the total capacity for the heating system operating for 60 minutes.

FIG. 15 provides curve 839 representing a power-function regression curve representing the total heating system energy savings (%) versus heating system PLR for the present invention FDD variable fan-off delay method compared to known fixed fan-off delays of 45, 60, and 90-seconds. The heating PLR is defined as the heating capacity for a heating system operating for less than 60 minutes divided by the total heating capacity for the heating system operating for 60 minutes. The FDD variable fan-off delay is based on an air temperature difference between a MAT and a SAT wherein the MAT is based on a mixture of air at the OAT and the RAT and the MAT varies based on the economizer damper position and the OAT and the RAT. The method energizes the HVAC fan and operates the HVAC fan for the variable fan-off delay until an absolute value of the MAT and SAT difference is between 4 and 8 F.

Figure 16:
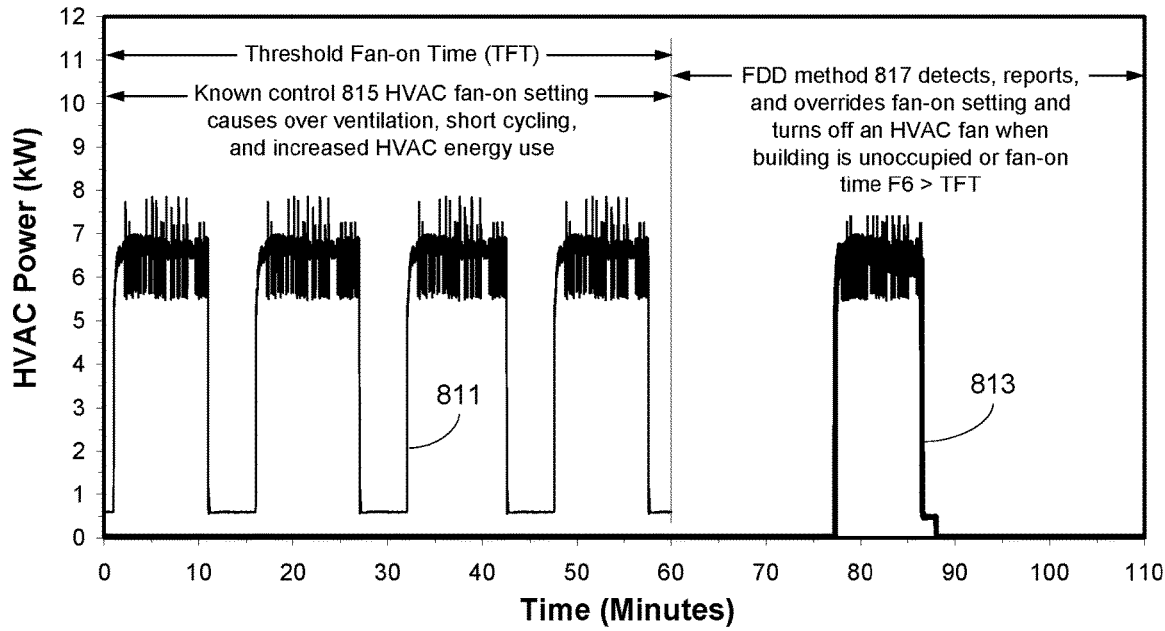
FIG. 16 provides measurements representing the total HVAC system power (kW) versus time of operation for a known control and the present invention Fault Detection Diagnostics (FDD) fan-on method which overrides a continuous fan-on fault.

FIG. 16 shows a curve 811 representing the total HVAC system power (kW) versus time of operation for a known thermostat 815 fan-on setting causing constant fan power, short cycling, and increased HVAC power and energy consumption. FIG. 16 also shows a curve 813 representing an embodiment of the present invention Fault Detection Diagnostics (FDD) method 817 detecting, reporting, and overriding a fan-on setting and turning off an HVAC fan when the building is unoccupied or the fan-on time (F6) is greater than a Threshold Fan-on Time (TFT).

FIG. 17 shows the economizer 783 installed into the HVAC system cabinet 780 and the economizer perimeter gap 785 of the economizer frame where it connects to the HVAC system cabinet. The economizer perimeter gap 785 allows unintended, uncontrolled, and unconditioned outdoor airflow to enter the economizer, HVAC system, and conditioned space whether or not the ventilation fan is operating. The economizer 783 is designed to be considerably smaller than the opening in the HVAC system cabinet in order to allow easy installation and removal. The economizer hood 787 must be removed in order to properly seal the economizer perimeter gap 785.

Virtually all economizers installed on packaged HVAC systems have an economizer perimeter gap 785 between the economizer frame and an opening in the HVAC system cabinet where the economizer is inserted and installed into the HVAC system cabinet 780. The economizer perimeter gap 785 allows unintended, uncontrolled, and unconditioned outdoor airflow to enter the economizer, HVAC system, and conditioned space whether or not the ventilation fan is operating. The economizer hood 787 must be removed in order to properly seal the economizer perimeter gap. Sealing around the perimeter gap of the economizer frame where it connects to the HVAC system cabinet is performed with at least one sealant selected from the group consisting of: adhesive tape sealant, adhesive sealant, mastic sealant, or weatherstripping to reduce untended outdoor air leakage through the economizer perimeter frame to prevent unintended outdoor airflow during the off cycle or during the cooling or heating cycle. Sealing the economizer perimeter gap 785 includes sealing the metal surfaces between the economizer frame and the HVAC system cabinet 780 to reduce unintended outdoor airflow and increase cooling and heating efficiency. Sealing the economizer perimeter gap should be performed during installation and setup of an economizer to calibrate the economizer controller actuator voltage and ensure the corresponding damper position OAF requirements are achieved.

Figure 18:
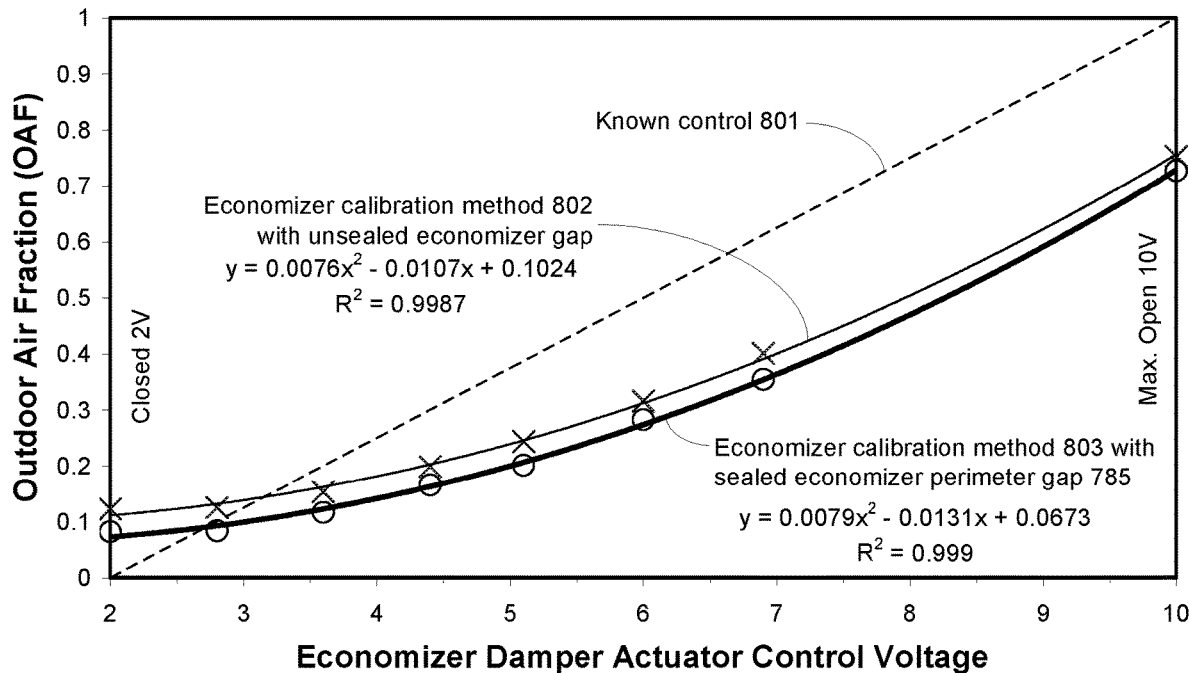
FIG. 18 shows measurements of OAF versus economizer actuator voltage measurements for economizer #1.

FIG. 18 shows measurements of OAF versus economizer actuator voltage measurements for economizer #1. The known control 801 assumed OAF is proportional to the economizer actuator voltage. The known control 801 assumes zero (0%) OAF at the 2V closed damper position, and 1.0 (100%) OAF at the 10V maximum or fully open position. FIG. 18 shows the measured OAF with unsealed economizer perimeter gap for the FDD calibration method 802, and the second-order line fit regression equation: $y=0.0076 x^2-0.0107x+0.1024$. FIG. 18 also shows the measured OAF with sealed economizer perimeter gap 785 for the FDD calibration method 803, and the second-order line fit regression equation: $y=0.0079 x^2-0.0131x+0.0673$. Sealing the perimeter gap 785 reduces the OAF from 0.123 to 0.082 (4.1%) at the 2V closed damper position, but only reduces the OAF from 0.75 to 0.73 (2%) at the 10V maximum or fully open damper position.

Figure 19:
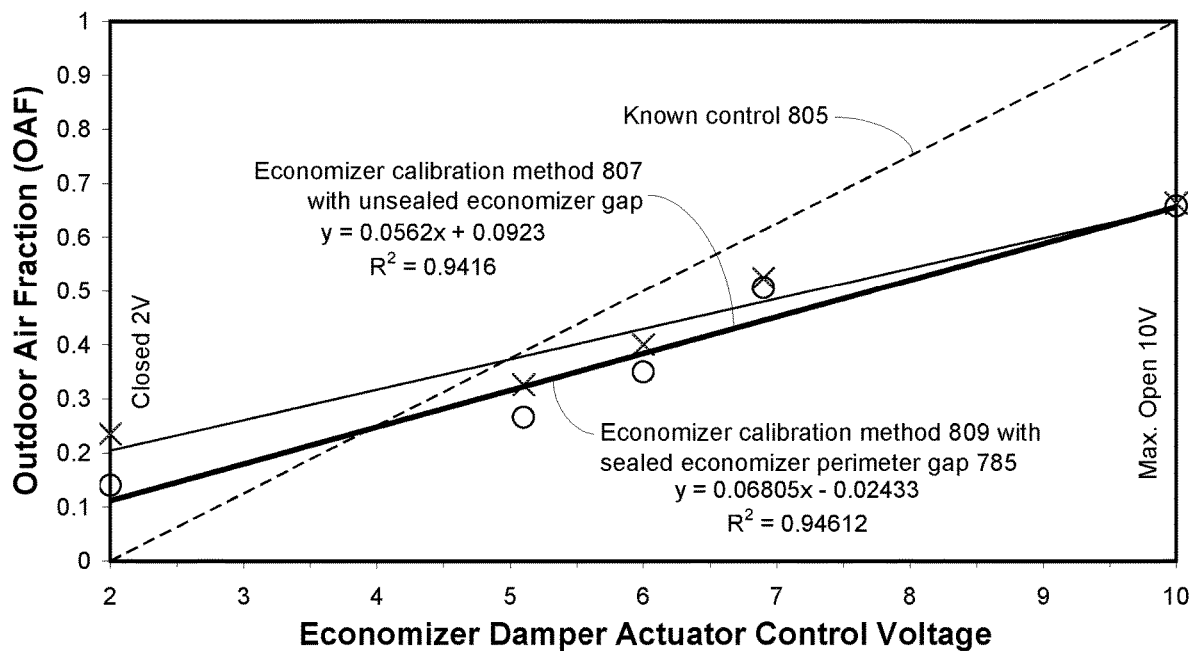
FIG. 19 shows measurements of OAF versus economizer actuator voltage measurements for economizer #5.

FIG. 19 shows measurements of OAF versus economizer actuator voltage measurements for economizer #5. The known control 805 assumed OAF is proportional to the economizer actuator voltage with zero (0%) OAF at the 2V closed position and 1.0 (100%) OAF at the 10V maximum or fully open position. FIG. 19 shows the measured OAF with unsealed economizer perimeter gap for the FDD calibration method 807 and the first-order line fit regression equation $y=0.0563 x-0.0923$. FIG. 19 also shows the measured OAF with sealed economizer perimeter gap 785 for the FDD calibration method 809 and the first-order line fit regression equation $y=0.06805 x-0.02433$. Sealing the perimeter gap 785 reduces the OAF from 0.235 to 0.14 (9.5%) at the 2V closed damper position, but only reduces the OAF from 0.663 to 0.658 (0.05%) at the 10V maximum or fully open damper position.

Figure 20:
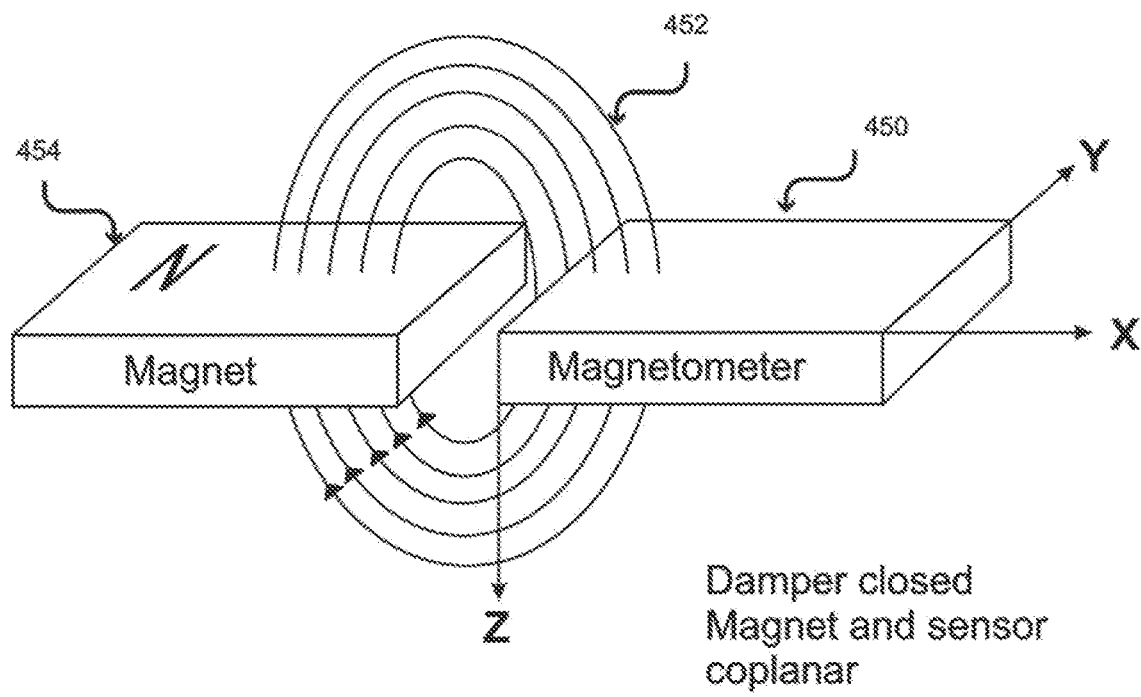
FIG. 20 shows a magnetometer co-planar with a magnet according to the present invention.

FIG. 20 shows a magnetometer 450 co-planar with a magnet 454. The magnetic field generated by the permanent magnet is in the Z plane of the 3-dimensional Micro-Electro-Mechanical Systems (MEMS) magnetometer 450.

Figure 21:
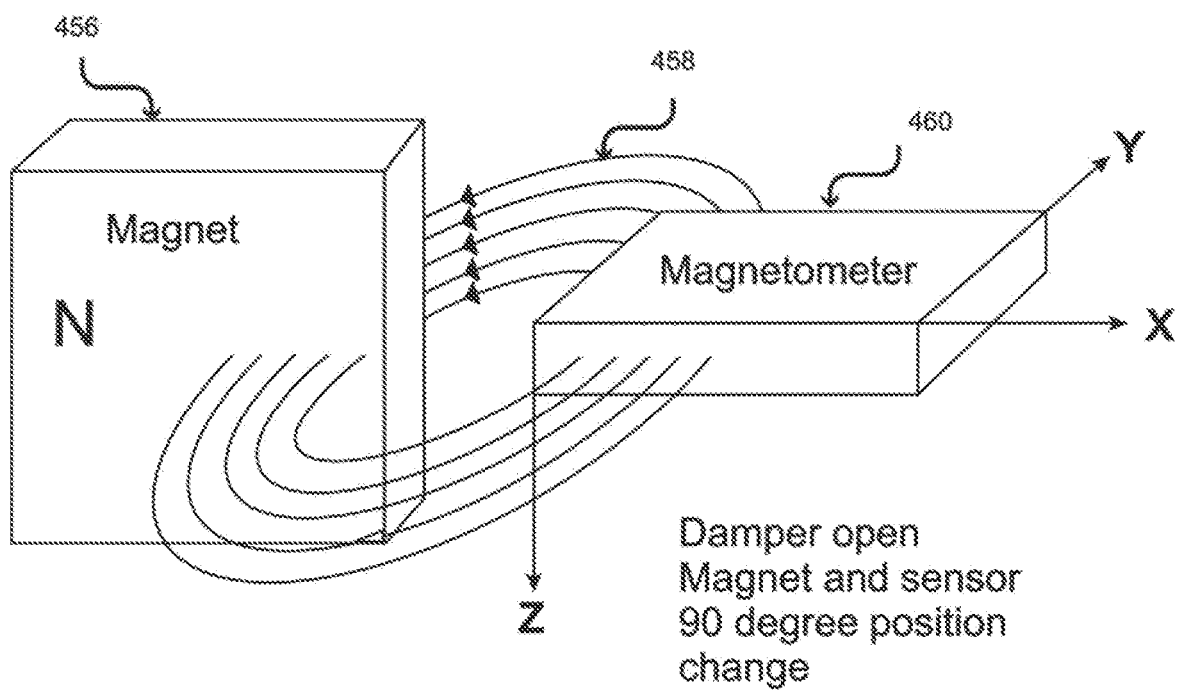
FIG. 21 shows the magnet according to the present invention rotated 90 degrees.

FIG. 21 shows the magnet 456 rotated 90 degrees from the position shown in FIG. 20. The magnetic field is in the Y plane of the 3-dimensional MEMS magnetometer 460. The magnetometer 460 is mounted to a stationary frame of an economizer to allow at least one wire to carry the magnetometer 460 measurement signal to an electronic device or economizer controller embodying the present invention to determine the position of the damper in a 3-dimensional coordinate system.

While the invention herein disclosed has been described by means of specific embodiments and applications thereof, numerous modifications and variations could be made thereto by those skilled in the art without departing from the scope of the invention set forth in the claims.

We claim:

1. A cooling delay correction method for an Air Conditioning (AC) system comprising a fan, at least one AC compressor, an economizer and a thermostat, the method comprising:
    comparing an Outdoor Air-drybulb Temperature (OAT) to a High-limit Control Temperature (HCT) wherein the HCT is greater than or equal to a High-limit Shut-off Temperature (HST);
    comparing the OAT to an Air-conditioning Control Temperature (ACT) wherein the ACT is less than the HCT;
    increasing the amount of cooling capacity delivered to the conditioned space by the AC system based on detecting the OAT is less than or equal to the HCT at the beginning of a thermostat call for cooling or during the thermostat call for cooling; and
    energizing an economizer actuator to move an economizer damper to a fully open damper position for the fan to provide an outdoor airflow to enable an economizer cooling otherwise precluded or delayed by a HST deadband delay.

2. The method of claim 1, wherein the ACT is a default ACT or a user-selected ACT.

3. The method of claim 1, wherein the ACT varies from 60 degrees Fahrenheit (F) to the HCT and the HCT varies from 69 F to 80 F.

4. The method of claim 1, wherein the ACT is a Variable Economizer-drybulb Setpoint Temperature (VEST) and the VEST is adjusted based on a building occupancy, a geofencing signal, an occupancy schedule, or a conditioned space temperature.

5. The method of claim 1, further including detecting a thermostat second-stage cooling signal is energized and energizing the at least one AC compressor to provide mechanical cooling otherwise precluded or delayed by an economizer second-stage time delay.

6. The method of claim 1, wherein the increasing the amount of cooling capacity delivered to the conditioned space by the AC system further includes:
    enabling the economizer cooling otherwise precluded or delayed by a HST temperature delay.

7. The method of claim 1, wherein the increasing the amount of cooling capacity delivered to the conditioned space by the AC system further includes:
    enabling the economizer cooling otherwise precluded or delayed by a default HST or a user-selected HST which is less than the HCT.

8. The method of claim 1, wherein the increasing the amount of cooling capacity delivered to the conditioned space by the AC system further includes:
    detecting the OAT is greater than the ACT and the OAT is less than or equal to the HCT at the beginning of the thermostat call for cooling or during the thermostat call for cooling; and
    energizing an economizer actuator to move a damper to a fully open damper position for the fan to provide an outdoor airflow to enable an economizer cooling and energizing the at least one AC compressor without a thermostat second-stage cooling signal.

9. The method of claim 1, wherein the increasing the amount of cooling capacity delivered to the conditioned space by the AC system further includes:

detecting the OAT is greater than the ACT and the OAT is less than or equal to the HCT at the beginning of the thermostat call for cooling or during the thermostat call for cooling; and energizing an economizer actuator to move a damper to a fully open damper position for the fan to provide an outdoor airflow to enable an economizer cooling and energizing the at least one AC compressor without a thermostat second-stage time or temperature delay.

10. The method of claim 1, wherein the increasing the amount of cooling capacity delivered to the conditioned space by the AC system further includes:

detecting the OAT is greater than the ACT and the OAT is less than or equal to the HCT at the beginning of the thermostat call for cooling or during the thermostat call for cooling; and energizing an economizer actuator to move a damper to a fully open damper position for the fan to provide an outdoor airflow to enable an economizer cooling and energizing the at least one AC compressor without a thermostat second-stage time delay.

11. The method of claim 1, wherein the increasing the amount of cooling capacity delivered to the conditioned space by the AC system further includes:

detecting a thermostat second-stage cooling signal; and energizing the at least one AC compressor without an economizer second-stage temperature delay.

\* \* \* \* \*